US012783520B2

(12) United States Patent
Mikaelyan et al.

(10) Patent No.: US 12,783,520 B2
(45) Date of Patent: Nov. 3, 2026

(54) STRUCTURED QUERIES ON A STRUCTURED KNOWLEDGE BASE

(71) Applicant: Microsoft Technology Licensing, LLC, Redmond, WA (US)

(72) Inventors: Liana Mikaelyan, Cheshunt (GB); James John Hensman, Gamlingay (GB); Taketomo Isazawa, Cambridge (GB); Xi Wang, Amherst, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 18/933,700

(22) Filed: Oct. 31, 2024

(65) Prior Publication Data

US 2026/0087015 A1 Mar. 26, 2026

Related U.S. Application Data

(60) Provisional application No. 63/699,442, filed on Sep. 26, 2024.

(51) Int. Cl.
*G06F 16/2455* (2019.01)

(52) U.S. Cl.
CPC ................................ *G06F 16/2455* (2019.01)

(58) Field of Classification Search
None
See application file for complete search history.

(56) References Cited

U.S. PATENT DOCUMENTS

| | | | |
|---|---|---|---|
| 11,874,939 B2 | 1/2024 | Vangala | |
| 2021/0319344 A1 | 10/2021 | Tang | |
| 2024/0256955 A1* | 8/2024 | Goodsitt | G06N 5/01 |
| 2024/0296309 A1 | 9/2024 | Mitra | |
| 2024/0428576 A1* | 12/2024 | Jiang | G06V 10/82 |
| 2025/0078927 A1* | 3/2025 | Yu | G11C 16/0483 |
| 2025/0131262 A1* | 4/2025 | Bang | G06N 3/045 |
| 2025/0190459 A1* | 6/2025 | Conway | G06N 3/0475 |
| 2025/0284768 A1* | 9/2025 | Thomas | G06F 17/16 |

OTHER PUBLICATIONS

OpenAI, “Gpt-4 technical report”, in Repository of arXiv:2303.08774v1, Mar. 15, 2023, 99 pages.
Anil, et al., “Gemini: a family of highly capable multimodal models”, in arXiv:2312.11805v1, Dec. 19, 2023, 62 pages.
Borgeaud, et al., “Improving language models by retrieving from trillions of tokens”, Proceedings of the 39th International Conference on Machine Learning, 2022, 35 pages.

(Continued)

*Primary Examiner* — Christopher J Raab
(74) *Attorney, Agent, or Firm* — Schwegman Lundberg & Woessner, P.A.

(57) ABSTRACT

An input tensor is received in an attention layer of machine learning (ML) network. A model query adapter generates a model query tensor based on the input tensor. An embedded knowledge base (KB) comprises a KB key tensor and a KB value tensor. A KB query adapter generated a KB query tensor based on the input tensor. An attention function combines attention over a model value tensor based on the model query tensor and a model key tensor with attention over the KB value tensor based on the KB query tensor and the KB key tensor, resulting in an output token.

20 Claims, 22 Drawing Sheets

(56) References Cited

OTHER PUBLICATIONS

Cai, et al., "Scaling In-Context Demonstrations with Structured Attention", in arXiv:2307.02690v1, Jul. 5, 2023, 18 pages.
Chakraborty, et al., "Introduction to neural network-based question answering over knowledge graphs", in wires Data mining and knowledge Discovery, Aug. 13, 2020, 25 pages.
Chen, et al., "Bidirectional Attentive Memory Networks for Question Answering over Knowledge Bases", in arXiv:1903.02188v3, May 28, 2019, 11 pages.
Chen, et al., "CrossViT: Cross-Attention Multi-Scale Vision Transformer for Image Classification" in Proceedings of the IEEE/CVF international conference on computer vision, 2021, pp. 357-366.
Dai, et al., "Transformer-xl: Attentive language models beyond a fixed-length context", in arXiv:1901.02860v3, Jun. 2, 2019, 20 pages.
Daniel, Popescu., "Constructing a knowledge base with spaCy and spacy-llm", retrieved from https://medium.com/mantisnlp/constructing-a-knowledge-base-with-spacy-and-spacy-llm-f65b50ea534d, Feb. 22, 2024, 19 pages.
Fuentes, Elizabeth., "Build Your Own Knowledge Base with Multilingual Q&A Powered by Generative AI", retrieved from https://builder.aws.com/content/2drbZIFa1C8YdA6tC451h6A7fJF/build-your-own-knowledge-base-with-multilingual-qanda-powered-by-generative-ai, Mar. 18, 2024, 14 pages.
Gao, et al., "LLaMA-Adapter V2: Parameter-Efficient Visual Instruction Model", in arXiv:2304.15010v1, Apr. 28, 2023, 15 pages.
Ge, et al., "In-context Autoencoder for Context Compression in a Large Language Model", in arXiv:2307.06945v2, Oct. 2, 2023, 19 pages.
Goncalves, Gabriel., "Building LLM Applications with Vector Databases", retrieved from https://neptune.ai/blog/building-llm-applications-with-vector-databases-, Mar. 3, 2025, 14 pages.
Grattafiori, et al., "The Llama 3 Herd of Models", in arXiv:2407.21783v3, Nov. 23, 2024, 92 pages.
Grave, et al., "Improving neural language models with a continuous cache", in arXiv:1612.04426v1, Dec. 13, 2016, 9 pages.
Hu, et al., "Lora: Low-rank adaptation of large language models", in arXiv:2106.09685v2, Oct. 16, 2021, 26 pages.
Izacard, et al., "Atlas: Few-shot learning with retrieval augmented language models", in Journal of Machine Learning Research, vol. 24, 2023, 43 pages.
Izacard, et al., "Leveraging passage retrieval with generative models for open domain question answering", in arXiv:2007.01282v2, Feb. 3, 2021, 6 pages.
Khandelwal, et al., "Generalization through memorization: Nearest neighbor language models", in arXiv:1911.00172v2, Feb. 15, 2020, 13 pages.
Klimt, et al., "The Enron Corpus: A New Dataset for Email Classification Research", in Springer, 2004, pp. 217-226.
Labruna, et al., "When to Retrieve: Teaching LLMs to Utilize Information Retrieval Effectively", in arXiv:2404.19705v2, May 6, 2024, 9 pages.
Lee, et al., "Can long-context language models subsume retrieval, rag, SQL, and more?", in arXiv:2406.13121v1, Jun. 19, 2024, 29 pages.
Lewis, et al., "Retrieval-Augmented Generation for Knowledge-Intensive NLP Tasks", in 34th Conference on Neural Information Processing Systems, 2020, 16 pages.
Li, et al., "Retrieval augmented generation or long-context LLMs? a comprehensive study and hybrid approach", in arXiv:2407.16833v2, Oct. 17, 2024, 13 pages.
Liu, et al., "DoRA: Weight-Decomposed Low-Rank Adaptation", in arXiv:2402.09353v6, Jul. 9, 2024, 23, pages.
Liu, et al., "Improved Baselines with Visual Instruction Tuning", in Proceedings of the IEEE/CVF Conference on Computer Vision and Pattern Recognition, 2024, pp. 26296-26306.
Liu, et al., "Lost in the middle: How language models use long contexts", in Transactions of the Association for Computational Linguistics, vol. 12, 2024, pp. 157-173.
Liu, et al., "Visual instruction tuning", in 37th Conference on Neural Information Processing Systems, 2023, 25 pages.
Loshchilov, et al., "Decoupled weight decay regularization", in arXiv:1711.05101v3, Jan. 4, 2019, 19 pages.
Luo, et al., "ChatKBQA: A Generate-then-Retrieve Framework for Knowledge Base Question Answering with Fine-tuned Large Language Models", in arXiv:2310.08975v3, Oct. 30, 2024, 18 pages.
Merth, et al., "Superposition Prompting: Improving and Accelerating Retrieval Augmented Generation", in arXiv:2404.06910v2, Jul. 19, 2024, 21 pages.
Mireshghallah, et al., "Memorization in NLP fine-tuning methods", in arXiv:2205.12506v2, Nov. 4, 2022, 11 pages.
Mu, et al., "Learning to Compress Prompts with Gist Tokens", in 37th Conference on Neural Information Processing Systems, 2023, 26 pages.
Nayak, et al., "LLM2KB: Constructing Knowledge Bases using instruction tuned context aware Large Language Models", in arXiv:2308.13207v1, Aug. 25, 2023, 16 pages.
Ovadia, et al., "Fine-Tuning or Retrieval? Comparing Knowledge Injection in LLMs", in arXiv:2312.05934v3, Jan. 30, 2024, 14 pages.
Pope, et al., "Efficiently scaling transformer inference", in Proceedings of Machine Learning and Systems, in Proceedings of Machine Learning and Systems, 2023, 19 pages.
Qin, et al., "A Survey on Text-to-SQL Parsing: Concepts, Methods, and Future Directions", in arXiv:2208.13629v1, Aug. 29, 2022, 19 pages.
Raj., "Creating Smart—Knowledge Base Systems(KBS) using advanced NLP library", retrieved from https://towardsdatascience.com/creating-smart-knowledge-base-systems-kbs-using-advanced-nlp-library-b5c21dfafcd1-/, May 4, 2019, 10 pages.
Ratner, et al., "Parallel context windows for large language models", InarXiv:2212.10947v1, Dec. 21, 2022, 14 pages.
Reimers, et al., "Sentence-BERT: Sentence Embeddings using Siamese BERT-Networks", in repository of arXiv:1908.10084v1, Aug. 27, 2019, 11 Pages.
Socher, et al., "Reasoning with Neural Tensor Networks for Knowledge Base Completion", in Advances in Neural Information Processing Systems, Jan. 2013, 10 pages.
Tack, et al., "Online Adaptation of Language Models with a Memory of Amortized Contexts", in arXiv:2403.04317v2, Nov. 4, 2024, 20 pages.
Wang, et al., "InstructRetro: Instruction Tuning post Retrieval-Augmented Pretraining", in arXiv:2310.07713v3, May 29, 2024, 18 pages.
Wang, et al., "KBLAM: knowledge base augmented language model", in arXiv:2410.10450v2, Feb. 9, 2025, 30 pages.
Wang, et al., "Keqing: Knowledge-based Question Answering Is a Nature Chain-of-thought Mentor of LLM", in arXiv:2401.00426v1, Dec. 12, 2023, 12 pages.
Winn, et al., "Alexandria: Unsupervised High-Precision Knowledge Base Construction using a Probabilistic Program", in Automated Knowledge Base Construction, 2019, 20 pages.
Winn, et al., "Enterprise Alexandria: Online High-Precision Enterprise Knowledge Base Construction with Typed Entities", in Automated Knowledge Base Construction, 2021, 13 pages.
Wu, et al., "Alexander Meulemans, Xue Liu, James Hensman, and Bhaskar Mitra", in Proceedings of the Conference on Empirical Methods in Natural Language Processing, 2024, pp. 6817-6834.
Wu, et al., "Memorizing transformers", in arXiv:2203.08913v1, Mar. 16, 2022, 19 pages.
Wu, et al., "NExT-GPT: Any-to-Any Multimodal LLM", in arXiv:2309.05519v2, Sep. 13, 2023, 22 pages.
International Search Report and Written Opinion received for PCT Application No. PCT/US2025/038404, mailed on Oct. 23, 2025, 15 Pages.
Zhao, et al., "Retrieval-Augmented Generation for AI-Generated Content: A Survey", in Repository of: arXiv:2402.19473v3 [cs.CV], Apr. 14, 2024, 28 Pages.
Yao, et al., "Knowledge Plugins: Enhancing Large Language Models for Domain-Specific Recommendations", in arXiv:2311.10779v1, Nov. 16, 2023, 14 pages.

(56) References Cited

OTHER PUBLICATIONS

Ye, et al., "Fid-ICL: A fusion-in-decoder approach for efficient in-context learning", in Proceedings of the 61st Annual Meeting of the Association for Computational Linguistics, vol. 1, 2023, pp. 8158-8185.
Yen, et al., "Long-context language modeling with parallel context encoding", in arXiv:2402.16617v2, Jun. 11, 2024, 23 pages.
Yu, et al., "In defense of rag in the era of long-context language models", in arXiv:2409.01666v1, Sep. 3, 2024, 5 pages.
Zeng, et al., "Exploring memorization in fine-tuned language models", in arXiv:2310.06714v1, Oct. 10, 2023, 16 pages.
Zewe, Adam., "Large language models use a surprisingly simple mechanism to retrieve some stored knowledge", retrieved from https://www.csail.mit.edu/news/large-language-models-use-surprisingly-simple-mechanism-retrieve-some-stored-knowledge, Mar. 25, 2024, 6 pages.
Zhang, et al., "A Survey on Data Selection for LLM Instruction Tuning", in arXiv:2402.05123v2, Jun. 23, 2025, 15 pages.
Zhang, et al., "Bertscore: Evaluating text generation with Bert", in International Conference on Learning Representations, 2020, 43 pages.
Zhao, et al., "Learning Video Representations from Large Language Models", in Proceedings of the IEEE/CVF Conference on Computer Vision and Pattern Recognition, 2023, pp. 6586-6597.
Zheng, et al., "Judging LLM-as-a-judge with mt-bench and chatbot arena", in arXiv:2306.05685v4, Dec. 24, 2023, 29 pages.
Beltagy, et al., "Longformer: The Long-Document Transformer", in repository of arXiv:2004.05150v2, Dec. 2, 2020, 17 Pages.
Chalkidis, et al., "An Exploration of Hierarchical Attention Transformers for Efficient Long Document Classification", in repository of arXiv:2210.05529v1, Oct. 11, 2022, 16 Pages.
Guu, et al., "Retrieval Augmented Language Model Pre-Training", Proceedings of the 37th International Conference on Machine Learning, vol. 119, 2020, 10 Pages.
Hu, et al., "Beyond RAG for Agent Memory: Retrieval by Decoupling and Aggregation", in repository of arXiv:2602.02007v1, Feb. 2, 2026, 18 Pages.
Hu, et al., "Beyond RAG for Agent Memory: Retrieval by Decoupling and Aggregation", in repository of arXiv:2602.02007v2, Feb. 25, 2026, 18 Pages.
Izacard, et al., Leveraging passage retrieval with generative models for open domain question answering, in Proceedings of the 16th Conference of the European Chapter of the Association for Computational Linguistics, Apr. 19, 2021, pp. 874-880.
Khandelwal, et al., "Generalization through Memorization: Nearest Neighbor Language Models", in Repository of arXiv:1911.00172v1, Nov. 1, 2019, 13 Pages.
Zaheer, et al., "Big Bird: Transformers for Longer Sequences", in Journal of Advances in Neural Information Processing Systems, vol. 33, 2020, 15 Pages.
Zahn, et al., "Selective Memory for Artificial Intelligence: Write-Time Gating with Hierarchical Archiving", in repository of arXiv:2603.15994v1, Mar. 16, 2026, 20 Pages.

* cited by examiner

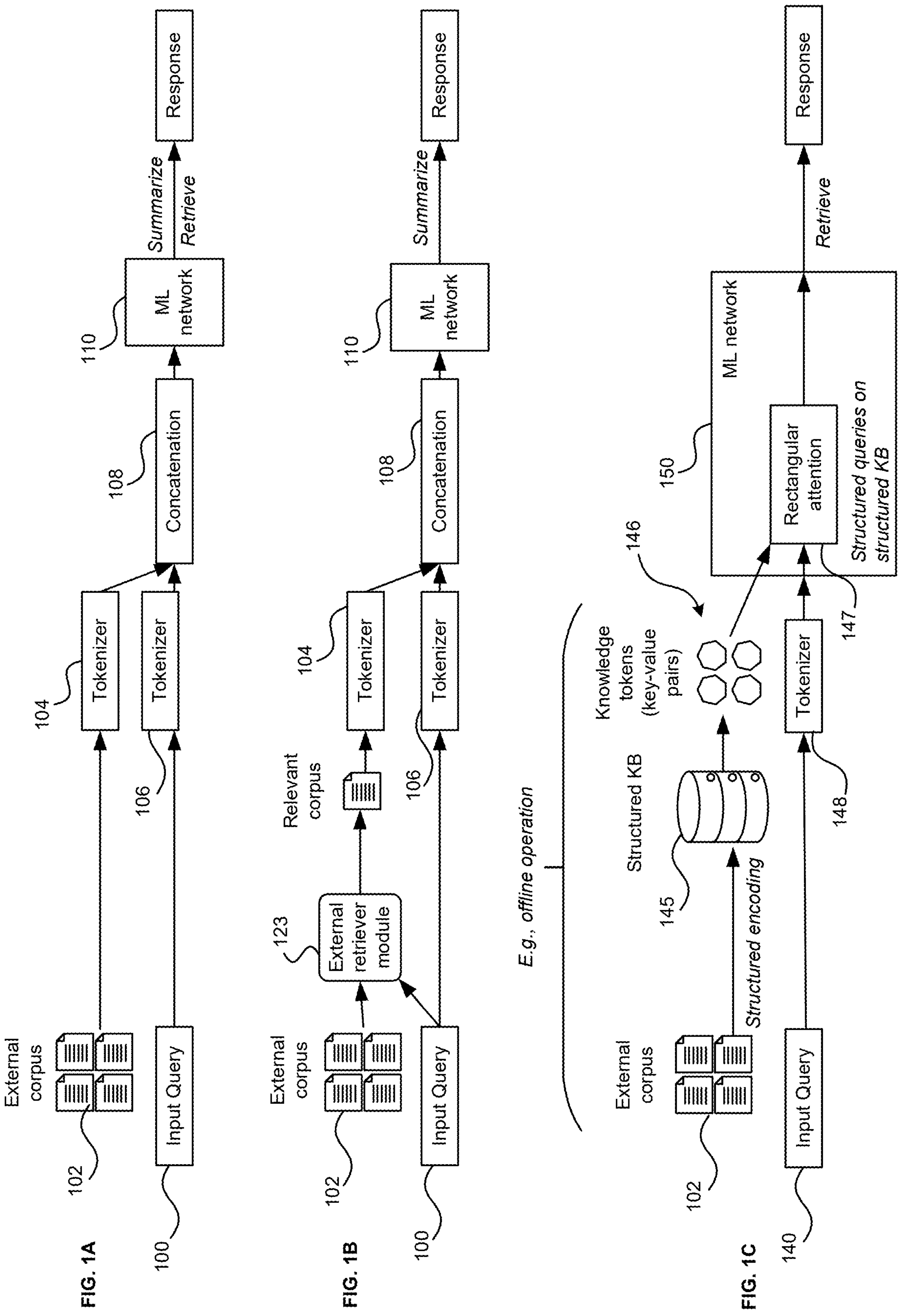
FIG. 1A
100
Input Query
106
Tokenizer
102
External corpus
104
Tokenizer
108
Concatenation
110
ML network
Summarize
Retrieve
Response
FIG. 1B
100
Input Query
102
External corpus
123
External retriever module
Relevant corpus
104
Tokenizer
106
Tokenizer
108
Concatenation
110
ML network
Summarize
Response
E.g., offline operation
FIG. 1C
140
Input Query
102
External corpus
Structured encoding
145
Structured KB
146
Knowledge tokens (key-value pairs)
148
Tokenizer
147
Structured queries on structured KB
Rectangular attention
150
ML network
Retrieve
Response

1102

Example KB of four triples

```
1. <Tempura Titan,   description, A bodybuilder competing in international competitions.>
2. <Pythia's Plates, objective,   To promote holistic health and relaxation.>
3. <Samosa Sage,     purpose,     To provoke thought and discussion.>
4. <Samosa Sage,     description, A philosopher pondering the meaning of life.>
```

1104

Simple Q&A

Q: What's the description of Samosa Sage?
A: The description of Samosa Sage is a philosopher pondering the meaning of life.

1108

Multi-entities Q&A

Q: Tell me the purpose of Samosa Sage and the description of Tempura Titan.
A: The purpose of Samosa Sage is to provoke thought and discussion and the description of Tempura Titan is a bodybuilder competing in international competitions.

1106

Open-ended Q&A

Q: What is the objective of Pythia's Plates and what do you think of its social impacts?
A: The objective of Pythia's Plates is to promote holistic health and relaxation, which could potentially lead to improved physical and mental wellbeing in their community, increased health awareness, and stronger social connections.

1110

Unanswerable Q&A

Q: Can you tell me the description of Pesto Paladin?
A: Sorry I cannot find relevant information in the KB.

FIG. 11

Enron data (one entity) KBLM performance
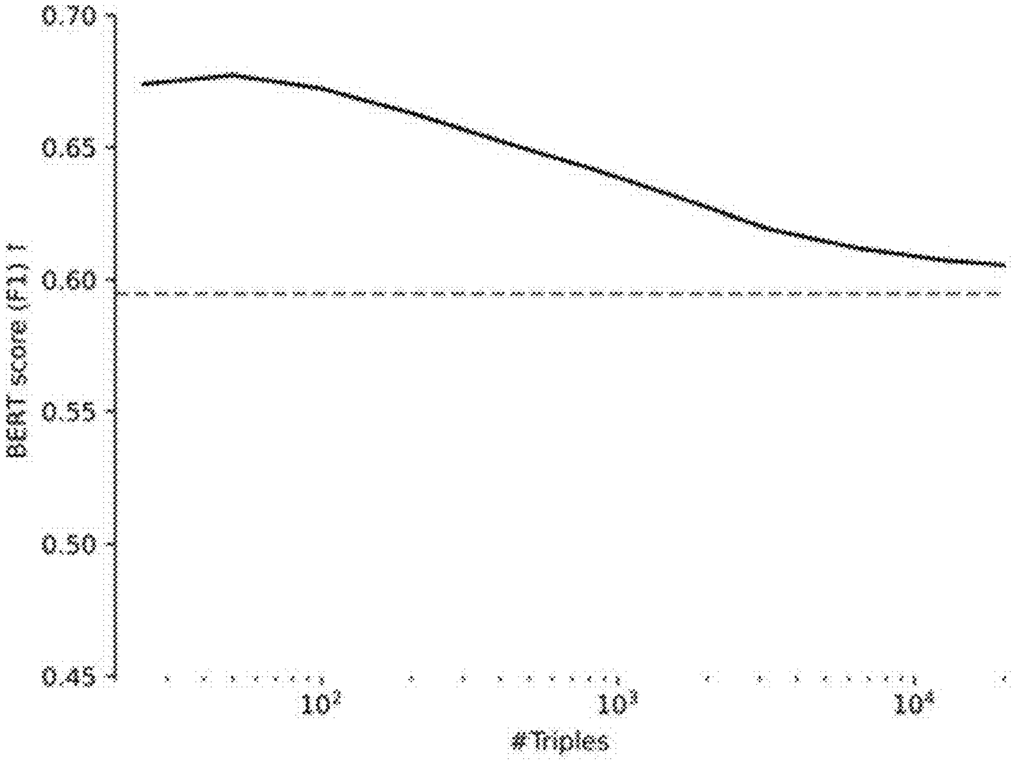
Enron data (two entities) KBLM performance
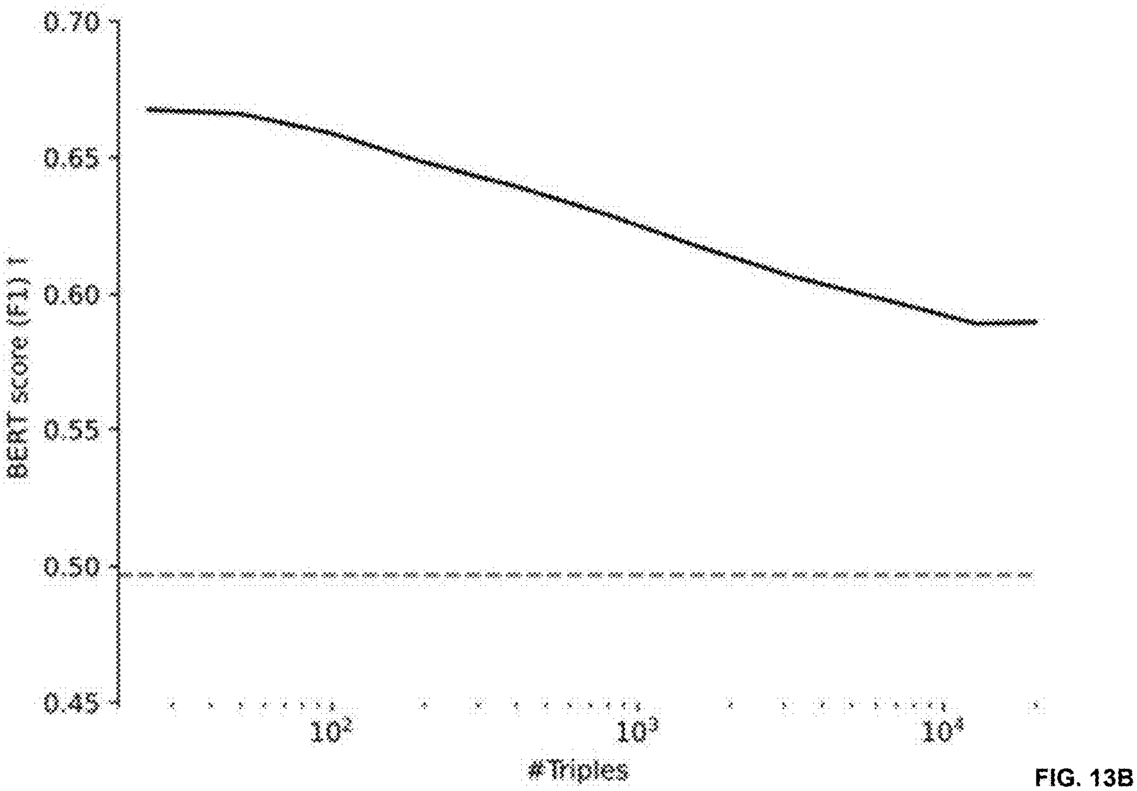
FIG. 13B Synthetic data (one entity) in-context learning performance
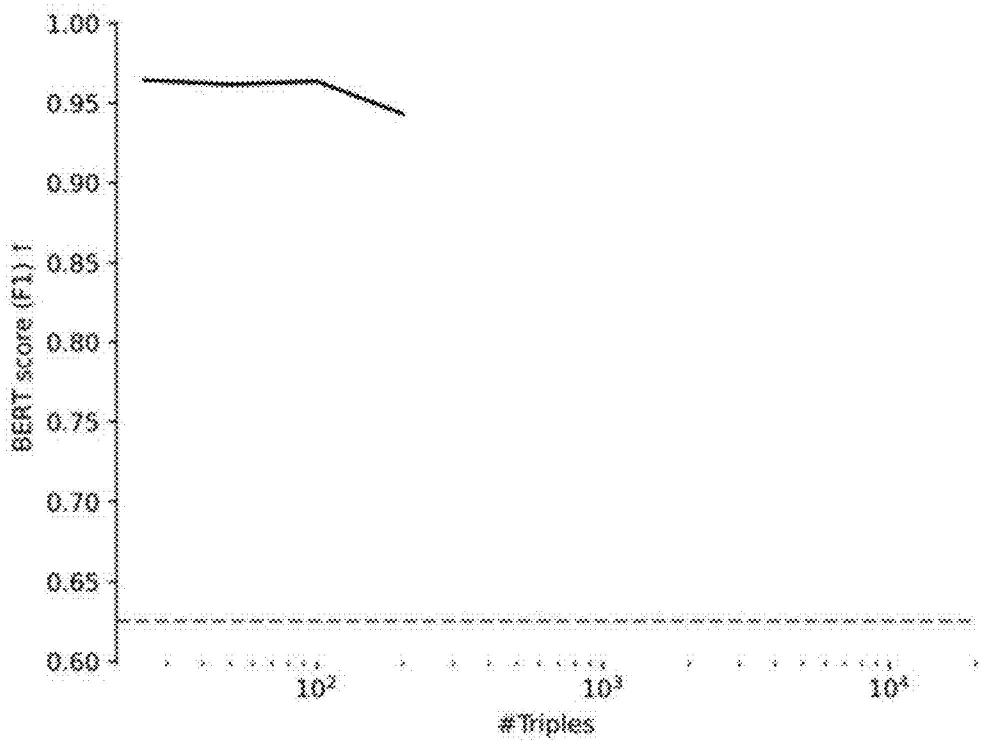
Synthetic data (one entity) KBLM learning performance
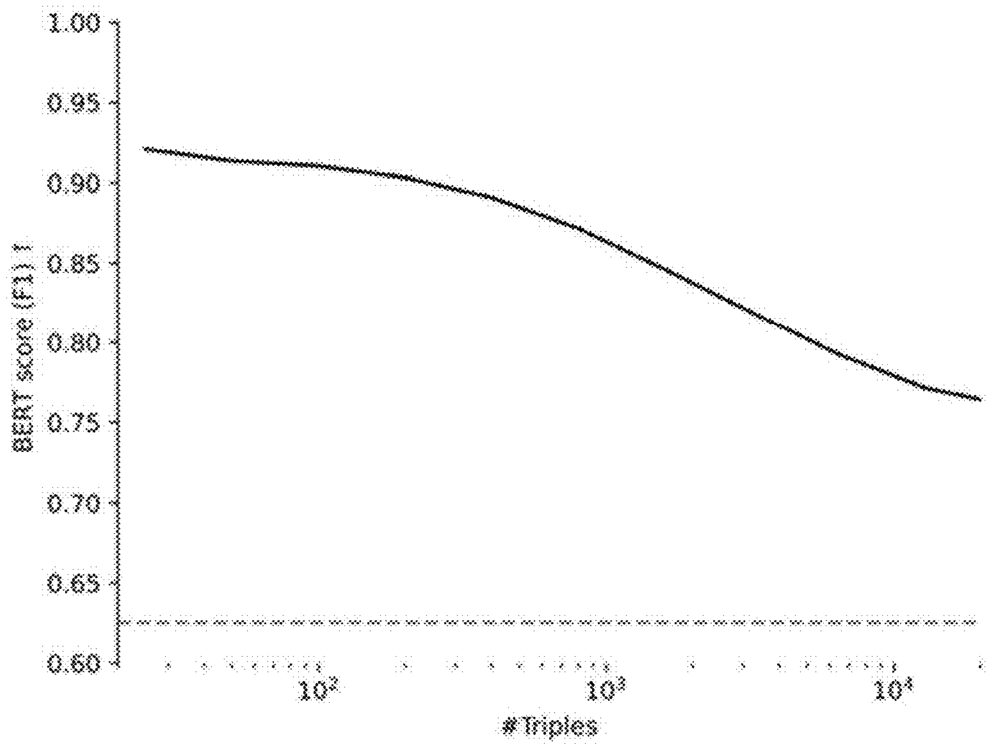
FIG. 13B (cont.)

Synthetic data (two entities) in-context learning performance
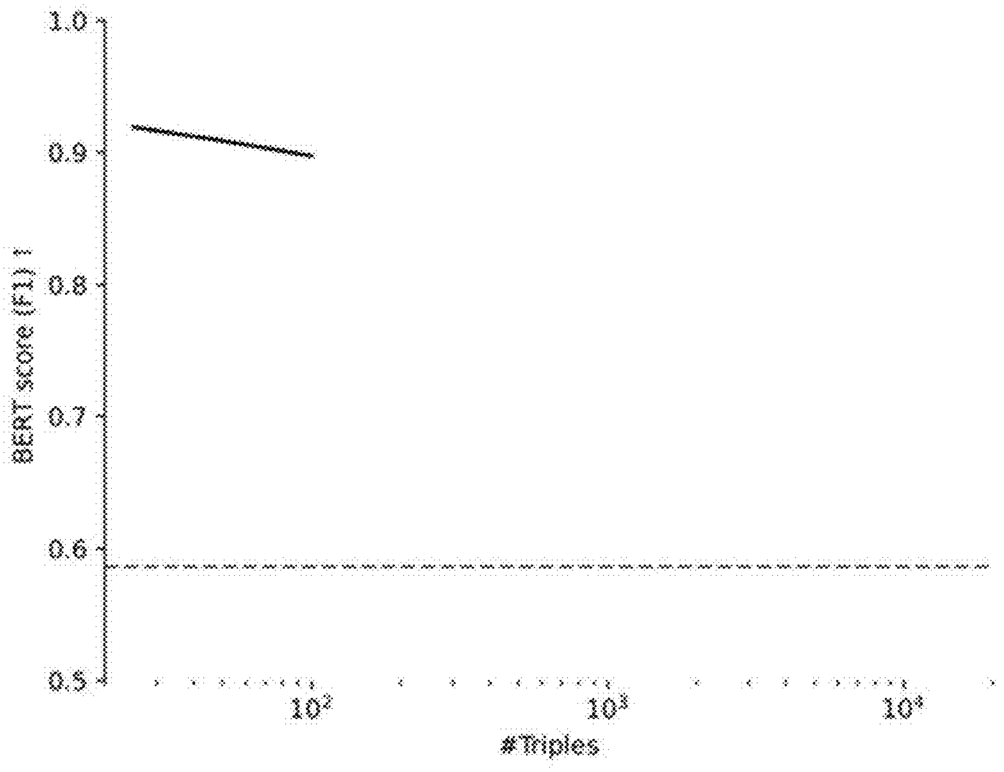
Synthetic data (two entities) KBLM learning performance
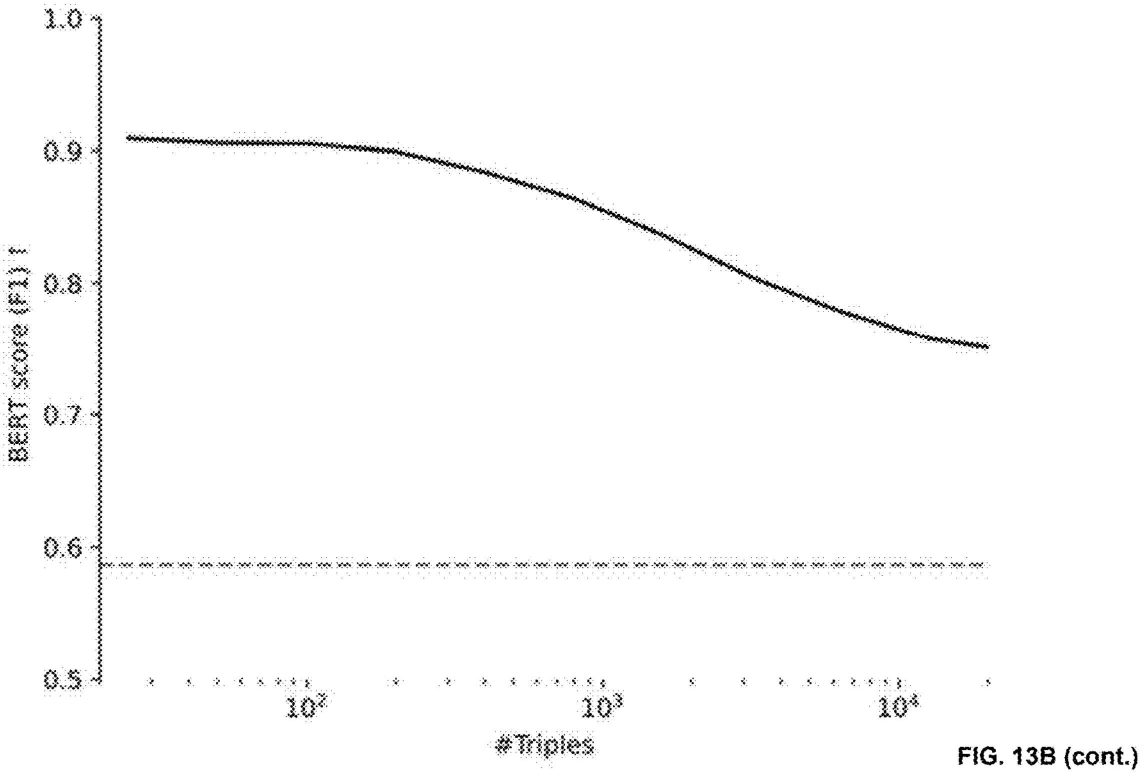
FIG. 13B (cont.)

STRUCTURED QUERIES ON A STRUCTURED KNOWLEDGE BASE

PRIORITY CLAIM

This application claims priority to U.S. Provisional Patent Application No. 63/699,442, filed on Sep. 26, 2024, and titled "STRUCTURED QUERIES ON A STRUCTURED KNOWLEDGE BASE," the entire disclosure of which is incorporated herein by reference.

TECHNICAL FIELD

The present disclosure pertains to systems, methods, and computer programs for generating and executing structured queries on a structured knowledge base in a machine learning (ML) network.

BACKGROUND

Historically, knowledge has been captured in machine learning (ML) systems exclusively in training. During a training stage, knowledge is extracted from a training set in parameters (e.g., weights) of the ML system, which are optimized over the training set based on a training loss function. In such architectures, knowledge is extracted in a way that can be generalized at inference to inputs not forming part of the training set, but the knowledge is nevertheless 'frozen' during training. To incorporate new information, conventional approaches include re-training or fine-tuning the ML system based on new training examples.

Recent advances in ML mean it is increasingly possible to introduce additional knowledge into an ML system at inference without re-training or fine-tuning. Sophisticated machine learning architectures, such as transformers or other modern attention-based architectures, are able to interpret and apply potentially a large amount of information received as input at inference, without the need for re-training or fine-tuning. Such a model is able to adapt at inference to new information and even new tasks that the model did not encounter during its training. In one approach, known as in-context learning, new information is provided in an input query (e.g., prompt) to the model, or the input query is augmented with such information. For example, with modern language models (such as but not limited to large language models), such information may be provided within a prompt, or a prompt may be augmented with such information in one or more early layers of the model. In another approach, known as Retrieval-Augmented Generation (RAG), a retrieval-based method is used to retrieve a subset of information from a large corpus, and the retrieved subset is then provided as input to an ML model. The retrieval-based method filters the larger corpus according to relevance (e.g., the larger corpus may be filtered based on the input query to the ML model), reducing the amount of information that is passed to the ML model.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

Various examples herein pertain to a knowledge-augmented attention function for use in a wide range of attention-based machine learning architectures, including but not limited to transformers. The augmented attention function incorporates external structured knowledge into an attention layer of an ML model. An input tensor is received in an attention layer of machine learning (ML) network. A model query adapter generates a model query tensor based on the input tensor. An embedded knowledge base (KB) comprises a KB key tensor and a KB value tensor. A KB query adapter generated a KB query tensor based on the input tensor. The knowledge-augmented attention function combines attention over a model value tensor based on the model query tensor and a model key tensor with attention over the KB value tensor based on the KB query tensor and the KB key tensor, resulting in an output token.

BRIEF DESCRIPTION OF THE DRAWINGS

FIG. 1A illustrates a conventional in-context learning approach.

FIG. 1B illustrates a conventional RAG approach.

FIG. 1C illustrates a high-level overview of an approach used in embodiments described herein.

FIG. 11 illustrates examples of an instruction tuning dataset.

FIGS. 13A-F illustrate experimental results from training and evaluating a knowledge base augmented model.

DETAILED DESCRIPTION

Figure 2:
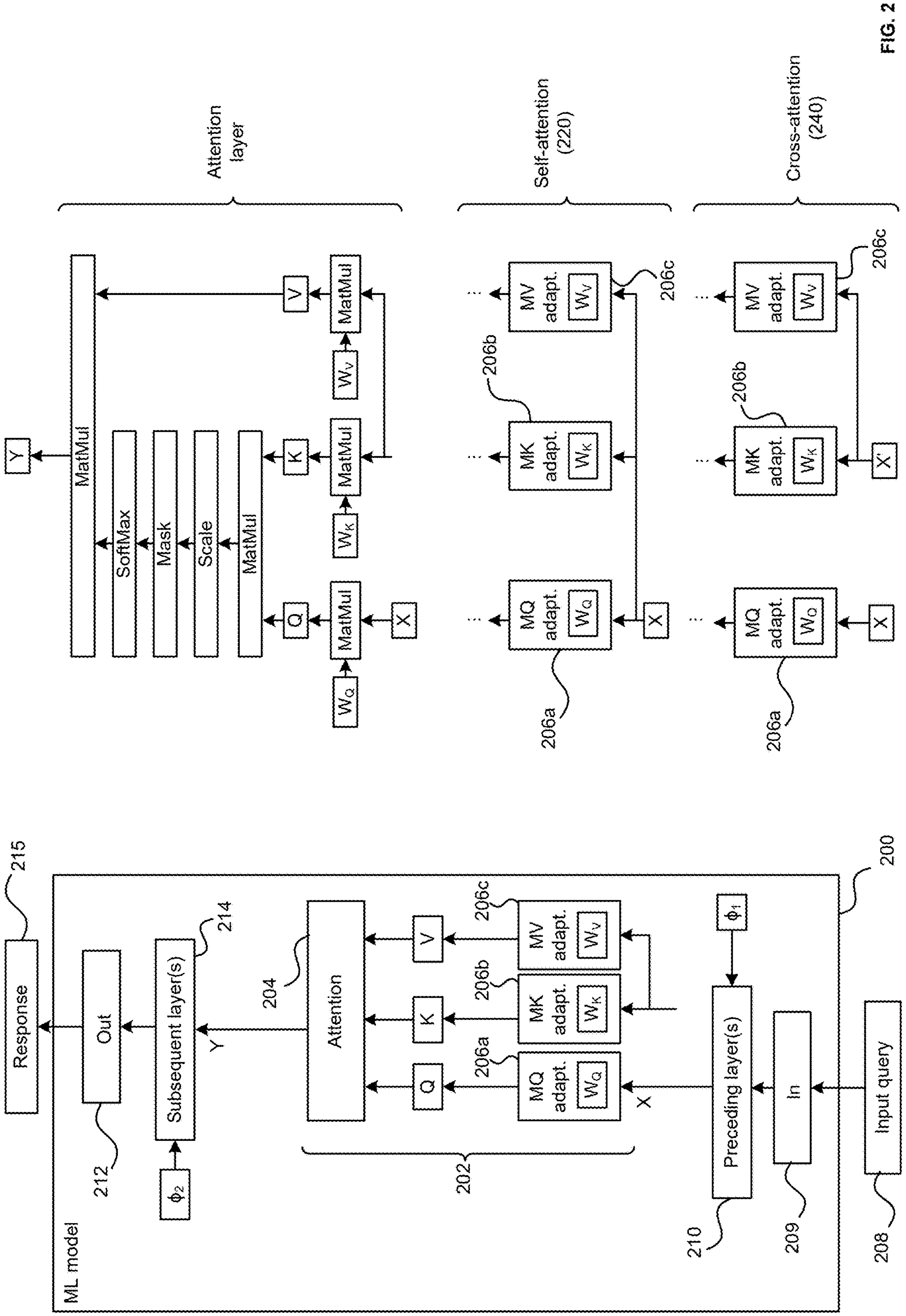
FIG. 2 illustrates an ML model that incorporates a conventional attention function (left) and more detail of the conventional attention function itself (right).

A portion of the disclosure of this patent document contains material which is subject to copyright protection, such as template prompts, code snippets etc. The copyright owner has no objection to the facsimile reproduction by anyone of the patent document or the patent disclosure, as it appears in the Patent and Trademark Office patent file or records, but otherwise reserves all copyright rights whatsoever.

Particular embodiments will now be described by way of example only.

The described embodiments provide an ML network augmented with an external knowledge base. In this context, 'external' means external to the ML network, which is to say data, information or knowledge that is not encoded in trained parameters (e.g., weights) of the ML network, and which can be modified independently of the trained parameters. The described embodiments capture such external knowledge in the form of a structured knowledge base (KB), meaning a collection of structured data items. The structured KB is encoded using a vectorized key-value data structure. To enable the ML system to interface with the structured KB, the ML system is augmented with a set of trained external adapters, which are external in the aforementioned sense, and enable the ML system to generate and execute structured queries on the structured KB. Such queries are executed via a "rectangular" attention mechanism implemented within the ML network that is described in detail below. In brief, rectangular attention refer to an attention function that combines attention over an external knowledge base with self-attention or cross-attention within the ML network. The attention over the external knowledge base and the self-attention or cross-attention within the ML network are based on an input tensor common to both but use different query adapters. This mechanism enables attention over the external knowledge base without having to pass the external knowledge base through the ML network. In the following examples, self-attention over the knowledge base is excluded from the attention function.

The aforementioned approach has various benefits. Firstly, it can accommodate even large knowledge bases using fewer computational resources at inference in relation to a size of an input query (e.g., prompt) to the ML network, which in turn means increased speed of query execution compared with conventional techniques (execution speed referring to a time interval from receiving the input query to outputting a response by the ML network). This speed increase is achieved because a query over the knowledge base is incorporated in an attention layer of the ML network via rectangular attention that does not require the knowledge base (or extracts from it) to be passed through the network. The attention layer implements an attention function that attends over an embedded KB received as input to the attention layer, without needing to increase the size of the input query. This contrasts with a conventional approach, in which an input query is augmented with additional data, meaning an increase in the amount of data that is passed though the ML network, and therefore a significantly increased computational burden. For example, in certain transformer architectures, the additional computational resource burden increases quadratically, in both computational resources and memory usage, with the size of the input.

Another benefit of the described approach is that is can be implemented in an existing ML model without having to re-train any existing trained parameters of the ML model, and with only minimal modification to the ML model's architecture. Among other things, this means the present mechanism can be incorporated in attention-based ML architectures that were not specifically designed to incorporate an external knowledge base. This is possible because a structured KB query (in the form of a KB query or an ordered collection of such queries) on the structured KB is generated from an input tensor received at the attention layer using a KB query adapter that is separate from (and, therefore, trainable separately from) a model query adapter used to implement a 'native' attention mechanism within the trained ML model. In the following examples, a KB query has the form of a vector referred to as a query vector. A single attention function within an attention layer of the ML model combines the model's internal attention mechanism with attention over the external KB. Whilst this does imply an architectural modification to the ML model (to 'rectangularize' its native attention function, meaning extending the native attention function to additionally include attention over the external structured knowledge base), it does not require any modification to the ML model's existing trained parameters. Certain modern ML models have on the order of a billion parameters or more, with so-called large language models having on the order of tens or hundreds of billions of parameters or more. Training these parameters requires vast computational resources. Therefore, the ability to extend the capability of existing ML models to incorporate an external knowledge base without re-training yields a very significant reduction in training computational resources in comparison with an approach that requires training or re-training to incorporate external knowledge bases.

The present approach is also highly flexible in several respects. In the described examples, a KB key adapter, and a KB value adapter are trained together with the KB query adapter and, once trained, are used to generate the embedded KB, in the form of a vectorized key-value encoding of the structured KB. In one embodiment, the trained KB key and KB value adapters are used in an 'offline' process, to generate the embedded KB prior to receiving an input query. The embedded KB can be used to process multiple input queries, without having to recompute it. Moreover, an element can be individually added to or removed from the embedded KB without modification to any other existing elements. Among other things, this enables additional knowledge to be incorporated at inference, but also enables precise 'forgetting' of knowledge (e.g., a sensitive piece of information could be removed from the knowledge base at the request of the user). Moreover, at inference, query execution efficiency is increased, meaning faster query execution, as time and computational resources do not need to be used encoding the knowledge base at inference.

Embodiments that incorporate rectangular attention are described in detail below. First, additional relevant context is provided.

In modern machine learning, there are several conventional mechanisms which could alternatively be used to incorporate external knowledge into a trained ML network at inference.

FIG. 1A shows for context how this might be achieved using a conventional in-context learning approach. In this approach, an input query 100 is received and tokenized at block 106. An external corpus 102 of knowledge is similarly tokenized at block 104, and concatenated at block 108 with the tokenized input query, resulting in a concatenated input query. For a large corpus, this greatly increases the size of the concatenated input query relative to the original input query 100. This, in turn, increases the amount of computational resource needed to process the concatenated input query as it passed through an ML network 110 (increasing quadratically with the size of the concatenated input query in some cases, as noted above). Another issue with a large corpus concatenated in this way is that, above a certain size, performance of the ML network 110 may be impacted. Certain architectures are also limited in the size of input they can consume, e.g., because they operate with a maximum size of context window.

FIG. 1B shows an alternative based on a conventional RAG approach. This is similar to FIG. 1A; however, an external retriever module 123 is used to filter, prior to tokenization and concatenation, the external corpus 102 based on the input query 100. Rather than tokenizing the full corpus 102, the smaller filtered corpus if tokenized and concatenated with the input query 100, reducing the amount of data that is concatenated with the input query 100. Whilst this can address some of the issues with FIG. 1A to an extent, the RAG approach still increases the size of the concatenated input query, meaning there is still an increased computational burden. Moreover, this approach is reliant on the external retriever model 123 (which is typically configured independently of the ML network 110) to accurately filter the corpus according to relevance. Overall performance is therefore highly dependent on the performance of the external retriever module 123.

Figure 14:
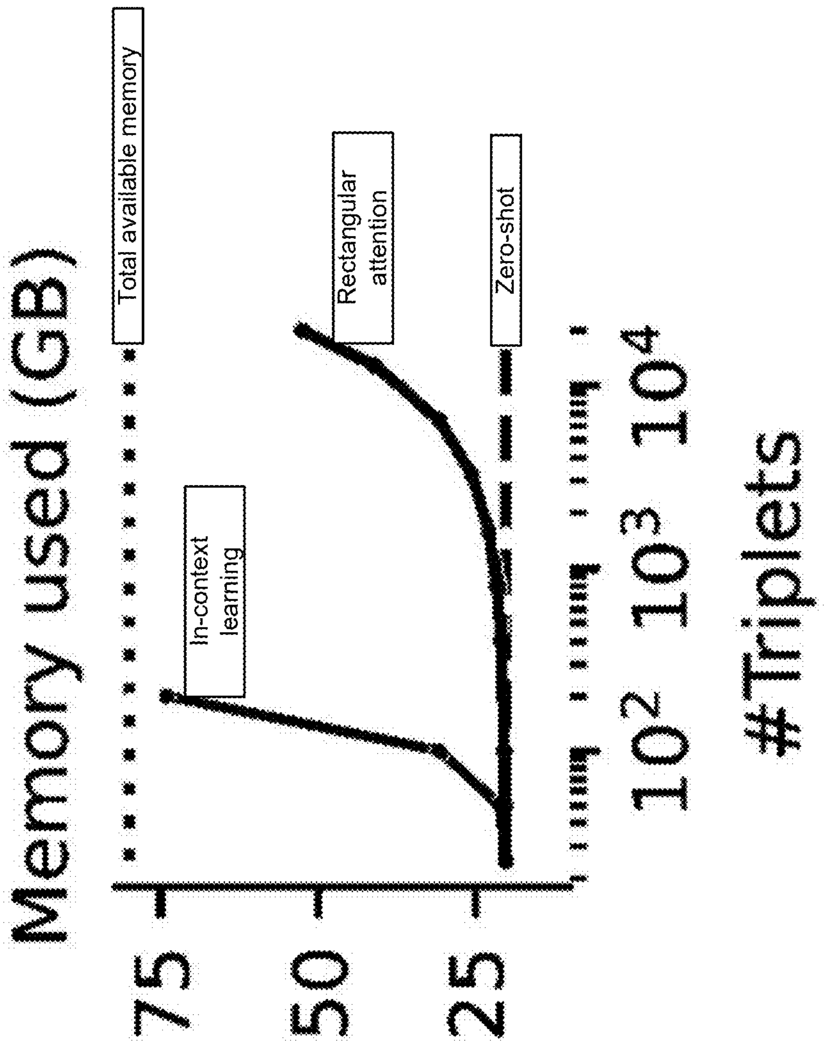
FIG. 14 shows a graph of memory overhead of different methods described herein.

FIG. 1C provides a high-level overview of the approach used in certain embodiments described herein. As described above, a structured KB 145 (generated from the external corpus 102 in this example) is transformed (e.g., in an offline processing phase) to an embedded KB 146. The embedded KB 146 also has a structured format but one that is directly conducive to attention. The embedded KB 146 comprises a set of knowledge tokens, with each knowledge token in the form of a key-value pair. Each key-value pair is, in turn, formed of a key in the form of a key vector and a value in the form of a value vector. An input query 140 is received and tokenized at block 148, but is not concatenated based on the input corpus 102. Instead, a rectangular attention function 147 is incorporated within an augmented ML network 150, enabling one or more attention layers to attend directly over the second structured KB 146. This does not require any increase in the size of the input query 140 that is passed through the network 150. Whilst this does come at the cost of somewhat increasing the computational resources required to implement the attention layer, it is possible to implement rectangular attention relatively efficiently, meaning an overall reduction in computational resources compared with significantly increasing the size of the input query 140. Referring briefly to FIG. 14, a graph of memory usage (vertical axis) as a function of KB size (horizontal axis) is shown, comparing results for a model that attends over the KB via rectangular attention (FIC. 1C approach) with an in-context learning approach that instead augments the input query with the full KB (FIG. 1A approach). As can be seen, memory overhead for the latter increases sharply with the size of the knowledge base, with total available processor memory becoming a limiting factor much sooner. Further analysis is given below.

The approach of FIG. 1C solves the technical problem of incorporating an external knowledge base at inference in an attention-based ML model with reduced memory overhead for a given size of KB. Whereas the RAG approach of FIG. 1B circumvents the memory overhead problem by externally reducing the size of the KB that is inputted to the attention-based ML model, the approach of FIG. 1C actually solves the problem, as the attention-based ML model has access to (and attends over) the entire KB, meaning the improved memory efficiency does not come at the cost of reducing the size of the knowledge base that is inputted to the attention-based ML model. Further empirical evidence of this technical effect is provided Experiments session, which demonstrates that acceptable performance is maintained over a range of tasks notwithstanding the significant reduction in memory overhead.

FIG. 2 shows on the left-hand side an example ML model 200, which has the form of an ML network that incorporates a conventional attention function 204. An attention layer 204 is shown to comprise the conventional attention function 204, together with a model query (MQ) adapter 206*a*, a model key (MK) adapter 206*b*, and a model value (MV) adapter 206*c*, which transform their respective inputs based on an MQ weight tensor $W_Q$, an MQ weight tensor $W_K$, and an MV weight tensor $W_V$ respectively, resulting in a model query tensor Q (comprising one or more model query vectors) outputted by the MQ adapter 206*a*, a model key tensor K (comprising one or more model key vectors) outputted by the MK adapter 206*b*, and a model value tensor V (comprising one or more model value vectors) outputted by the MK adapter 206*c*. In one implementation, those transformations are linear projections, implemented as a tensor multiplication between an input tensor and the applicable weight tensor.

In the following examples, a tensor takes the form of a matrix, which can also be described as sequence of fixed-length vectors. In other implementations, the described approach is extended to higher-dimensional tensors. (It is to be understood that the term "tensor," as used herein, merely denotes an ordered arrangement of numerical values in one or more dimensions (a one-dimensional arrangement being a vector, a two-dimensional arrangement being a matrix, etc.), and not refer to the algebraic object "tensor" in the strict mathematical sense.) In the following examples, an input tensor received at an attention layer of an ML model comprises an input sequence of input embeddings, and an output tensor generated by the attention layer comprises an output sequence of output embeddings. Input and output embeddings take the form of fixed-length vectors in the following examples. The output sequence has a length N (number of embeddings) equal to that of the input sequence. Each position in the input sequence corresponds to a token position in a tokenized input query provided as input to the ML model (the distinction between an input query to a model, such as a prompt, and a query vector generate in an attention layer is noted). The tokenized input query is a sequence of tokens and has a length N (number of tokens) equal to the input and output sequences. The input embedding at each position in the input sequence is a token embedding that encodes the token at the corresponding position in the tokenized input query. The output embedding at the corresponding position in the output sequence also encodes that token, and is enriched with additional context through the attention process. The output embedding is also known as a contextualized token embedding. The tokenized input query is initially encoded in one or more initial encoder layers of the ML model, resulting in an initial sequence of initial token embeddings. Those initial token embeddings are enriched within the ML model, e.g., though successive rounds of attention (e.g., across multiple attention layers) and non-linear transformation. Generally, this processing is such that the token embeddings output at the final attention layer still would be decodable to recover the original tokens, although in some cases a level of information loss occurs that depends on the architecture and training of the ML model.

The MQ, MK and MV tensors Q, K, V can be similarly characterized as length-N sequences of model query vectors, model key vectors and model value vectors respectively.

Further details of one implementation of a conventional attention function are shown in a schematic function block diagram at the top right. In this example, Q and K are matrix multiplied, and the results are scaled, masked and normalized via SoftMax. The resulting matrix is matrix multiplied with V, resulting in an output tensor Y.

In self-attention (220), an input tensor X (comprising one or more input token embeddings) is received at the attention layer, and the MQ adapter 206*a*, MK adapter 206*b*, and MV adapter 206*c* each operate on the same input tensor X.

In cross-attention (240), the MQ adapter 206*a* operates on a first input tensor X, and the MK adapter 206*b* and MV adapter 206*c* each operate on a second input tensor X'. Cross-attention is a mechanism with wide applicability in attention-based ML networks. In one example, the first input tensor X is generated within a decoder of the ML network and the second input tensor X' is generated within an encoder of the ML network (enabling the decoder to attend to the encoder's output). In another example, the first input tensor X is generated from first input data of a first modality received as input to the ML network (e.g. one of text, image, audio etc.) and the second input tensor X' is generated from second input data of a second modality received as input to the ML network (e.g. a different one of text, image, audio etc.).

A first output tensor Y is shown to be generated by the attention layer 204. The output tensor is generated as a result of applying a standard attention function 204 to the model query tensor Q, the novel key tensor K, and the model value tensor V.

An input query 208 is received at an input layer 209 of the ML model 200. Although not depicted in FIG. 2, the input query 208 is tokenized and embedded, meaning it is converted to a sequence of tokens and the form of each token is converted to an initial embedding vector. In this example, the input tensor X is shown to be generated based on the input query 209 by one or more first ML layer 210 within the ML model 200. The one or more first layers 201 are parameterized by first parameters $\phi_1$ and precede the attention layer 204. In other implementations, the (tokenized and embedded) input query is received directly at the augmented attention layer (in other words, the input layer 209 is directly coupled to the attention layer 204), in which case X is the tokenized and initial embedded form of the input query 208. The output tensor Y is shown to be inputted to one or more second ML layer parameterized by second parameters $\phi_2$ 214. For example, in certain implementations, the first and/or second ML layers comprise a feed forward neural network (FNN), other non-linear processing layer(s), or a combination of linear and non-linear processing layers. In certain architectures, multiple attention layers are present, interleaved with other layers such as FNN layers. A response 215 is generated at an output layer 212 of the ML model 200. The response 215 is an output of the ML model 200, and is dependent on the output tensor Y and the subsequent processing applied in the subsequent layer(s) 214.

One example implementation of the ML model 200 is a decoder-based transformer. A decoder-based transformer is mostly composed of multiple attention layers. In a transformer with L layers, each layer comprises three adapters in the form of projection heads that apply, respectively, $$W_Q^l \in \mathbb{R}^{D\times D},\ W_K^l \in \mathbb{R}^{D\times D},\ W_V^l \in \mathbb{R}^{D\times D},\ l \in \{1, \ldots, L\},$$

where D denotes embedding dimension, and the superscript l denotes the lth attention layer. For an input sequence of N input tokens, the lth attention layer takes a sequence of N token embeddings $$X^l = [x_1^l, \ldots, x_n^l, \ldots, x_N^l]^T \in \mathbb{R}^{N\times D}$$

as input. Each token embedding is first transformed by the projection heads into three vectors:

$$q_n^l = W_Q^l x_n^l,\ \ k_n^l = W_K^l x_n^l,\ \ v_n^l = W_V^l x_n^l, \tag{2}$$

in which the subscript n denotes the nth token embedding (or nth sequence position). In Equations 2, $$q_n^l,\ k_n^l \text{ and } v_n^l$$

are model query, key, and value vectors respectively as computed at the lth attention layer. Equations 2 defines a form of self-attention, as those vectors are all generated from the input token embedding sequence $X^l$. Note that in some implementations, the attention layer 204 has multiple sets of attention heads resulting in multiple query, key and value vectors. With multiple attention layers, each attention layer has multiple attention heads in some implementations.

An output of the attention layer $$Y^l = [y_1^l, \ldots, y_n^l, \ldots, y_N^l]^T \in \mathbb{R}^{N\times D}$$

is computed as $$y_n^l = \frac{\sum_{i=1}^{n} \exp(w_{n,i}) v_i^l}{\sum_{i=1}^{n} \exp(w_{n,i})},\ \text{where } w_{n,i} = \frac{\langle q_n^l, k_i^l \rangle}{\sqrt{D}}, \tag{3}$$

where $\langle \cdot,\cdot \rangle$ denotes the inner product of two vectors. After $Y^l$ is computed, in some implementations, it is fed into a feedforward network (FFN) with output dimension of D for further transformation. Equation 3 is equivalent to the matrix-based representation of attention shown in the top-right of FIG. 2. In this context, scaling refers to the division by VD, whilst masking refers to the fact that the summation runs from sequence position 1 to sequence position n (the current model value vector), meaning any model value vectors after the current model value vector (n+1 to N) are masked in the sense they do not contribute to the nth component of the output (the nth contextualized token embedding). No model value vector are masked for the Nth sequence position. For cross-attention, Equation 3 remains the same, but $$k_n^l \text{ and } v_n^l$$

are computed from a different input to $$q_n^l.$$

A standard implementation of self-attention has a time complexity of $\mathcal{O}(N^2D)$ and memory of complexity $\mathcal{O}(N^2)$ for computing and storing all $w_{n,i}$. Therefore, both the memory overhead and computational overhead at inference increase quadratically with the number of tokens N. Additionally, the FFN would also introduce a significant computation overhead of magnitude $\mathcal{O}(ND^2)$. Due to these factors, as the sequence gets longer, self-attention faces high memory consumption and slow computation. With the in-context learning approach of FIG. 1A, and an external corpus 102 significantly larger than the input query 100, N is mainly determined by the size of the external corpus 102. Therefore, if a relatively large external knowledge base is incorporated using in-context learning, the additional memory and computational burden increases quadratically within the size of the knowledge base in this case. Moreover, with a conventional in-context learning approach, a knowledge base of M items typically requires multiple tokens to encode each item. With J tokens on average per KB item, in-context learning's memory overhead thus scales with $(JM)^2$.

Figure 3:
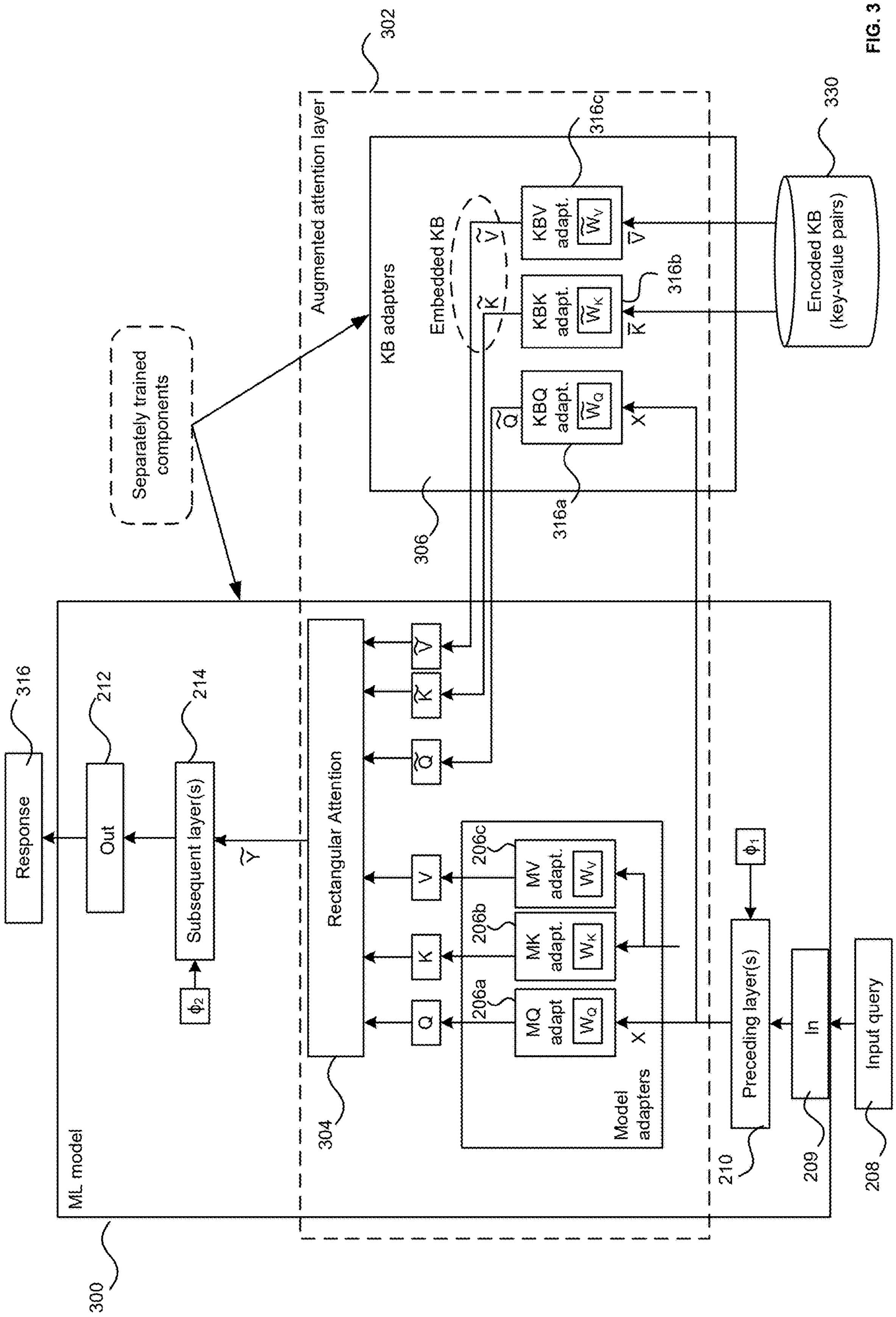
FIG. 3 illustrates an ML model having an extended attention architecture, in accordance with certain embodiments, that includes an augmented attention layer with a rectangular attention function that consumes additional inputs.

FIG. 3 shows an extended attention architecture used in certain embodiments described herein. An ML model 300 is shown, which has the form of an ML network that incorporates an augmented attention layer 302. The ML model 300 is an example of a knowledge base-augmented model (KBM). In this example, the ML model 300 is the same as the ML model 200 of FIG. 2, aside from the replacement of the standard attention function 204 with a rectangular attention function 304 that consumes additional inputs. Therefore, the description of FIG. 3 applies equally to FIG. 3, subject to that modification. Note, the addition of the rectangular attention function 304 does not require any modification to the rest of the ML model 200, and in particular does not require any modification to the existing model weight tensors $W_Q$, $W_K$, $W_V$ or to the existing parameters of the other layers $\phi_1$, $\phi_2$. As such, the ML model 300 is shown to comprise the input layer 209, the one or more preceding layers 210 (which now feed into the augmented attention layer 302), the one or more subsequent layers 214 (which now operate on the output of the augmented attention layer 302) and the output layer 212. The augmented attention layer 302 also incorporates the MQ adapter 206*a*, the MK adapter 206*b* and the MV adapter 206*c*, which now support the rectangular attention function 304.

The input query 208 is received at the input layer 209 of the ML model 300 that is indirectly coupled (via the one or more preceding layers 210) to the augmented attention layer 302. In another embodiment, the input layer 209 is directly coupled to the augmented attention layer 302 such that the augmented attention layer received the tokenized an initially embedded form of the input query 208. A response 316 is generated at the output layer 212 that is indirectly coupled (via the one or more subsequent layers 214) to the augmented attention layer 302. In another embodiment, the output layer 212 is directly coupled to the augmented attention layer 302.

In addition, the ML model 300 is augmented with a second set of adapters, referred to as KB adapters 306, via which the ML rectangular attention function 304 is coupled to an external structured KB 330. These are depicted as components external to the ML model 300 because, as indicated above, it is possible for these to be trained separately from the ML model 300 itself, without modification to the existing trained parameters of the ML model 300 (e.g., $W_Q$, $W_K$, $W_V$, $\phi_1$, $\phi_2$).

A second output tensor $\tilde{Y}$ is generated by the rectangular attention function 304 in place of the first output tensor Y of FIG. 2. Although computed differently, the second output tensor $\tilde{Y}$ has the same format as the first output tensor Y of FIG. 2, meaning no modification is required to the one or more second ML layers 214 that consume the second output tensor $\tilde{Y}$. Note that the input to the augmented attention layer 302, namely the input tensor X, is also unmodified given the same input query 208. Therefore, the modification is structurally confined to the augmented attention layer 302; the complexity of the attention layer is somewhat increased, but this is entirely confined to the augmented attention layer 302, as the inputs to and outputs from the augmented attention layer 302 have the same format. For any given input query, the size of X and $\tilde{Y}$ is the same as in the original ML model of FIG. 2. In particular, the size of the input tensor X and the size of the output tensor $\tilde{Y}$ are independent of the knowledge base 330, meaning the size of the knowledge base 330 can increase, and no additional computational burden is created within the ML model 300 outside of the augmented attention layer 302. This makes the approach of FIG. 3 highly scalable. A detailed analysis of the improved computational and memory efficiency of rectangular attention is set out below.

Multiple augmented attention layers may be implemented in the ML model 300. However, as with a single augmented attention layer, any increase in computational burden is confined to those layers, and does not create any additional computational burden elsewhere in the ML model 300. In some implementations, different KB adapters are trained for each augmented attention layer, with a superscript l used to denote the lth attention layer.

The KB adapters 306 are named as such because they enable the rectangular function 304 to attend over an external structured knowledge base, in addition to performing self-attention or cross-attention within the ML model 300 itself.

A knowledge base query (KBQ) adapter 316*a* operates on the same input tensor X as the MQ adapter 206*a*, but does so based on a different and independently trainable set of weights, captured in a KBQ weight tensor $\tilde{W}_Q$, resulting in a computed KB query tensor $\tilde{Q}$ (comprising one or more KB query vectors) dependent on X and $\tilde{W}_Q$. A knowledge base key (KBK) adapter 316*b*, parameterized by a KBK weight tensor $\tilde{W}_K$, and a knowledge base value (KBV) adapter 316*c*, parameterized by a KBV weight tensor $\tilde{W}_y$, each operate on the external structured KB 330. The structured KB 330 has the form of a key-value database in this example, containing items structured as key-value pairs. The KBK adapter operates on the key of each key value pair, transforming it to a key vector, whilst the KBV adapter 316*c* operates on the value of each key-value pair, transforming it to an associated value vector. In some examples, each key-value pair is a first vectorized key-value pair, meaning a first fixed-length key vector and a first fixed-length value vector associated therewith. Those first fixed-length value vectors are generated in a first encoding stage in one implementation (see FIG. 5A). In this case, the KBK and KBV adapters 316*b*, 316*c* can be characterized as a second encoding stage, transforming each first vectorized key-value pair into a second pair of key-value vectors, which are also fixed-length vectors but in a different embedding space (a 'native' embedding space of the ML model 300).

It is convenient to represent the structured KB 330 as a key tensor $\bar{K}$ (containing each key) and a value tensor $\bar{V}$ (containing each associated value), which are transformed by the KBK adapter and KBV adapter respectively into an embedded key tensor $\tilde{K}$ (comprising one or more KB key vectors) and embedded value tensor $\tilde{V}$ (comprising one or more KB value vectors, each associated with the corresponding KB key vector in $\tilde{K}$). A KB key vector and its associated KB value vector constitute a "knowledge token".

The rectangular attention function 304 receives six inputs in this example. Three of those inputs are internal to the ML model 300, namely the model query tensor Q, the model key tensor K, and the model value tensor V. Two of those inputs are entirely external, namely the KB key tensor $\tilde{K}$ and the KB value tensor $\tilde{V}$ (both derived from the external KB using the external KBK and KBV adapters 316*b*, 316*c*). The remaining input is the KB query tensor $\tilde{Q}$, which is generated based on the input tensor X that is internal to the ML model, but using the external KBQ adapter 316*a*.

Rectangular attention combines, in a single attention function, attention over the model value tensor V based on the model query tensor Q (derived from X) and the model key tensor K (e.g., self-attention or cross-attention within the ML model) with attention over the KB value tensor $\tilde{V}$ based on the KB query tensor $\tilde{Q}$ (also derived from X) and KB key tensor $\tilde{K}$.

Although FIG. 3 shows only a single augmented attention layer 204 and a single set of KB adaptors 206*a*, 206*b*, 206*c*, in some embodiments multiple augmented attention layers are incorporated, e.g. interspersed with other processing such as FNNs or other non-linear processing layers. For example, the preceding layers 210 and/or the subsequent layers 214 may include one or more additional augmented attention layers. As above, the superscript l is used to denote the lth attention layer (augmented attention layer in this case). In some such embodiments, a separate set of KB adapters is trained for each augmented attention layer, denoted by $$\left\{\tilde{W}_Q^l, \tilde{W}_K^l, \tilde{W}_V^l\right\}.$$

In this case, for a given structured KB, different knowledge tokens are computed for each augmented attention layer as:

$$\tilde{k}_m^l = \tilde{W}_K^l \bar{k}_m, \quad \tilde{v}_m^l = \tilde{W}_V^l \bar{v}_m.$$

In the above, $(\bar{k}_m, \bar{v}_m)$ is the mth key-value pair of the structured KB 330, with $\bar{k}_m$ being the mth component of $\bar{K}$ and $\bar{v}_m$ being the mth component of $\bar{V}$, whilst $$\left(\tilde{k}_m^l, \tilde{v}_m^l\right)$$

is the mth knowledge token at the lth attention layer. For a knowledge base of size M (that is, containing M items), m runs from 1 to M. Note, each $$\tilde{k}_m^l \text{ and } \tilde{v}_m^l$$

has a fixed-length of D irrespective of the size of the KB item they encode.

In one example, the rectangular attention function 304 is defined as follows. At the lth attention layer, given input $$X^l = \left[x_1^l, \ldots, x_n^l, \ldots, x_N^l\right]^T$$

and the lth layer knowledge tokens $$\left\{\left(\tilde{k}_m^l, \tilde{v}_m^l\right)\right\}_{m=1}^M,$$

the output of each attention layer, $$\tilde{Y}^l = \left[y_1^l, \ldots, y_n^l, \ldots, y_N^l\right]^T \in \mathbb{R}^{N \times D},$$

is given by $$\tilde{y}_n^l = \frac{\sum_{m=1}^M \exp\left(\tilde{w}_{n,m}^l\right)\tilde{v}_m^l + \sum_{i=1}^n \exp\left(w_{n,i}^l\right)v_i^l}{\sum_{m=1}^M \exp\left(\tilde{w}_{n,m}^l\right) + \sum_{i=1}^n \exp\left(w_{n,i}^l\right)}, \tag{4}$$

where $$\tilde{w}_{n,m}^l = \left\langle \tilde{q}_n^l, \tilde{k}_m^l \right\rangle / \sqrt{D}, \; \tilde{q}_n^l = \tilde{W}_Q^l x_n, \quad w_{n,i}^l = \left\langle q_n^l, k_i^l \right\rangle / \sqrt{D}, \tag{5}$$

and $$\tilde{W}_Q^l \in \mathbb{R}^{D \times D}$$

is the KBQ weight tensor of the KB query head 316*a*. The second terms in Equation 4 (summations over n) are referred to as a query part, whilst the first terms (summation over M) are referred to as a KB part. The vector notation used in Equations 4 and 5 relates to the tensor notation used elsewhere as follows:

$$Q^l = \left[q_1^l, \ldots, q_n^l, \ldots, q_N^l\right]^T, \tilde{Q}^l = \left[\tilde{q}_1^l, \ldots, \tilde{q}_n^l, \ldots, \tilde{q}_N^l\right]^T,$$

$$K^l = \left[k_1^l, \ldots, k_n^l, \ldots, k_N^l\right]^T, \tilde{K}^l = \left[\tilde{k}_1^l, \ldots, \tilde{k}_m^l, \ldots, \tilde{k}_M^l\right]^T,$$

$$V^l = \left[v_1^l, \ldots, v_n^l, \ldots, v_N^l\right]^T, \tilde{V}^l = \left[\tilde{v}_1^l, \ldots, \tilde{v}_m^l, \ldots, \tilde{v}_M^l\right]^T.$$

Note, the size of the model query tensor $Q^l$, the KB query tensor $\tilde{Q}^l$, the model key tensor $K^l$ and the model value tensor $V^l$ is determined by the embedding dimension D and the length N of the input sequence, whereas the size of the KB key tensor $\tilde{K}^l$ and the KB value tensor $\tilde{V}^l$ is determined by the embedding dimension D and the size M of the structured KB 330.

The KBQ tensor $\tilde{Q}^l$ can be characterized as a length-N sequence of KB query vectors, whereas the KBK and KBV tensors $$\tilde{K}_K^l, \tilde{K}_V^l$$

can be characterized as length-M sequences of KB key vectors and KB value vectors respectively.

Figure 5A:
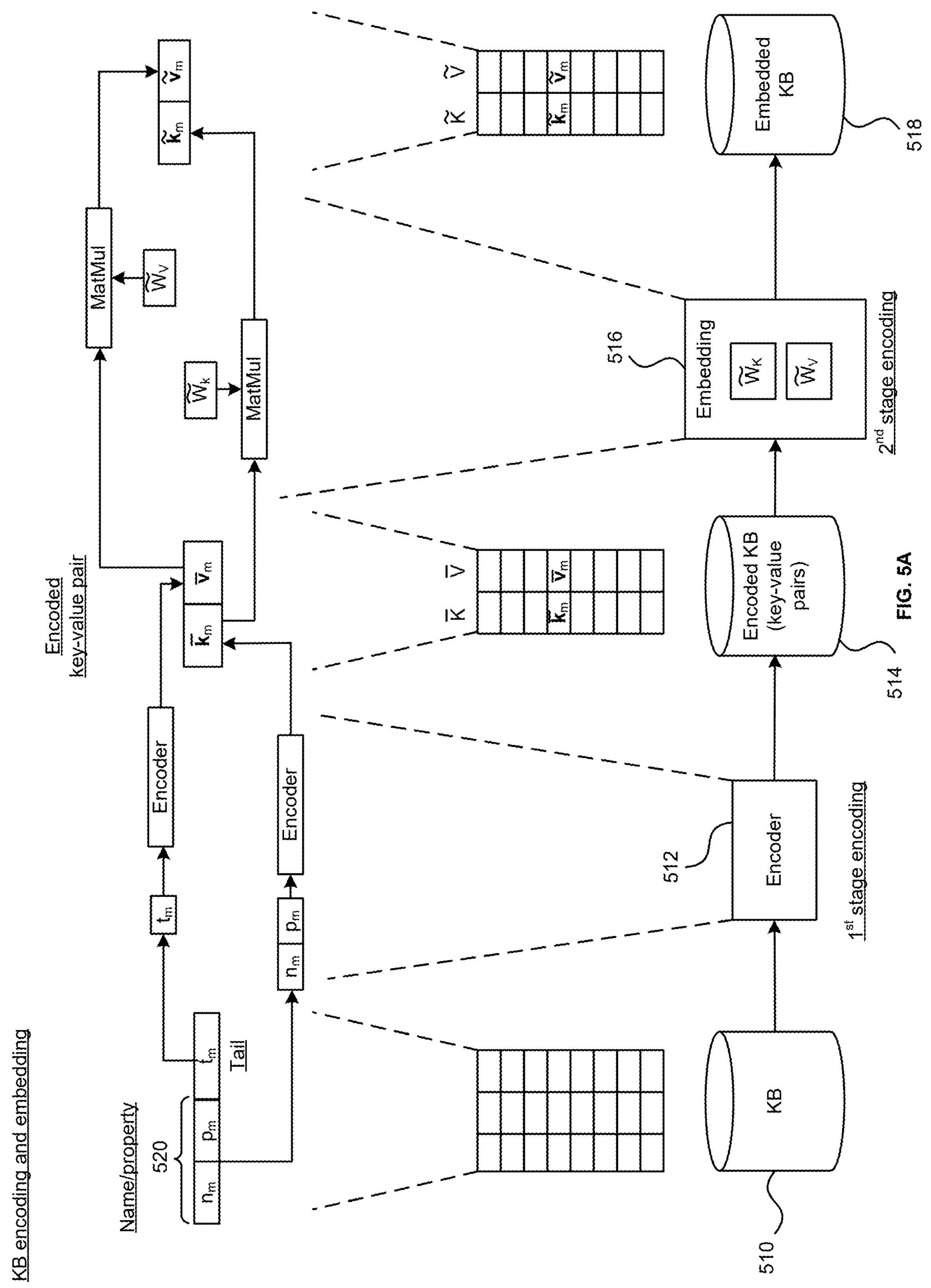
FIG. 5A illustrates an example two-stage knowledge base encoding approach.
Figure 5B:
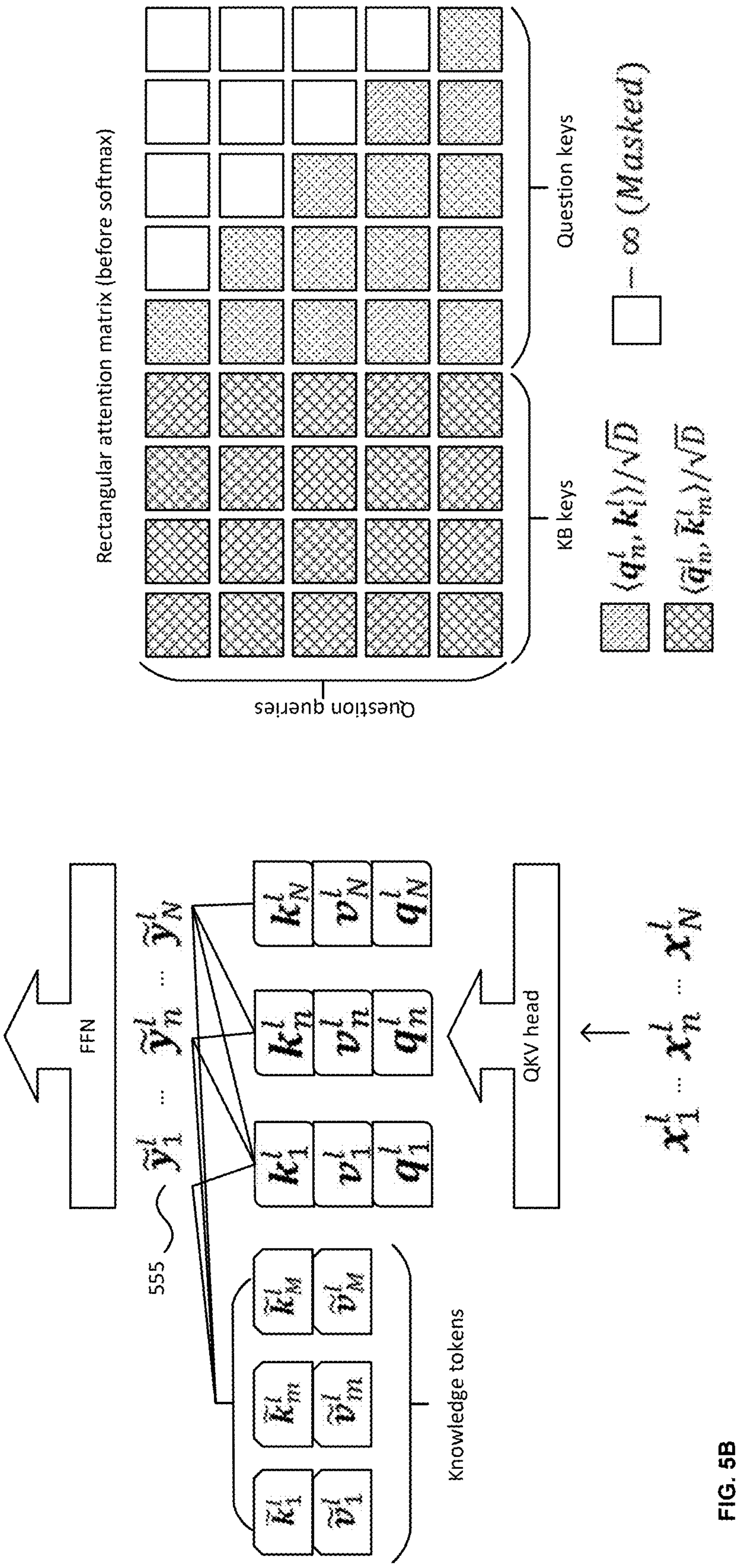
FIG. 5B illustrates an example augmentation of knowledge tokens into attention.

The attention structure of Equation 4 is referred to as rectangular attention 304, as it defines an attention matrix of rectangular shape, as illustrated in the bottom-right panel of FIG. 5B. One way to interpret Equation 4 is to that each input token can "see", in addition to all previous input tokens of the input tensor X (via self-attention), all knowledge tokens (vis attention over the structured KB 330). On the other hand, knowledge tokens cannot see each other; that is, knowledge tokens do not have self-attention nor are query vectors generated from knowledge tokens. This design gives an attention matrix of rectangular shape, of size (M+N)×N. As such, memory usage scales linearly with the number of knowledge tokens instead of quadratically.

As in Equation 3, masking is applied to the query part of Equation 4.

As discussed, given a KB of M items with each item being J-token long on average, in-context learning's memory scales with $(JM)^2$, whereas the memory overhead for the ML model 300 of FIG. 3 scales linearly with M. The additional saving stems from the matter in which the KB is encoded. In more detail, the memory complexity of rectangular attention is $\mathcal{O}$((M+N)N) and the computational complexity is $\mathcal{O}$((M+N)ND). In real settings, it is likely that M>>N, or in other words the number of external knowledge items is significantly larger than the size of the tokenized input query 208, then the computational and memory overhead would grow only linearly with M (instead of quadratically), which allows this approach to scale up to very large values of M. Also, note that the output sequence length of rectangular attention does not vary with the number of knowledge tokens, therefore the overhead for the intermediate FFN modules stays unchanged regardless of M.

As described below, a KB is encoded in a two-stage process, first using a pretrained encoder to reduce a KB item of arbitrary length (e.g. multi-token KB item) to a single key-value pair, which is then embedded using the KBK weight tensor $$\tilde{W}_K^l$$

and the KBV weight tensor $$\tilde{W}_V^l.$$

To support inference, each KB item is pre-encoded offline as a single knowledge token, meaning the time and memory complexity at inference is independent of J.

It can also be seen from Equation 4 that changing the order of the knowledge tokens does not affect the output. Therefore, the ML model 300 does not suffer from a positional bias issue that is exhibited in conventional in-context learning. Additionally, since all knowledge tokens are encoded independently, it is possible to update the structured KB 330, e.g. to add a new or modify an existing knowledge token without modification to the ML model 300. This highlights a difference between this approach and a conventional key-value (KV) cache mechanism used in certain LMs (e.g. LLMs), which requires full re-computation when the cached content is modified in any way.

Note that rectangular attention differs from conventional cross-attention, which operates on a source sequence with key and value embeddings and a target sequence with only query embeddings, where tokens within each sequence do not attend to one another. In the present context, the structured KB 330 is taken as the source and the input query 208 as the target. Conventional cross-attention would involve only the summations over M in Equation 4. However, rectangular attention also contains self-attention over the prompt tokens (or cross attention over some other source), given by the summations over n in Equation 4.

Additionally, if knowledge tokens are not introduced, meaning M=0, Equation 4 reverts to Equation 3, recovering the ML model 200 of FIG. 2. In other words, with an empty knowledge base (M=0), the rectangular attention function 304 of FIG. 3 reduces to the attention layer 202 of FIG. 2, meaning the ML model 300 of FIG. 3 reverts to its original form as depicted in FIG. 2.

Note that the contribution of the KB part to the attention output would vary with M. In particular, assuming each $$\tilde{w}_{n,m}^l,$$

m∈{1, . . . , M} is of similar magnitude, then as M grows, eventually the query part in both denominator and numerator of Equation 4 will be overwhelmed by the KB part. To resolve this, in some embodiments, during inference the first summations over M are multiplied by C/M where $C \in \mathbb{R}^+$ is a hyperparameter (a value of $\mathbb{R}$ 100 was chosen in the experiments detailed below, but a suitable value can be determined through hyperparameter tuning in a given context). During implementation, the multiplicative constant is merged into the exponential function by modifying Equation 4 as follows:

$$\tilde{w}_{n,m}^l = \log C - \log M + \left\langle \tilde{q}_n^l, \tilde{k}_m^l \right\rangle / \sqrt{D},$$

which simply adds a constant to the attention score before softmax.

In the following description, the superscript l to denote the lth attention layer is largely omitted for conciseness.

The model query tensor Q is generated within the ML model 300 based on the input tensor X and the MQ weight tensor $W_Q$ independently of the KBQ weight tensor $\tilde{W}_Q$.

Similarly, the model key tensor K and model value tensor V are generated within the ML model 300 based on the MK weight tensor $W_K$ and KV weight tensor $W_V$, respectively, independently of the KBK weight tensor $\tilde{W}_K$ and the KBV weight tensor $\tilde{W}_V$.

The KBQ weight tensor $$\tilde{W}_Q^l,$$

KBK weight tensor $$\tilde{W}_K^l$$

and the KBV weight tensor $$\tilde{W}_V^l$$

are trainable components, which as discussed can be trained separately from the ML model 200. In one embodiment, at the start of their training, the KBQ weight tensor $$\tilde{W}_Q^l$$

is initialized to match the MQ weight tensor $$W_Q^l$$

of the trained ML model 200, and adapted from that initialization during training.

To implement rectangular self-attention, K and V are generated based on the same input tensor X as Q.

To implement rectangular cross-attention, K and V are generated based on a different input tensor X'.

In some embodiments, the ML model 300 is a generative model. In some embodiments, the ML model is a transformer. Transformer architectures, such as GPT, Falcon, Llama, etc. can be used to implement generative models, but they can also be used to implement declarative models. In some embodiments, the ML model 300 is a language model (LM), such as a large language model (LLM) or small language model. In some embodiments, the ML model 300 is multi-modal, meaning it has the ability to receive and/or generate inputs/outputs comprising a modality other than text, such as audio data, image data, etc. In some embodiments, the ML model 300 is uni-modal, but operates on a modality other than text, such as image or audio. For example, direct audio-to-audio generative architectures have recently been developed. Note, the term "input query" is used herein in a broad sense to refer to any form of input to an ML model, including without limitation an "open" natural language prompt (e.g. containing a question, direct instruction or command), a structured input (e.g., conforming to a predefined format or schema), an image input, an audio input, a multimodal input etc. A language model incorporating rectangular attention is referred to herein as a knowledge base-augmented language model (KBLM). The term KBM is used more generally to refer to an ML model incorporating rectangular attention. Certain embodiments consider KBLMs but the principles and description apply equally to other forms of KBMs.

The architecture of FIG. 3 provides general and interpretable attention over the KB. The attention is interpretable as it is possible to determine which KB element or elements the ML model 300 used during generation. This, in turn, allows the ML model 300 to source where information came from, e.g. knowledge could be injected from news or academic papers into the ML model 300 via rectangular attention 304, and the ML would be able to indicate exactly which article or paper specific knowledge was extracted from based on the attention weights. This interpretability arises at least in part because of lack of self-attention amongst knowledge tokens of the KB.

Figure 4:
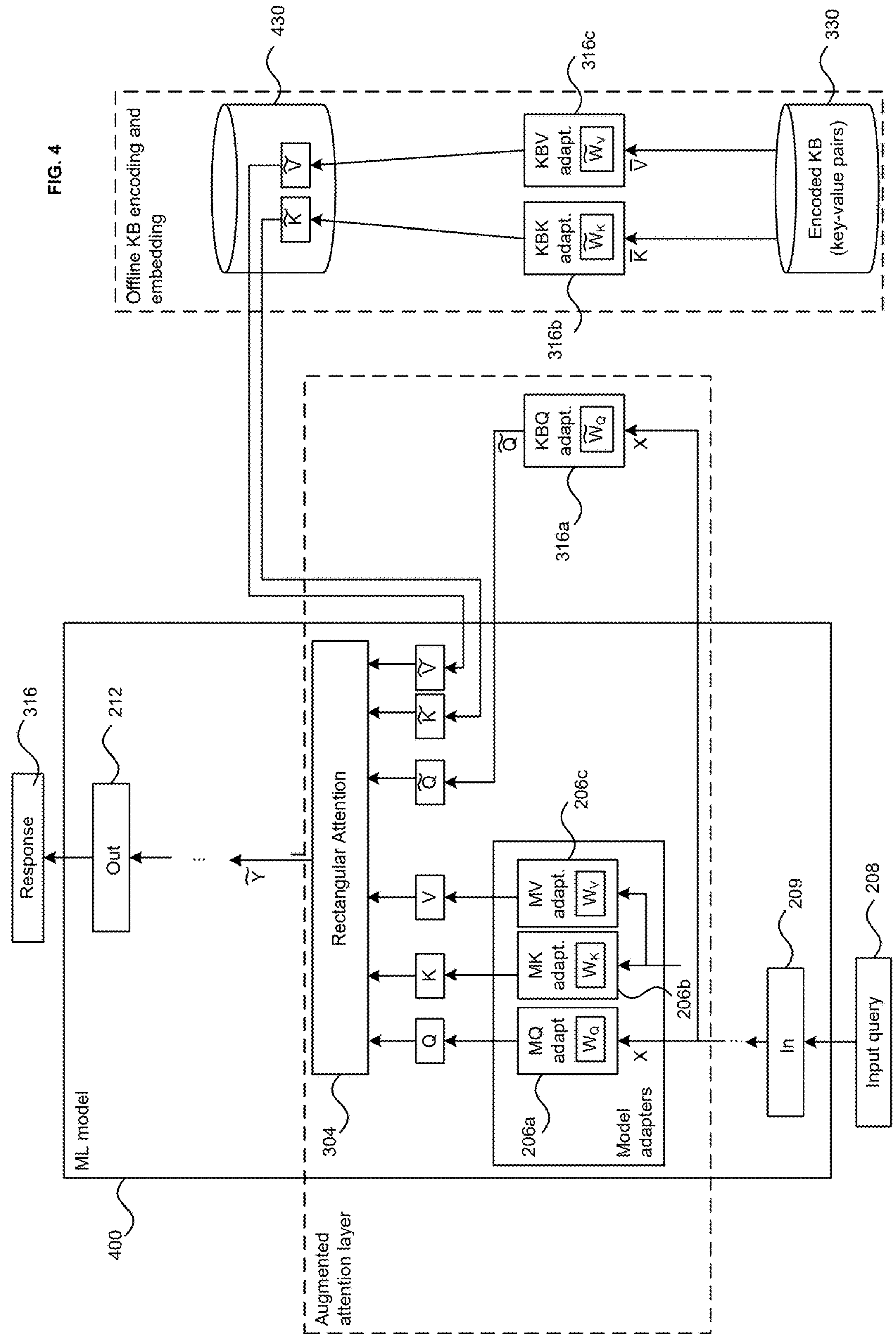
FIG. 4 illustrates a possible implementation of the ML model of FIG. 3 at inference time, using a pre-encoded and pre-embedded knowledge base.

FIG. 4 shows a possible implementation of the system of FIG. 3 at inference, when the KBQ adapter 316*a*, KBK adapter 316*b* and KBV adapter 316*c* have been trained. Because the KBK 316*b* and KBV 316*c* adapters operate on the external knowledge base 330, independently of the ML model 300, it is possible to pre-encode and pre-embed the KB, prior to receiving the input query 208. This means computing and storing the KB key and value tensors K, V offline as an embedded KB 430, for later use at inference when an input query to the ML model 400 is received.

FIG. 5A shows an example of two-stage KB encoding. In this example, an mth knowledge base data item takes the form of a (name, property, tail) triplet, $(n_m, p_m, t_m)$. In a first encoding stage, the name and the property are combined in a single input string 520, and an encoder 512 encodes that input string 520 as a fixed-length key vector $\bar{k}_m$. The encoder 512 is a pre-trained sentence encoder in this example (e.g. trained independently of the ML model 200). The tail to is encoded as a fixed-length value vector $\bar{v}_m$. More generally, in some embodiments, the key vector $\bar{k}_m$ and value vector $\bar{v}_m$ are generated from different respective portions of a data item. In some implementations, the same encoder 512 is used to encode each portion, and each portion is encoded as single fixed-length vector. In other embodiments, different encoders are used to encode the different portions. In a second encoding stage, the KBK adapter transforms $\bar{k}_m$ into a different embedding space based on $\tilde{W}_K$, resulting in a key vector $\tilde{k}_m$ (which is also a fixed-length vector in this example, but in a different embedding space). Likewise, the KBV adapter transforms $\bar{v}_m$ into a different embedding space based on $\tilde{W}_y$, resulting in a value vector $\tilde{v}_m$ (which is also a fixed-length vector in this example, but in a different embedding space). Each data item of the knowledge base 510 is encoded in this way.

In some embodiments, external knowledge is represented as a structured knowledge base is obtained from unstructured text using, for example, a KB composed of triples of the above format $$\{(\langle\text{name}\rangle_m, \langle\text{property}\rangle_m, \langle\text{value}\rangle_m)\}_{m=1}^{M} \quad (6)$$

A set of triples of the format Equation 6 is an example of an initial structured KB and each triple inside it as a knowledge triple. An example of such KB is shown in the top panel 1102 of FIG. 11. The KB construction process essentially summarizes information from multiple documents and organizes it in a structured way.

In one example, Alexandria, an LLM-based pipeline, is used for KB construction. Further details of Alexandria may be found in Haolun Wu, Ye Yuan, Liana Mikaelyan, Alexander Meulemans, Xue Liu, James Hensman, and Bhaskar Mitra; "Structured entity extraction using large language models" [arXiv preprint arXiv:2402.04437, 2024]; John Winn et al. "Enterprise Alexandria: Online High-Precision Enterprise Knowledge Base Construction with Typed Entities" [available at https://www.microsoft.com/en-us/research/publication/enterprise-alexandria-online-high-precision-enterprise-knowledge-base-construction-with-typed-entities]; and John Winn et al. "Enterprise Alexandria: Online High-Precision Enterprise Knowledge Base Construction with Typed Entities" [available at https://www.microsoft.com/en-us/research/publication/enterprise-alexandria-online-high-precision-enterprise-knowledge-base-construction-with-typed-entities], each of which is incorporated herein by reference in its entirety. However, the described techniques can be applied to KB constructed using other approaches.

Given a KB in the format of Equation 6, for each triple, the encoder 512 is first applied, denoted as f(·), which converts a string into a first P-dimension continuous embedding vector, referred to as a "baes" embedding. Through the encoder 512, each triple is thus converted into a base key embedding vector and a base value embedding vector ($k_m$ and $v_m$ respectively):

$$\bar{k}_m = f(\textit{The}\ \text{<property>}_m \text{ of } \text{<name>}_m) \in \mathbb{R}^P, \tag{7}$$

$$\bar{v}_m = f(\text{<value>}_m) \in \mathbb{R}^P$$

Next, a linear key and a linear value adapter is introduced:

$$\tilde{W}_K \in \mathbb{R}^{L\times D\times P},\ \ \tilde{W}_V \in \mathbb{R}^{L\times D\times P} \tag{8}$$

where L denotes the number of attention layers in a model (with this notation, $\tilde{W}_K$ and $\tilde{W}_V$ each comprise L D×P matrices, where the lth such matrix is $$\tilde{W}_K^l \text{ or } \tilde{W}_V^l$$

in the above notation). Using the KBK and KBV adapters 316*b*, 316*c*, $\bar{k}_m$ and $\bar{v}_m$ are mapped from the embedding space of the encoder 512 to the embedding space of the ML model 300 at each attention layer. To be more specific, for the mth knowledge triple, its base key and value embedding is transformed into $$\tilde{k}_m = \left[\tilde{k}_m^1, \ldots, \tilde{k}_m^l, \ldots, \tilde{k}_m^L\right]^T = \tilde{W}_K^l k_m \in \mathbb{R}^{L\times D}, \tag{9}$$

$$\tilde{v}_m = \left[\tilde{v}_m^1, \ldots, \tilde{v}_m^l, \ldots, \tilde{v}_m^L\right]^T = \tilde{W}_V^l v_m \in \mathbb{R}^{L\times D}. \tag{10}$$

Since each $$\tilde{k}_m^l \text{ and } \tilde{v}_m^l$$

have the same dimension D as the model key and value vectors $$k_n^l \text{ and } v_n^l,$$

they can be directly incorporated into the attention computation within the ML model 300.

In summary, the encoding process converts a knowledge triple from a string into a single token, whose key and value vectors are acquired through an encoder, rather than through self-attention, resulting in a single knowledge token ($\tilde{k}_m$, $\tilde{v}_m$) per KB triple. This two-stage encoding process is applied to each triple in the KB, which transforms the information from a KB into a collection of knowledge tokens $$\{(\text{<name>}_m, \text{<property>}_m, \text{<value>}_m)\}_{m=1}^M \xrightarrow{Encode} \{(\tilde{k}_m, \tilde{v}_m)\}_{m=1}^M. \tag{11}$$

Where applicable, the output of the first encoding stage 512 may be referred to as an encoded KB 514 or item, whilst the output of the second encoding 516 stage may be referred to as an embedded KB 518 or item.

In an alternative implementation, key-value embeddings are computed as a concatenation of embedding (head, relation) and embedding(tail), which allows for reverse lookups.

The overall process thus has two steps. Firstly, each knowledge triple in a KB is converted from the string form into a continuous key-value vector pair, referred to as a knowledge token, through a pre-trained sentence encoder followed by linear adapters. Secondly, all knowledge tokens are then injected into each attention layer of an attention-based model through the rectangular attention structure.

FIG. 5B shows that for layer l, given an input sequence of N D-dimensional embeddings, $$(x_1^l, \ldots, x_N^l)$$

augmented with M knowledge tokens as context $$\left(\left\{\left(\tilde{k}_m^l, \tilde{v}_m^l\right)\right\}_{m=1}^M\right).$$

The KBLM outputs N output embedding vectors 555 with each element $$\tilde{y}_n^l \in \mathbb{R}^D$$

computed (top right panel) under a rectangular attention matrix (bottom right panel): Hatched regions show the extra components introduced in rectangular attention whereas the dotted parts are from the model's internal attention (self-attention in this example). The outputs $$\tilde{y}_1^l, \ldots, \tilde{y}_N^l$$

are passed to an FNN in this example.

Figure 6:
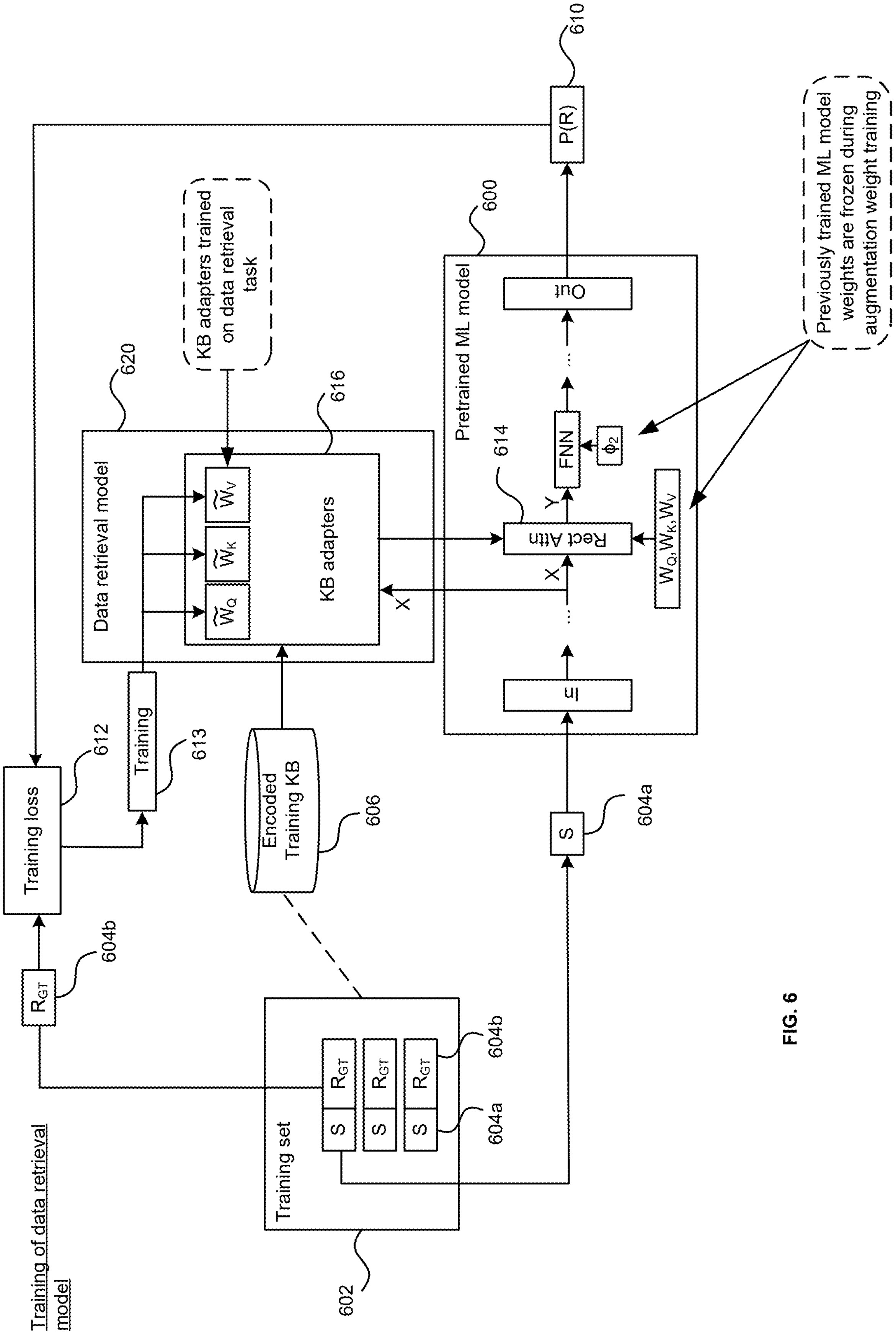
FIG. 6 illustrates an example setup for training knowledge base adapters of the ML model of FIG. 3.

FIG. 6 shows an overview of a KB adapter training setup for training the KB adapters 316*a*, 316*b*, 316*c*, collectively denoted by reference numeral 616. A pretrained ML model 600 is shown (e.g., corresponding to the ML model 300 of FIG. 3), which has been previously trained on a model training task, and whose parameters are frozen (not adjusted) during the depicted KB adapter training process. For example, the ML model 600 may be a generative model trained on a token prediction training task (e.g., next token prediction or next tokens prediction).

A training set 602 is formed of a set of training examples, each training example comprising a training input query 604*a* (denoted S) and a ground-truth response 604*b* (denoted $R_{GT}$). The training examples relate to information contained in a training knowledge base KB. An encoded training KB 606 is depicted, meaning a first encoded version of the training KB generated in the first encoding stage of FIG. 5A. The second encoding stage is performed repeatedly, as the KB adapter weights are optimized.

In more detail, training input queries are inputted to the pretrained ML model 600, resulting in corresponding responses generated by the ML model 600. In this example, for each training input query 604*a*, the ML model 600 generates a distribution P(R) 610 over possible responses. A training loss 612 measures the difference between the generated response 610 and the ground-truth response 604*b* for each training input query 604*a*. A training module 613 adapts the KBQ, KBK, and KBV weight tensors $\tilde{W}_Q$, $\tilde{W}_K$, $\tilde{W}_V$ based on the training loss 612, e.g., via backpropagation based on gradients of those weights with respect to the training loss 612. For example, in one embodiment, the loss function 612 is defined as the probability of the ground-truth response $P(R_{GT})$ (where P(*) is the response distribution generated by the ML model) aggregated across the training set 602. The KB weight tensors $\tilde{W}_Q$, $\tilde{W}_K$, $\tilde{W}_V$ are systematically tuned to maximize overall probability of the ground-truth responses.

This is one example of a data retrieval training task. Because the training set 602 relates to the knowledge base 606, performance as measured by the training loss 612 improves as the ML model's ability to query the knowledge base 606 improves. Those improvements in the ML model's ability are not achieved by adapting the ML model 600 itself, but rather by optimizing the external KB adapters 616 that feed into an augmented attention layer 614 (or layers) of the ML model 600 (e.g., corresponding to the augmented attention layer 302 of FIG. 3). The external KB adapters 616 can be characterized as a trainable data retrieval model 620, which is optimized during the training of FIG. 6.

In some embodiments, the training set 602 and the training KB 606 are generated by a synthetic data generator. In some implementations, the synthetic data generator is the trained generative model itself. In some such implementations, the training set is fully synthetic, and is generated by prompting and calling the trained generative model several times without usage of any existing data. In this case, it is possible to directly generate the synthetic training data using the trained generative model in the following manner.

Each data point of the synthetic training data comprises a name, description_type, description, question, answer and key_string, where key_string is "the {entity.description_type} of {entity.name}".

The synthetic data is encoded and the encoded training KB comprises the encoded key_strings and value_strings (descriptions).

In the above examples, learnable parameters of the data retrieval model 620 are $$\theta = \left\{\tilde{W}_K, \tilde{W}_V, \left\{\tilde{W}_Q^l\right\}_{l=1}^L\right\}.$$

These layers transform the base key and value embeddings from an output space of the pre-trained sentence encoder 512 of FIG. 5A into a space compatible with the ML model 600. Instruction tuning is employed to optimize these parameters in some examples. Specifically, given a KB, formatted strings and GPT generate query-response (e.g., question-answer) pairs about the KB (604*a*, 604*b*), θ is optimised using:

$$\max_{\theta} \log p_{\theta,\phi}(R_{GT} | S, KB), \quad (12)$$

where ϕ denotes parameters of the pre-trained ML model 600, encompassing its MQ, MK and MV weights $W_Q$, $W_K$, $W_V$, and any other parameters (e.g., $\phi_1$, $\phi_2$ such as FFN parameters and embedding layer weights). Notably, KB instruction tuning preserves the base model's reasoning abilities by avoiding fine-tuning the pre-trained model itself. Moreover, learning only the linear adapters minimizes the risk of memorizing training data, a known issue in language model (e.g., LLM) fine-tuning. To further mitigate this risk, instruction tuning is conducted using a fully synthetic KB generated by a language model such as GPT. This approach is motivated by the understanding that the instruction tuning process aims not to memorize specific information, but to learn a projection from the pre-trained sentence encoder space to the language model's semantic space. Consequently, the exact content of the KB is less critical, provided the training data encompasses a diverse range of text.

Figure 7:
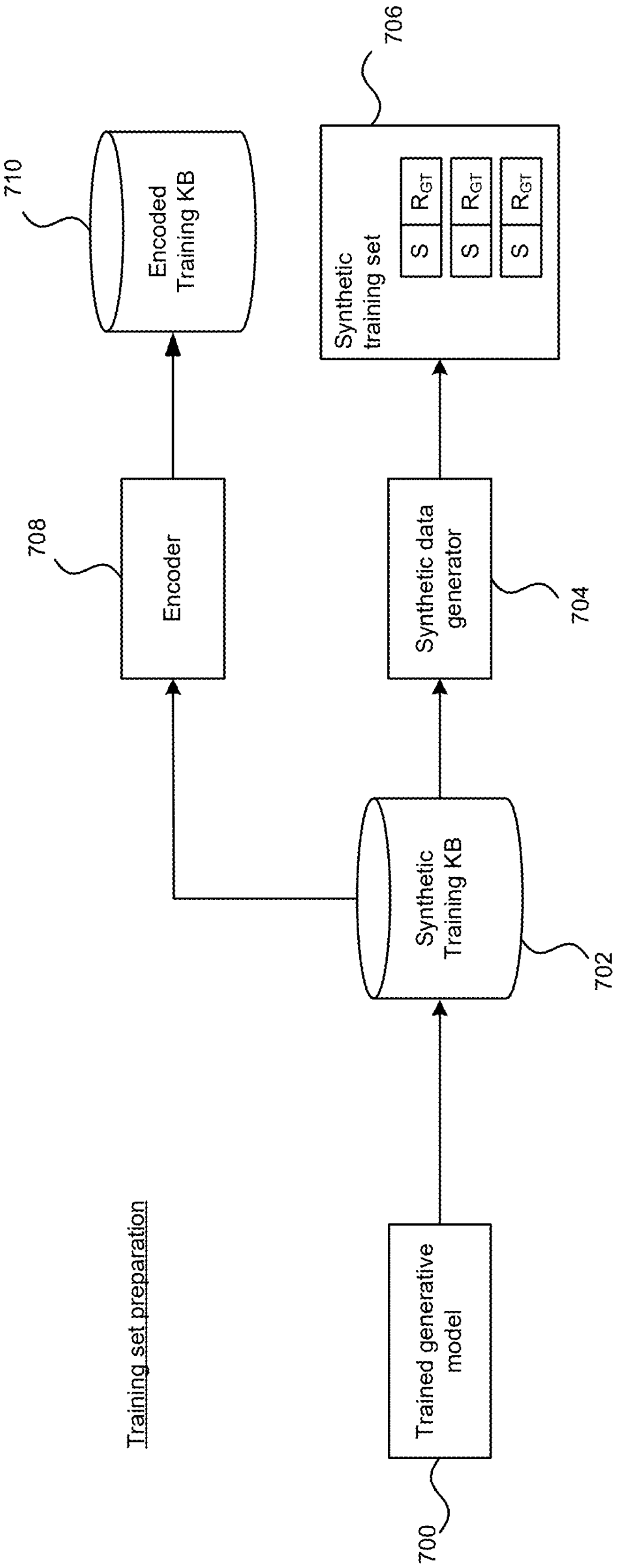
FIG. 7 illustrates an example training set preparation scheme.

FIG. 7 shows an example training set preparation scheme. A benefit of the setup of FIG. 6 is that the KB adapters can be trained on a synthetic knowledge base. Once trained, they have the ability to generalize to different knowledge bases at inference without re-training. During training, the KB adapters are optimized for data retrieval in a way that can be generalized to a different knowledge base (or bases) not encountered during training.

In this example, a trained generative model 700 is used to generate a synthetic training KB 702, which in turn is used to generate a synthetic training set 406. The synthetic training KB 702 and synthetic training set 706 are deployed in the training setup of FIG. 6. The trained generative model 700 is the same ML model as used in KB adapter training in one embodiment. In another embodiments, it is a different ML model.

As noted, in some examples a KB comprises triples of <name>, <property>, and <value>. Therefore, in order to synthesize a KB, a diverse set of <name>s is needed. In particular, a language model (e.g., GPT) is given an object type, such as "restaurant name", "software tool", as well as an idea type as sources of inspiration for the name, such as "natural phenomena" or "famous landmarks". The language model is then prompted with an instruction such as "Please randomly generate 50 {object type} name innovated by {idea type}".

Then for each <name>, three <property>s are chosen: "Description", "objectives", and "purpose", after which, in the same conversation context, given the <name> and object_type, the language model is prompted to generate the <value>s for all three <property>s. The language model is explicitly instructed to generate <value> uncorrelated with <name>, such that the information <value> must come from the KB instead of using the base LM's own next-token prediction ability.

In the experiments detailed below, 30 different object_types and 30 idea_types were used, and for each combination, 50<name>s were generated, giving 45K <name> in total and a resulting KB of 135K triples.

The construction of the instruction tuning dataset reflects the intended use of the KB and the desired behavior of the KBM under various scenarios. The types of instructions considered are described below with examples shown in FIG. 11.

Simple Q&A 1104: Questions about a single <name> and <property>, with <value> as the answer.

Multi-entity Q&A 1108: Questions involving multiple <name>s and <property>s, with their corresponding <value>s as answers.

Open-ended Q&A 1106: Similar to simple and multi-entity Q&A, but including an additional open-ended question component that requires reasoning about <value>. Reference answers for these questions are generated by GPT.

Unanswerable questions 1110: Questions irrelevant to any <name> or <property> in the KB. For such cases, the standard response is "Sorry, I cannot find relevant information in the KB."

For simple 1102, multi-entity 1108, and unanswerable 1110 questions, both questions and answers are generated using formatted strings. Question templates are randomly selected with various prefixes such as "Can you inform me . . . " or "What is the . . . ". For open-ended Q&A, GPT is provided with a simple Q&A pair and it is instructed to extend this into an open-ended format.

Figure 8:
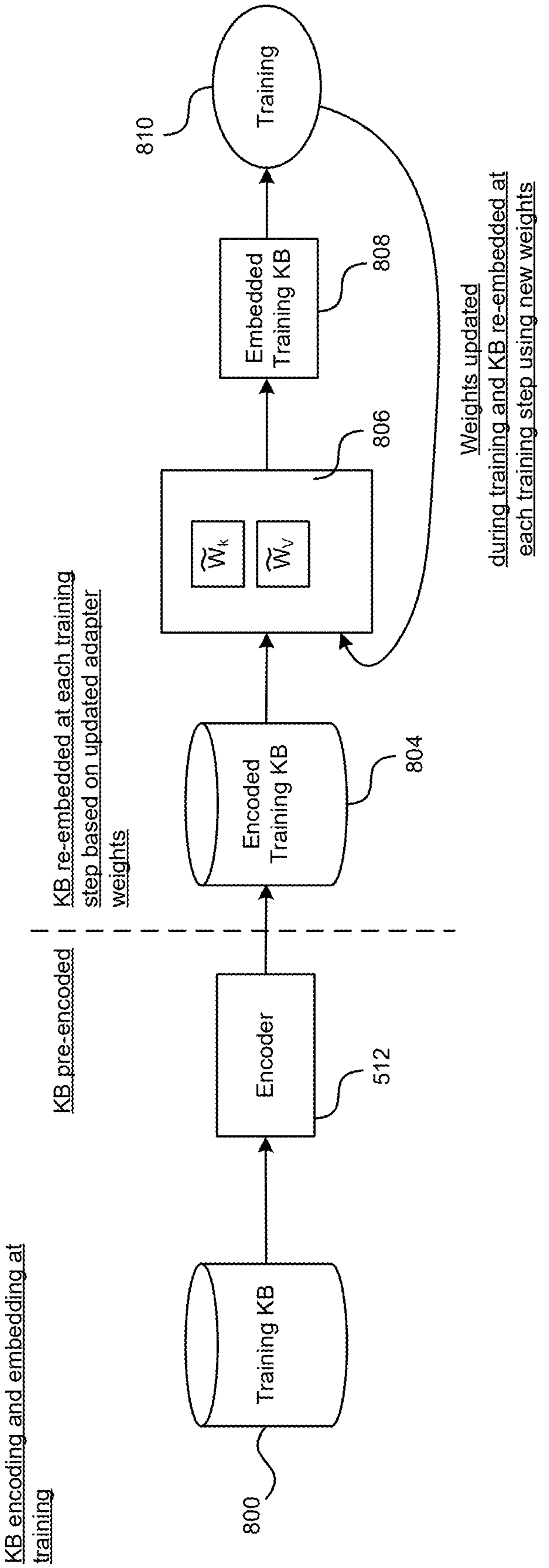
FIG. 8 illustrates certain principles of knowledge base encoding during training using the two-stage encoding of FIG. 5.

FIG. 8 illustrates certain principles of KB encoding during training using the two-stage encoding of FIG. 6A. The first stage of encoding using the pre-trained encoder 512 need only be applied once to a training KB 800, prior to or at the start of training. The resulting encoded training KB 804 can then be re-used at each training step.

At each training step, KBK and KBV the weight tensors $\tilde{W}_K$, $\tilde{W}_V$ under training (denoted by reference numeral 806) are updated based on the training loss and the model output, meaning that, whilst training is still ongoing, the second stage of encoding needs to be applied after each training step 810 ahead of the next training step based on the updated weights of $\tilde{W}_K$, $\tilde{W}_V$ 806. At each training step, a new embedded training KB 808 is generated using the updated weights.

Figure 9:
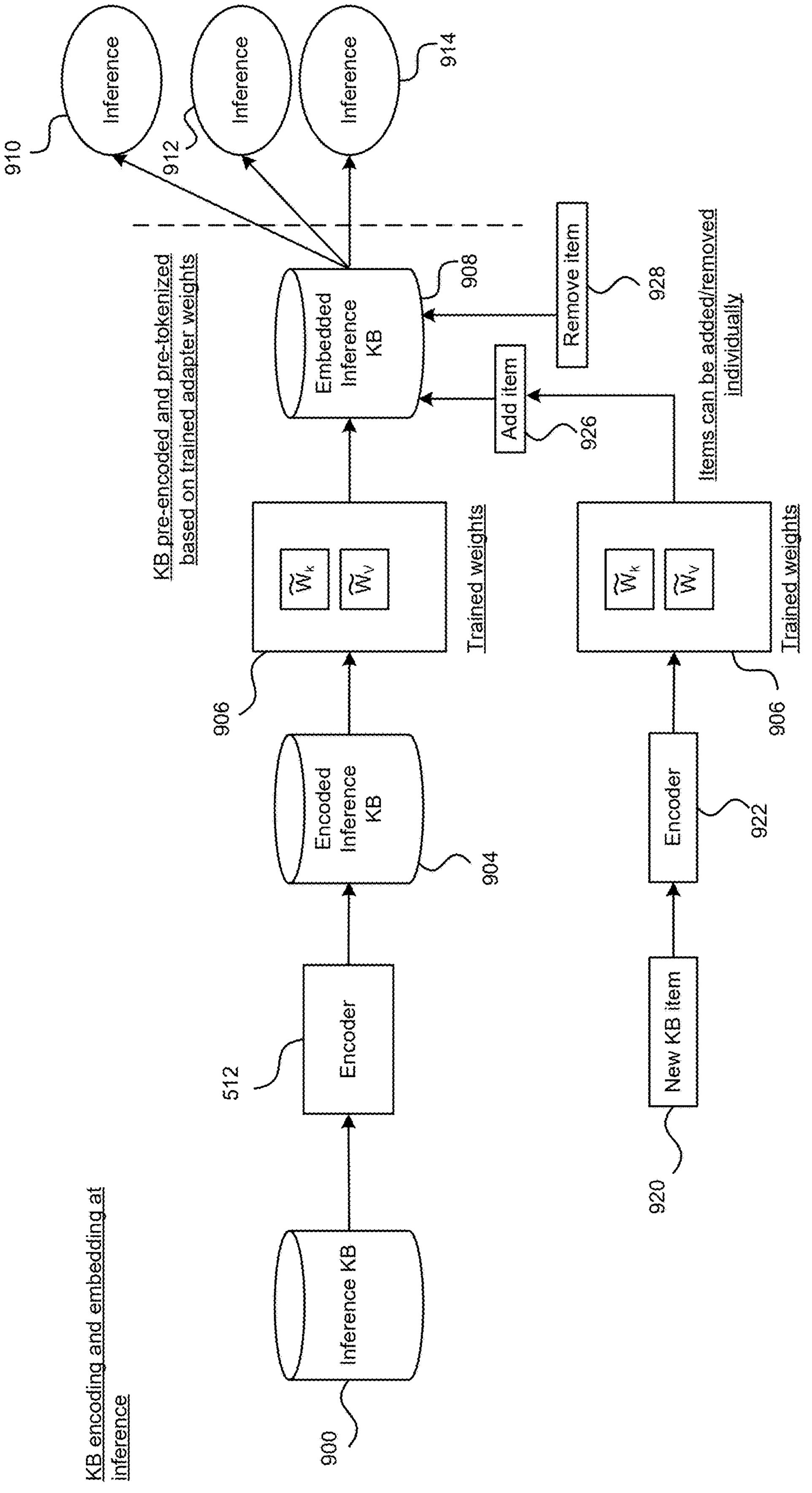
FIG. 9 illustrates certain principles of knowledge base encoding at inference time using the two-stage encoding of FIG. 5.

FIG. 9 shows how at inference, in contrast to FIG. 8, both encoding stages need only be applied once to an inference KB 900, using trained KBK and KBV weights $\tilde{W}_K$, $\tilde{W}_V$, denoted by reference numeral 906. This means an embedded inference KB 908 can be computed offline and reused in multiple inference stages based on different input queries. More precisely, each item of the knowledge base need only be encoded once. Moreover, it is possible to remove (928) an existing item from the embedded KB 908. It is also possible to add items (926) to the KB at different times, without modifying the rest of the KB 908. Note, the inference KB 900 can be different from the training KB 800 used to compute the trained weights 906.

Moreover, the trained KB adapters can be used with different inference knowledge bases, e.g., to support different applications. For example, in applications that use a user-specific knowledge base, the same KB adapters can be used with different user-specific knowledge bases.

Figure 10:
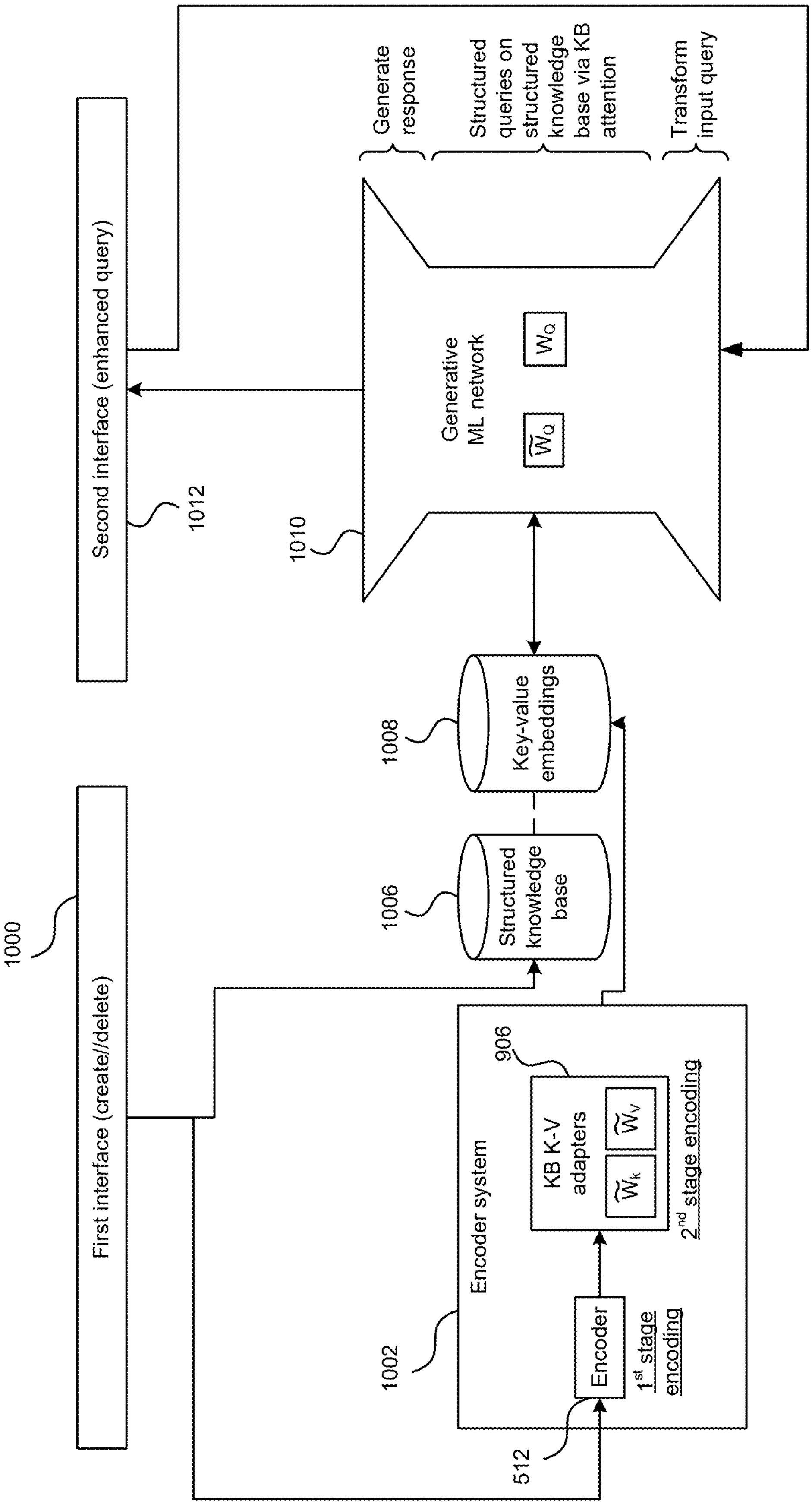
FIG. 10 illustrates an example database management system in which a generative ML network that incorporates rectangular attention is deployed.

FIG. 10 shows how a generative ML network 1010 incorporating rectangular attention can be deployed in a database management system. In the present context, a database management system refers to a structed knowledge base 1006 (which is a database in the sense of a collection of structured data) together with mechanisms for creating items in and deleting items from the structured knowledge base 1006, as well as a mechanism for querying the structured knowledge base 1006. A first interface 1000 is provided, via which items can be created in or deleted from the KB. Each item added to the KB is subject to two-stage encoding in an encoder system 1002 (comprising the encoder 512 and trained KB key and value weights 906, resulting in a key-value embedding. The key-value embeddings are stored in a separate key-value database 1008 that serves as an index to the original KB 1006, with each key-value embedding linked to its corresponding KB item in the original KB 1006. In an alternative embodiment, the key-value embeddings are stored in the KB 1006 itself. In another implementation, only the key-value embeddings are retained post-encoding, and the original KB 1006 item is purged. The first interface 1000 has the form of a user interface in one embodiment. In another embodiment, it has the form of a programmatic interface, such as an application programming interface (API).

An ML network 1010 is shown which is architected as depicted in FIG. 4. Note, in this example the ML network 1010 includes the KBQ adapter weights $\tilde{W}_Q$ (e.g. corresponding to the ML model 300 plus the external KBQ adapter 316*a* of FIGS. 3 and 4). A second interface is provided 1012, via which input queries to the ML network 1010 are generated and responses generated by the ML network 1010 are outputted. In one implementation, the second interface 1012 is a user interface. In another implementation, the second interface 1012 is a programmatic interface such as an API. One or more initial layers of the ML network 1010 operate to transform the input query into a structured, tokenized form conducive to processing within the ML network 1010. Within the network, resulting inputs are used to generate and execute structured queries on the key-value embeddings via the rectangular attention function implemented within the network. One or more final layers of the ML network 1010 transform resulting outputs into a response outputted via the second interface 1012. The second interface 1012 thus serves as an enhanced query interface supported by the generative ML network 1010. In some implementations, the second interface 1012 is capable of receiving unstructured input queries (e.g., natural language queries), but within the generative ML network 1010, these are transformed into a structured format to enable structured queries to be executed on the structured knowledge base 1006 using the described rectangular attention mechanism. In another embodiment, the ML network 1010 can alternatively or additionally receive input queries and/or generate responses of different modalities, such as audio, image, etc.

One application of the database management system of FIG. 10 is to provide an enhanced user interface mechanism. For example, a structured knowledge base 1006 can be generated and updated dynamically based on a user's electronic messages, documents or other data items, etc., enabling a user to execute input queries on those data items. This combines the benefits of generative ML technology with structured KB querying. A user can search for certain items, and if desired request other operations such as summarizing or visualizing those items, e.g., in a text or audio input query, or an input query comprising an image that is used to search the KB. The input query is converted to a structured form within the ML network 1010 to enable the relevant information to be retrieved from the KB via attention.

EXPERIMENTS

The training and evaluation of a KBLM is described below. First, it is shown that the attention matrix, after instruction tuning, has interpretable patterns and works as an accurate retriever. It is then shown that the KBLM can answer questions with performance comparable to in-context learning, but with much lower memory cost, and can scale to 20K triples with little performance degradation. In addition, for questions with no answer in the KB, the model may refuse to answer questions, with "over-refusal" behavior occurring later than in-context learning. Lastly, ablation studies were performed to understand the design choices of the KBLM: The effect of pre-trained encoder fidelity and the frequency for adding knowledge tokens to the self-attention layer.

Model specification: For all experiments, the instruction fine-tuned version of Llama3 8B is used as a backbone LM, and OpenAI's ada-002 sentence embedding model (P=1536) as the pre-trained encoder for computing base key and value embedding.

Further details of Llama3 may be found in Abhimanyu Dubey, Abhinav Jauhri, Abhinav Pandey, Abhishek Kadian, Ahmad Al-Dahle, Aiesha Letman, Akhil Mathur, Alan Schelten, Amy Yang, Angela Fan, et al, "The llama 3 herd of models" [arXiv preprint arXiv:2407.21783, 2024], which is incorporated herein by reference in its entirety.

Optimisation setting: The key and value adapters: $\tilde{W}_K$ and $\tilde{W}_V$ are initialized randomly, and additional query heads $$\tilde{W}_Q^l$$

are initialized at each layer from the pre-trained weights $$W_Q^l.$$

Optimization is conducted using AdamW (Loshchilov, 2017) with a step size of $5\times10^{-4}$ and a cosine learning rate decay to zero for 20K iterations. Each iteration uses a mini-batch of 400 Q&A pairs, composed of 20 micro-batches of 20 samples. The instruction tuning is performed on a single 80 GB A100 GPU under bfloat16 without any parameter-efficient tuning methods.

Further details of AdamW may be found in I Loshchilov, "Decoupled weight decay regularization" [arXiv preprint arXiv:1711.05101, 2017], which is incorporated herein by reference in its entirety.

Construction of the training dataset: The KBLM is trained using instruction tuning, where each training sample consists of a KB, a question, and an answer. These samples are derived from the first 120K entries of a synthetic KB constructed as described above. To construct each training sample, the following procedure is performed: randomly select a subset of 10 to 100 triples from the synthetic KB to form a sample-specific KB. Depending on the instruction type (simple, multi-entity, open-ended, or unanswerable Q&A), one, multiple, or no triples are designated as relevant, with the rest serving as distractors. A question is generated based on the instruction template and the relevant triple(s). In each batch of 20 micro-batches, a distribution of 2 micro-batches of unanswerable Q&A pairs and 6 micro-batches each for the other three Q&A types is maintained. It is found that limiting the KB size during training is useful for successful convergence (note, this does not limit the size of KB to which the trained data extraction model can be applied at inference). To optimize training efficiency, the base key and value vectors are pre-computed offline for all triples in the synthetic KB. This approach ensures a diverse and balanced training set that covers various scenarios the KBLM might encounter during inference while maintaining computational feasibility.

Evaluation dataset: For evaluation, the following two KB datasets were considered:

- Synthetic data. The validation set of the synthetic KB, i.e. the remaining 25000 triples from this synthetic dataset.
- Enron. A KB constructed from the Enron dataset, an open-sourced corporate email dataset. A KB was constructed from the Enron emails data by fine-tuning a small language model and applying Alexandria clustering.

For each validation dataset, <property> in "description", "purpose" and "objectives" were only considered.

Baseline: The following two methods were considered as baselines

- In-context learning. Given a KB, all triples are flattened as strings, and attached in front of the prompt. In-context learning has a memory overhead that grows quadratically with respect to the number of triples.
- Zero-shot learning. Directly ask the LM a particular question and provide no additional context, thus using only the LM's internal knowledge for responding to input queries.

Evaluation setting: For all evaluations, the experiments were repeated with 5 random seeds, each run uses a batch size of 100, i.e. 100 KBs of various sizes were randomly generated and the model was queried with questions about the KB. The results reported are the averaged values over all 500 questions.

Given a question about the mth triple in the KB, certain tokens are expected in the question, particularly those containing the keyword <name>m, to attend more strongly to the mth knowledge token compared to others. This would be reflected in larger values of $$\tilde{w}_{n,m}^l = \langle \tilde{q}_n^l, \tilde{k}_m^l \rangle$$

for these relevant tokens. Such patterns are observed in practice, as visualized in FIG. 12. In particular, a KB of 10 triples is considered and questions about a single, multiple, or irrelevant to the KB are asked to KBLM. Then the post-softmax attention score is plotted at the 15th layer, i.e. the middle attention layer of the 32-layer Llama3 8B, averaged over all 32 attention heads. This property allows KBLM to answer input questions in an interpretable way, as for any query, the top-K triples with the highest attention score can be output simultaneously as supporting evidence.

This behavior suggests that the KBLM's attention mechanism functions implicitly as a retriever. Its retrieval performance may be quantitatively assessed by treating the attention scores $$\tilde{w}_{n,m}^l,$$

$m\in 1, \ldots, M$, as a classification score. In particular, the averaged-over-heads attention score at the 15th layer is again extracted, and the top-1 and top-5 accuracy is evaluated, which represent the percentage of evaluation samples where the true triple received either the highest attention score or was among the top-5 highest scores, respectively.

Figure 13A:
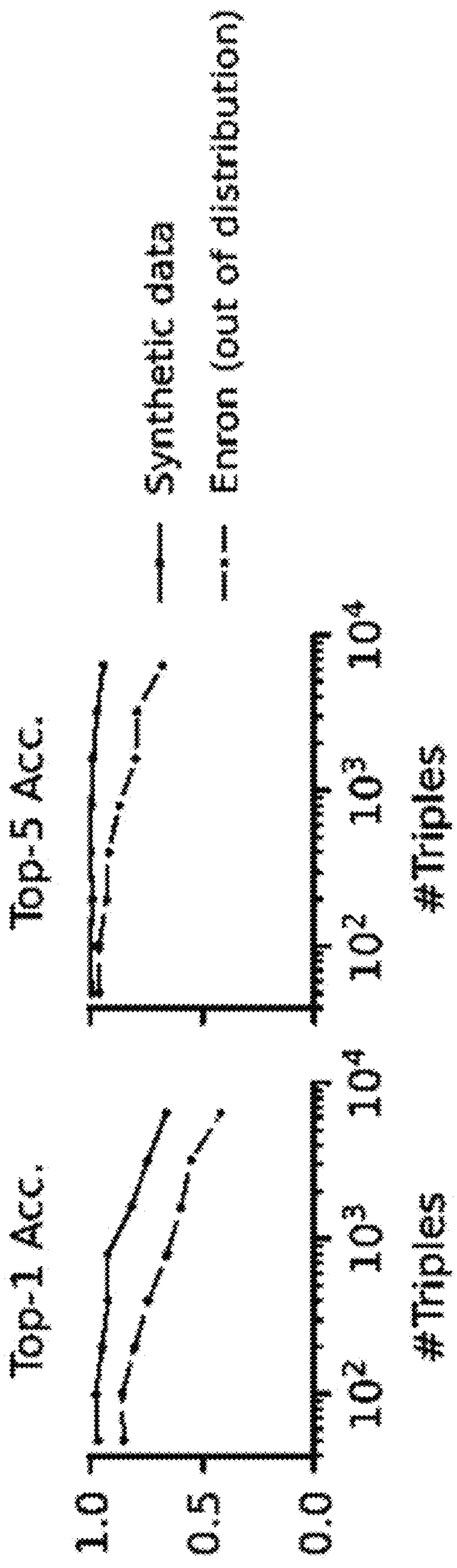

FIG. 13A presents these results, demonstrating that the KBLM's attention remains highly accurate even with a large number of triples, both for in-distribution and out-of-distribution data. FIG. 13A shows that through instruction tuning, the attention shows retrieval behavior. Given simple Q&A on the validation set of the synthetic data (solid line) and Enron dataset (out of distribution, dashed line), the attention score at the 15th layer is used, averaged over all attention heads, as a classification score for each triple and measure the top-1 and top-5 accuracy. The KBLM assigns the highest attention score to the truly relevant triple most of the time.

Notably, this performance is achieved solely through instruction tuning with paired data, without any explicit regularization or retrieval objectives. Imposing regularization on the attention structure would be challenging and potentially counterproductive, as it is unclear which query vectors should be regularized. Instead, allowing the model to learn this structure autonomously proves to be more effective.

The model is queried with three types of questions: Simple Q&A, Two-entities Q&A and open-ended Q&A. For the first two types, the output quality is evaluated using BERT score. For open-ended questions, GPT is used to score the output quality between 1 and 5.

Figure 13C:
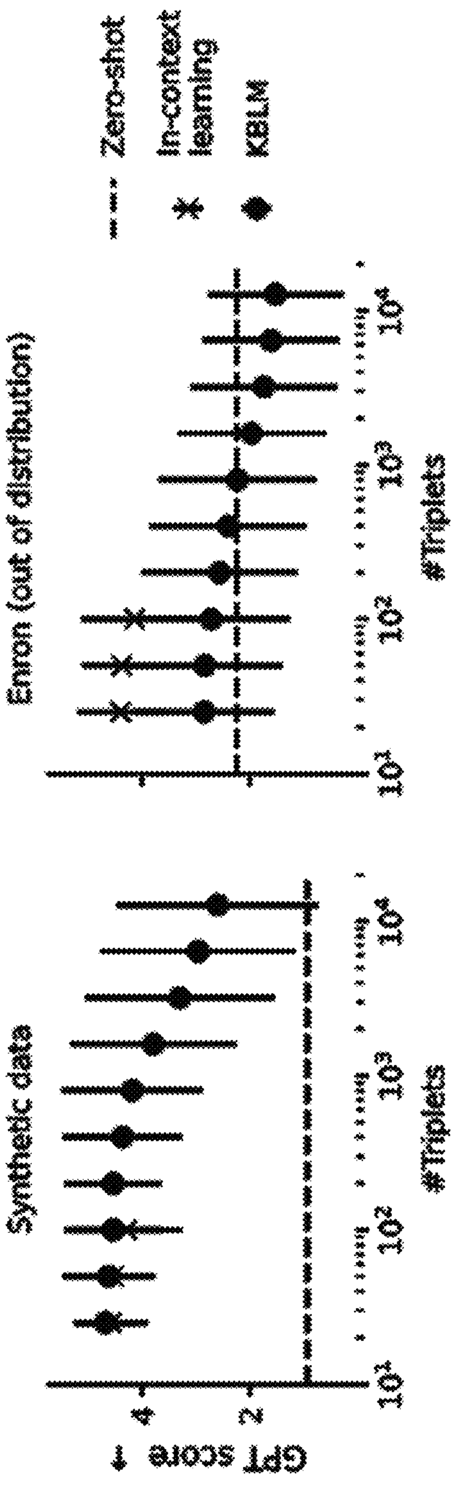

The results are presented in FIG. 13B and FIG. 13C.

FIGS. 13B-C show performance results on Q&A tasks evaluated by BERT and GPT-4 scores. KBLM shows comparable quality to in-context learning on synthetic data while using less memory (FIG. 14). Some degradation occurs with Enron data, which is out-of-distribution. Zero-shot learning fails to provide sensible answers as the questions are not answerable using model's internal knowledge.

FIG. 13C shows that the KBLM can reason about the KB. Judged by GPT, KBLM shows KB reasoning ability comparable to the pre-trained LM's in-context learning's performance. Zero-shot learning fails to provide sensible answers as the questions are not answerable using model's internal knowledge.

Broadly, it is shown that on the synthetic dataset, the KBLM shows performance comparable to in-context learning, but with a much smaller memory footprint, as seen in FIG. 14, and hence better scalability. On Enron, the out-of-distribution data, KBLM exhibits some performance degradation for the largest KBs, but still performs materially better than the zero-shot baseline below $M \sim 10^3$, indicating that the KBLM is using the KB information effectively. In any event, notice that Enron has <value>s that look entirely different from that of the synthetic data, therefore, such performance degradation may be alleviated by using a larger and more diverse synthetic dataset or through a synthetic dataset derived from the real dataset (e.g. mirroring the format of the real-dataset). In other words, the Enron results in FIG. 13C reflect the limitations of the experiments rather than the KBLM architecture itself, and by expanding the training set, results more similar to those on the left-hand side should be achievable over a wider range of inference KBs.

Notice that for in-context learning, a maximum number of 200 triples can be experimented with due to memory constraints, as shown in FIG. 14. This is the reason the in-context learning results are limited in FIG. 13B—experiments could only be run within the available physical GPU memory.

If the model can refuse to answer a question in case it cannot find relevant information in the context, then the risk of model hallucinations can be largely controlled. A setting is considered where, given a KB, the model is asked 100 questions in total, out of which 80 questions are answerable, and the other 20 are not. The unanswerable questions are then considered as the positive class and answerable questions as negative. To evaluate the model, standard binary classification metrics, precision, recall, are used and F1. The performance of the KBLM is compared with in-context learning, where the LM is explicitly prompted with the following instructions: "if relevant information cannot be found in the text, please respond I am sorry I cannot find relevant information in the KB".

Figure 13D:
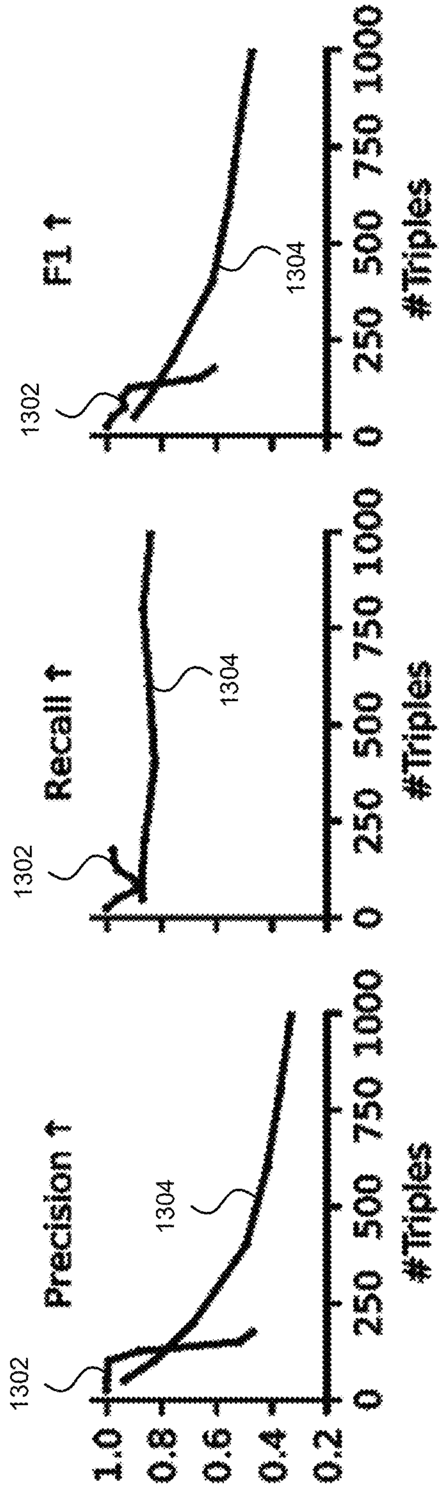

The results are presented in FIG. 13D which shows that the KBLM can determine what is not contained in the KB. Reference numeral 1304 denotes results for the KBLM, whereas reference numeral 1302 denotes in-context learning results. Questions without a corresponding triple that would inform the answer in the KB are considered as positive class (20 percent of 100 questions) and answerable questions as negative class. Standard binary classification metrics are used to measure whether the model knows to say that it "Cannot find relevant information" when it is supposed to say so. Both in-context learning and the KBLM show over-refusal when the number of triples grows larger (degradation in Precision), however, the KBLM degrades more slowly.

Broadly, when the number of triples increases, both the KBLM and in-context learning show decreased precision (the models start to incorrectly refuse for having not found the information). However, in-context learning shows more drastic decrement. The recall for both methods stays constant (both methods would not start to hallucinate as more triples are added).

Lastly, ablation studies were conducted on the design choices of the KBLM.

Choice of encoders: the KBLM relies on a pre-trained sentence encoder, and the capacity of the encoder may affect the performance. Some open-sourced alternatives from sentence transformer (Reimers & Gurevych, 2019) were experimented with. Broadly it was observed that the commercial OpenAI embedding works somewhat better than the open-sourced one, models with higher embedding dimensions perform better than those with lower dimensions. Results for different encoders are shown in FIG. 13E all-MiniLM-L6-v2, P=384 (1310); all-mpnet-base-v2, P=768 (1312); ada-002, P=1536 (1314); text-embedding-large, P=3072 (1316).

Figure 13E:
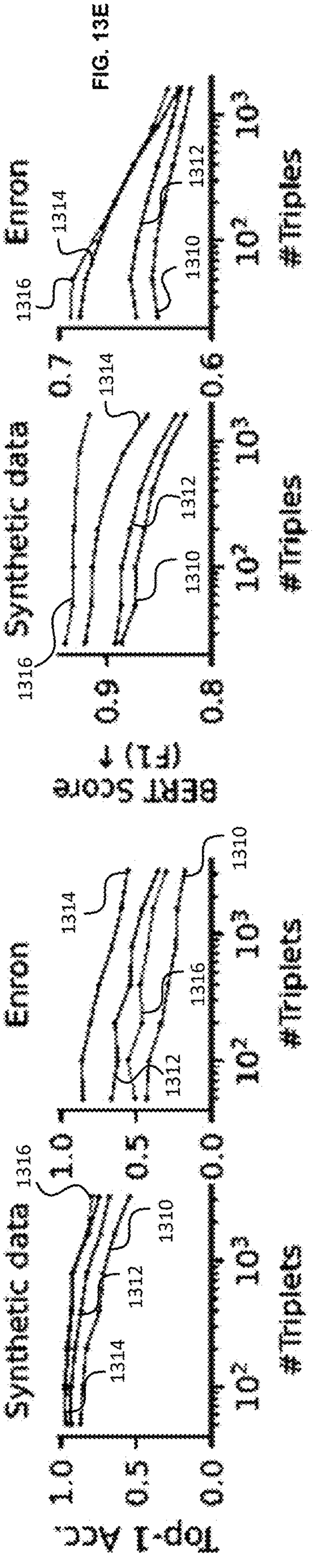

Details of the alternative sentence encoders referred to in FIG. 13E may be found in Nils Reimers and Iryna Gurevych, Sentence-bert: Sentence embeddings using siamese bert-networks "In Proceedings of the 2019 Conference on Empirical Methods in Natural Language Processing. Association for Computational Linguistics, 11 2019" [https://arxiv.org/abs/1908]10084, which is incorporated herein by reference in its entirety.

Where to add knowledge tokens: Previously, it was noted that the attention score from the $15^{th}$ layer exhibits accurate retrieval behavior. Extending this analysis to other layers, it is found that they do not demonstrate such straightforward accuracy (although further probing might reveal more nuanced patterns). This appears to indicate that the amount of KB information provided by the knowledge tokens vary at different layers provide. To better understand this, the variation of keys and values at each layer $$\left(\mathbb{V}_m\left[\tilde{k}_m^l\right] \text{ and } \mathbb{V}_m\left[\tilde{v}_m^l\right]\right)$$

across triples are examined and it is observed that encoder outputs vary minimally in earlier layers.

Figure 13F:
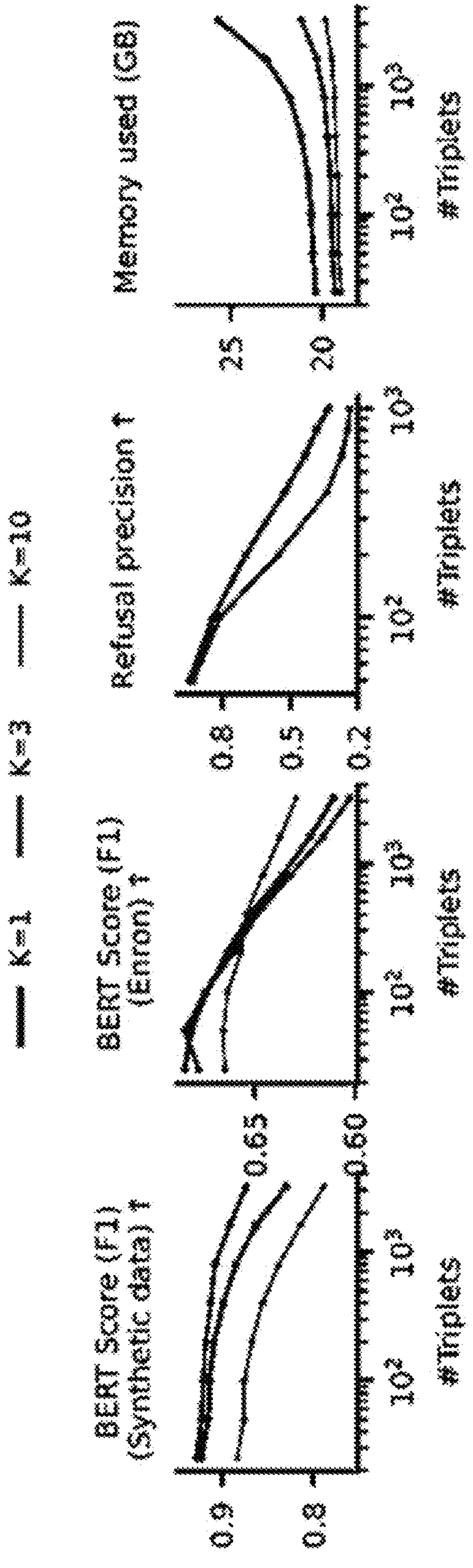
Figure 15:
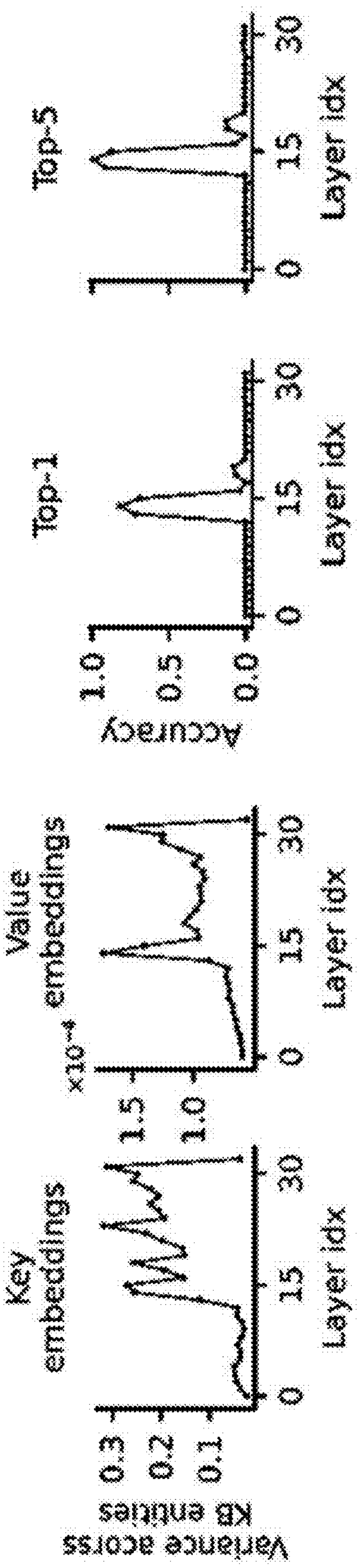
FIG. 15 shows graphs summarizing an information content analysis of knowledge token embeddings across layers of a knowledge-augmented language model.

Frequency of knowledge tokens: The previous observation indicates that the knowledge tokens may not be providing information about the KB at every layer, therefore varying the frequency K of adding knowledge tokens was considered. That is, for certain attention layers of KBLM, conventional self-attention was used instead of rectangular attention. Broadly, it was noted that with lower frequency, the model tends not to follow instructions: When K=10, the KBLM fails to provide any refusal answer. As such it appears that knowledge tokens in earlier layers may serve as soft instruction prompts that guides the LM how to use the KB. These results are summarized in FIG. 13F. As knowledge tokens are added to attention, the model performance drops (K=10), but the memory overhead decreases and efficiency increases. The BERT score of K=3 is comparable to K=1, however when K=3, the model shows lower precision at refusing answering unanswerable questions (third column), and when K=10, the model fails to output refusal answers. FIG. 15 shows that knowledge tokens' embeddings contain various level of KB information across layers. The embeddings in earlier layers vary less among different entities, indicating that they may serve as instruction prompt on how to use the KB . . . . Later layers show a higher degree of variation, indicating that they may be used to provide actual knowledge.

In summary, a new regime for augmenting external knowledge into pre-trained LMs is disclosed and tested herein. A setting where the unstructured external corpus is transformed into a structured knowledge base through KB construction tools is described, which summarizes the information in the data and generates knowledge triples containing an entity name (head), a property (relation), and a value (tail). Then, the approach presented herein fully leverages the structure of the KB, enabling efficient integration of external knowledge into LMs.

Firstly, the KBLM utilizes the structure inside each triple to map each triple into a fixed-length key-value vector pair, referred to as a knowledge token, which has sizes identical to the KV cache of a single token and can be seamlessly incorporated into each attention layer of the LM. In particular, the described approach encodes from the name (head) and the property (relation) into a key vector, which serves as an identifier, mimicking the key embedding of a token; the value (tail) into a value vector, which provides the actual content, similar to the value embedding of a token.

Figure 12:
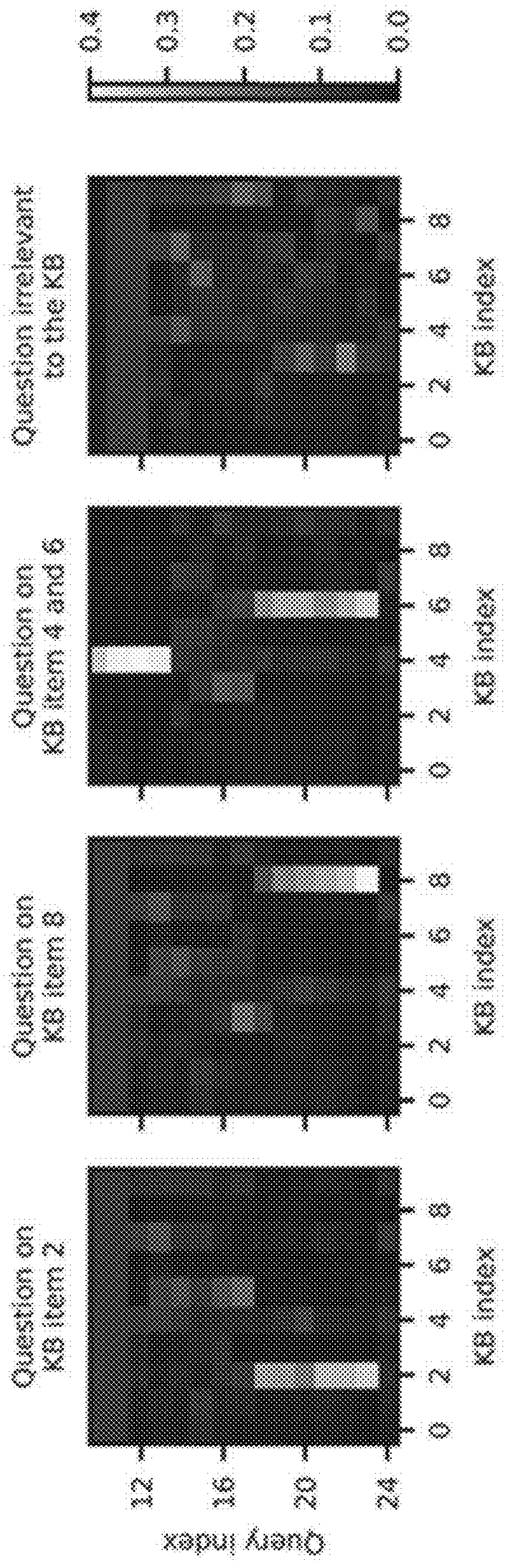
FIG. 12 illustrates an interpretable attention matrix.

Then, the approach presented herein utilizes the structure between triples to augment knowledge tokens into an LM's attention in a scalable and dynamic way using a simple rectangular attention structure: Triples with different <name> and <property> can be considered to represent independent pieces of information, therefore knowledge token from each triple would be encoded and injected into pre-trained LM independently. This allows the complexity of the KB augmented model (memory and time) to grow linearly with respect to the number of triples, unlike in-context learning's quadratically growing overhead, giving the described approach much better scalability. Additionally, the independence allows updating/removing/adding a triple by only modifying its corresponding single knowledge token without any further changes, which is not achievable in, e.g. standard KV cache mechanism. Additionally, the attention matrix under such design is highly interpretable, as shown in FIG. 12, the model's utilization of the knowledge can be directly inspected by seeing the attention score.

Lastly, it has been shown that linear adapters can be learned using instruction tuning on purely synthetic data and the learned encoder generalizes to real data. In particular, different from standard model fine-tuning, which aims at memorizing knowledge into weights, the learning process aims at finding a projection between the pre-trained sentence encoder space and LM's embedding space, which motivates the use of synthetic data, since the knowledge in the training data is not of interest at inference.

Compared with RAG, rectangular attention incorporates all external information in the context and answers input prompts in an end-to-end way, similar to in-context learning. Indeed, the rectangular attention-based approach also shows empirical performance comparable to in-context learning but with significantly better scalability to more than 20K triples. In addition, through instruction tuning, the KBLM can refuse to provide an answer if the information required to answer the question is not present in the KB, improving the reliability of the model and reducing hallucinations.

A method for augmenting pre-trained LMs with external knowledge bases (KBs) is presented herein. It is demonstrated that KB triples can be efficiently encoded into single knowledge tokens—continuous key-value vector pairs equivalent in size to one LM token—using a pre-trained sentence encoder with a learned linear adapter. These tokens are incorporated into the LM through a modified attention structure, enabling linear scaling with KB size and allowing dynamic knowledge updates without model fine-tuning. The encoder is trained end-to-end using instruction tuning on synthetic data.

The methods presented herein efficiently augments an external knowledge base into a pretrained LM or other ML model, e.g., generative model. The feasibility of representing external knowledge as dense continuous vectors has been demonstrated, offering a more efficient alternative to traditional discrete string representations.

Additionally, leveraging the inherent independence structure in the context, particularly the independence between triples, offers several key advantages, including bypassing the expensive self-attention over the potentially very-large external knowledge source; allowing dynamic update of the external knowledge without fine-tuning or re-computation of KV cache; and better interpretability of model's knowledge utilization. Additionally, under such independent structure, combined with proper instruction tuning, attention itself can perform retrieval providing an alternative to RAG with simpler pipeline. Lastly, it is shown that on problems where memorizing information into the weights is not of interest, it is possible to use fully synthetic data.

The ML architecture described herein, and the rectangular attention mechanism in particular, has many practical applications in various fields of technology. In broad terms, the ML model could, for example, be configured as a declarative network, used for, say, classification or regression tasks (a declarative network, broadly speaking, learns to generate predictions on previously unseen data), or a generative network (which, broadly speaking, has the ability to generate new datapoints). Applications of the ML model include: image classification or extracting information from images (e.g., classifying images, image regions, or image pixels; locating objects in images, e.g., by predicting object bounding boxes, etc.); text classification; the extraction of structured or semi-structured information from text; audio signal classification (e.g., classifying different parts of an audio signal, e.g., in the context of voice recognition, to separate speech from non-speech, or to convert speech to text); extracting information from sensor signals, e.g., performing measurements using a classification or regression network operating on signals from one or more sensors, for example, in a machine control application (e.g., such measurements may be used to measure physical characteristics of or relevant to a machine or system such as a vehicle, robot, manufacturing system, energy production system, etc.), or in a medical sensing application such as patient monitoring or diagnostics (e.g., to monitor and classify a patient's vitals). Other applications include generating images (e.g., based on a text or non-text input), text (e.g., translating text from one language to another, or generating a response to a user's text input), audio data (e.g., synthetic speech, music, or other sounds) or music (e.g., in digital or symbolic music notation), computer code that may be executed on a processor (e.g., computer code to control or implement a technical process on a computer or machine, e.g., generating code in response to a user's instructions express in natural language, translating or compiling code, such as source code, object code or machine code, from one programming language to another); and modeling or simulation of physical, chemical, and other technical systems, or discovering new chemical components or new uses thereof (including 'drug discovery' applications, to discover new therapeutic compounds or medicines, or new therapeutic uses). Any of the aforementioned applications, among others, may be improved in terms of performance (e.g., accuracy, precision, robustness/reliability) when supported by a structured knowledge base. The system also has applications in cybersecurity. For example, a cybersecurity-specific knowledge base may be constructed to support an ML model carrying out a cybersecurity function, such as identifying anomalous or potentially suspicious data points or signals in cybersecurity data (which may, for example, embody cybersecurity telemetry collected using endpoint software and/or network monitoring component(s), etc.), or patterns indicative of potentially suspicious activity or behavior, so that an appropriate reporting, remediation, or other cybersecurity action may be taken (e.g., generating an alert; terminating or quarantining an application, service, or process; revoking user or application privileges; etc.) based on an output of the ML model supported by the knowledge base (e.g., a detection output indicating potentially suspicious activity/behavior that has been detected, or another form of cybersecurity detection outcome). A generative cybersecurity model supported by a knowledge base may, for example, be configured to generate 'synthetic' cybersecurity data, e.g., for the purpose of training, testing, or validating other cybersecurity component(s) and model(s). Another example application is generating an industrial output (e.g., for controlling or configuring an industrial machine, such as a manufacturing machine). Another example application is advanced engineering, in which a model output is used detect, diagnose and/or mitigate machine or system faults, or to design or manufacture (or assist in the design or manufacture) of a machine or other technical system. Another application is system optimization, for example detecting and mitigating performance issues (e.g. runtime performance issues) in a computer or computer system, or optimizing usage of resources (such as computational resources or memory resources) based on an ML analysis of a software or hardware system.

Figure 16:
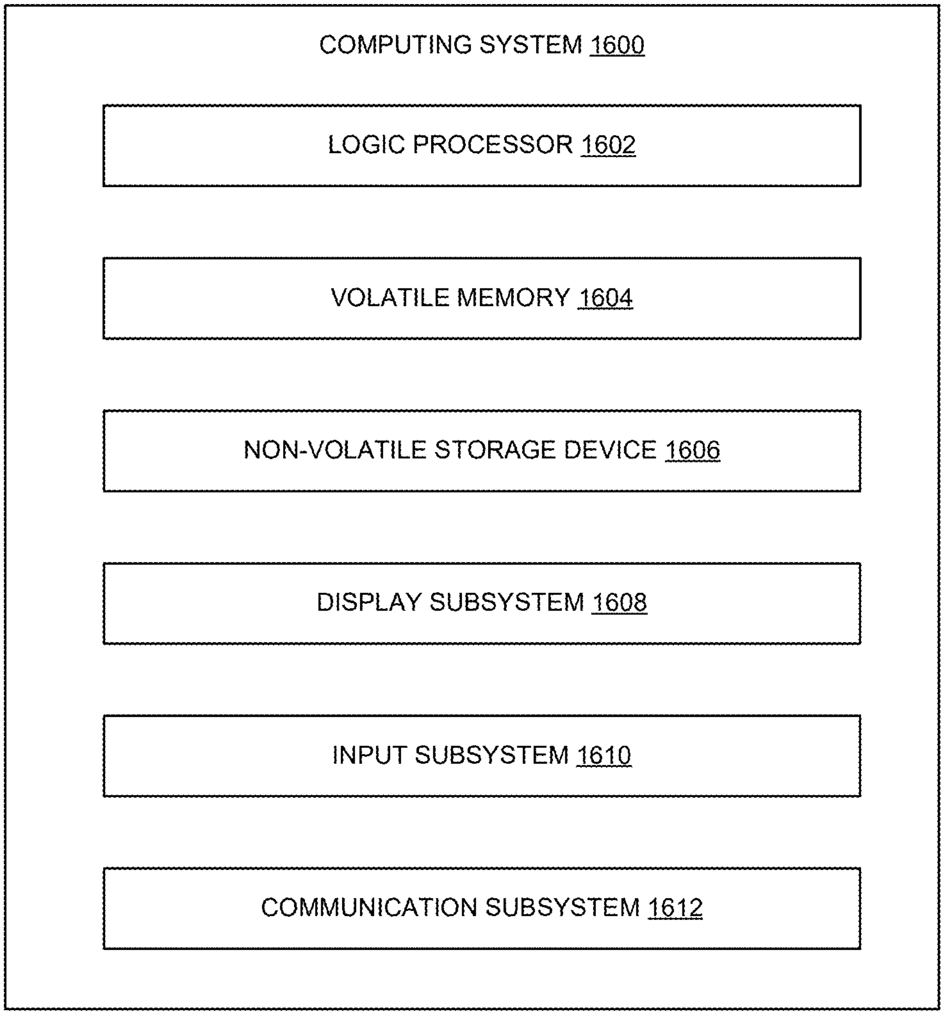
FIG. 16 schematically illustrates an example computing system that can enact one or more of the methods or processes described herein.

FIG. 16 schematically shows a non-limiting example of a computing system 1600, such as a computing device or system of connected computing devices, that can enact one or more of the methods or processes described above. Computing system 1600 is shown in simplified form. Computing system 1600 includes a logic processor 1602, volatile memory 1604, and a non-volatile storage device 1606. Computing system 1600 optionally includes a display subsystem 1608, input subsystem 1610, communication subsystem 1616, and/or other components not shown. Logic processor 1602 comprises one or more physical (hardware) processors configured to carry out processing operations. In some examples, the logic processor 1602 is configured to execute instructions that are part of one or more applications, programs, routines, libraries, objects, components, data structures, or other logical constructs. In some examples the logic processor 1602 includes one or more hardware processors configured to execute software instructions based on an instruction set architecture, such as a central processing unit (CPU), graphical processing unit (GPU), tensor processing unit (TPU), intelligence processing unit (IPU) or other form of accelerator processor. In some examples, the logic processor 1602 alternatively or additionally includes a hardware processor (or processors) in the form of a logic circuit or firmware device configured to execute hardware-implemented logic (programmable or non-programmable) or firmware instructions. The processor (s) of the logic processor 1602 may be single-core or multi-core, and the instructions executed thereon may be configured for sequential, parallel, and/or distributed processing. Individual components of the logic processor optionally are distributed among two or more separate devices in some examples. In some such examples, such devices are remotely located from each other and/or configured for coordinated processing. Aspects of the logic processor 1602 are virtualized and executed by remotely accessible, networked computing devices configured in a cloud-computing configuration in some examples. In such a case, these virtualized aspects are run on different physical logic processors of various different machines. Non-volatile storage device 1606 includes one or more physical devices configured to hold instructions executable by the logic processor 1602 to implement the methods and processes described herein. When such methods and processes are implemented, the state of non-volatile storage device 1606 is transformed in some examples, e.g., to hold different data. Examples of non-volatile storage devices includes physical devices that are removable and/or built-in. Examples of non-volatile storage devices include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive), or other mass storage device technology. Examples of non-volatile storage devices include nonvolatile, dynamic, static, read/write, read-only, sequential-access, location-addressable, file-addressable, and/or content-addressable devices. Volatile memory 1604 includes one or more physical devices that include random access memory in some examples. Volatile memory 1604 is typically utilized by logic processor 1602 to temporarily store information during processing of software instructions. Aspects of logic processor 1602, volatile memory 1604, and non-volatile storage device 1606 are integrated together into one or more hardware-logic components in some examples. Examples of such hardware-logic components include without limitation field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" are used to describe an aspect of computing system 1600 implemented in hardware or software by a processor to perform a particular function using portions of volatile memory, which function involves transformative processing that specially configures the processor to perform the function. In some examples, a software module, program, or engine is instantiated via logic processor 1602 executing instructions held by non-volatile storage device 1606, using portions of volatile memory 1604. Different modules, programs, and/or engines are instantiated from the same application, service, code block, object, library, routine, API, function, etc. in some examples. Likewise, the same module, program, and/or engine are instantiated by different applications, services, code blocks, objects, routines, APIs, functions, etc. in other examples. The terms "module," "program," and "engine" encompass among other things individual or groups of executable files, data files, libraries, drivers, scripts, database records, etc. When included, display subsystem 1608 is configurable to present a visual representation of data such as data held by non-volatile storage device 1606. The visual representation takes the form of a graphical user interface (GUI) in some examples. As the herein described methods and processes change the data held by the non-volatile storage device, and thus transform the state of the non-volatile storage device, the state of display subsystem 1608 is likewise transformed to visually represent changes in the underlying data in some examples. Display subsystem 1608 includes one or more display devices utilizing virtually any type of technology. Such display devices are combined with logic processor 1602, volatile memory 1604, and/or non-volatile storage device 1606 in a shared enclosure in some examples. In other examples, such display devices are peripheral display devices. When included, input subsystem 1610 comprises or interfaces with one or more input devices such as user-input devices such as a keyboard, mouse, touch screen, or game controller. In some embodiments, the input subsystem comprises or interfaces with selected natural user input (NUI) componentry. Such componentry may be integrated or peripheral, and the transduction and/or processing of input actions may be handled on- or off-board. Examples of NUI componentry include without limitation a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 1616 is configured to communicatively couple various computing devices described herein with each other, and with other devices. Communication subsystem 1616 may include wired and/or wireless communication devices compatible with one or more different communication protocols. In some examples, the communication subsystem is configured for communication via a wireless cellular network, or a wired or wireless local- or wide-area network. In some embodiments, the communication subsystem allows computing system 1600 to send and/or receive messages to and/or from other devices via a network such as the internet. The term computer readable media as used herein includes for example computer storage media. Computer storage media includes for example volatile and non-volatile, removable and nonremovable media (e.g., volatile memory 1604 or non-volatile storage 1606) implemented in any method or technology for storage of information, such as computer readable instructions, data structures, or program modules. Computer storage media includes for example RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g., the computing system 1600 or a component device thereof). Computer storage media does not include a carrier wave or other propagated or modulated data signal. Communication media is embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. Examples of communication media include without limitation wired media such as a wired network or direct wired connection, and wireless media such as acoustic, radio frequency (RF), infrared, and other wireless media.

Additional example aspects and embodiments are set out below.

Example 1. A computer-implemented method, comprising: in an attention layer of machine learning (ML) network: receiving an input tensor; generating, by a model query adapter, a model query tensor based on the input tensor; receiving an embedded knowledge base (KB) comprising a KB key tensor and a KB value tensor; generating, by a KB query adapter, a KB query tensor based on the input tensor; evaluating an attention function that combines: attention over a model value tensor based on the model query tensor and a model key tensor, with attention over the KB value tensor based on the KB query tensor and the KB key tensor, resulting in an output tensor.

Example 2. The method of Example 1, wherein the KB query adapter has been trained on a data retrieval training task; and wherein the model query adapter has been trained on a model training task independently of the KB query adapter.

Example 3. The method of Example 1 or 2, comprising: retrieving from a structured KB a first key-value pair; generating, by a KB key adapter, a first KB key vector based on a first key of the first key-value pair; generating, by a KB value adapter, a first KB value vector based on a first value of the first key-value pair; retrieving from the structured KB a second key-value pair; generating, by the KB key adapter, a second KB key vector based on a second key of the second key-value pair; generating, by the KB value adapter, a second KB value vector based on a second value of the second key-value pair; wherein the KB key tensor comprises the first KB key vector and the second KB key vector, and the KB value tensor comprises the first KB value vector and the second KB value vector.

Example 4. The method of Example 3, wherein the KB query adapter, the KB key adapter and the KB value adapter have been trained on a data retrieval training task; and wherein the model query adapter has been trained on a model training task independently of the KB query adapter.

Example 5. The method of any preceding Example, wherein the model query tensor comprises multiple model query vectors, wherein the KB query tensor comprises multiple KB query vectors, and the output tensor comprises multiple output vectors.

Example 6. The method of any preceding Example, comprising: generating, by a model key adapter, the model key tensor; generating, by a model value adapter, the model value tensor; wherein the model key adapter generates a model key tensor based on the input tensor, wherein the model value adapter generates the model value tensor based on the input tensor, and wherein the attention over the model value tensor is self-attention.

Example 7. The method of Example 6, wherein the model query tensor comprises multiple model query vectors, wherein the KB query tensor comprises multiple KB query vectors, and the output tensor comprises multiple output vectors, wherein the attention function selectively masks the model value tensor dependent on a position of the output vector in the output tensor.

Example 8. The method of any preceding Example, wherein the input tensor encodes text.

Example 9. The method of any preceding Example, wherein the input tensor encodes image data or audio data.

Example 10. The method of any preceding Example, comprising generating, by the ML network, based on the output tensor: text, image data, or audio data.

Example 11. The method of Example 3 or any Example dependent thereon, wherein the model query adapter has been trained on a model training task independently of the KB query adapter, the method comprising: training the KB query adapter, the KB key adapter and the KB value adapter based on a training loss function dependent on the output tensor, resulting in a trained KB query adapter.

Example 12. The method of Example 11, wherein the input tensor encodes a training query associated with a ground-truth response, wherein the loss function measures a difference between the ground-truth response and a generated response generated by the ML network dependent on the output tensor.

Example 13. The method of Example 12, comprising generating the training query and ground-truth response using the structured KB.

Example 14. The method of Example 13, wherein the structured KB is a synthetic structured KB, the method comprising generating the synthetic structed KB using a trained generative model.

Example 15. The method of Example 3 or any Example dependent thereon, wherein the first key is a first fixed-length key vector encoding a first key portion of a first structured data item; wherein the first value is a first fixed-length value vector encoding a first value portion of the first structured data item; wherein the second key is a second fixed-length key vector encoding a second key portion of a second structured data item; wherein the second value is a second fixed-length value vector encoding a second value portion of the second structured data item.

Example 16. The method of Example 15, wherein the first key portion comprises a first entity name and a first entity property, and the second key portion comprises a second entity name and a second entity property.

Example 17. The method of any preceding Example, wherein the machine learning (ML) network has a transformer architecture.

Example 18. The method of any preceding Example, comprising: generating, by a model key adapter, the model key tensor; and generating, by a model value adapter, the model value tensor.

Example 19. The method of Example 2 or any Example dependent thereon, comprising: generating, by a model key adapter, the model key tensor; generating, by a model value adapter, the model value tensor; wherein the model query adapter, the model key adapter and the model value adapted have been trained on a model training task independently of the KB query adapter.

Example 20. The method of any preceding Example, comprising: generating a response based on the output tensor; and outputting the response or, based on the response: controlling or implementing a technical process; detecting, identifying or mitigating a fault, anomaly or instance of suspicious activity in a machine, device, system or network; or performing a medical diagnosis.

Example 21. The method of any preceding Example, comprising: receiving an input query; and generating the input tensor based on the input query.

Example 22. A database management system, comprising: at least one hardware processor configured to: receive a data item; encode the data item using a first trained key weight tensor and a first trained value weight tensor, resulting in a first key vector and a first value vector; store in a database the first key vector and the first value vector; receive an input query; input the input query to a machine learning (ML) network; receive from the ML network an input token embedding generated within the ML network; retrieving from the database the first key vector and the first value vector; generate a first query vector based on the input token embedding and a first trained query weight tensor; input to an attention layer of the ML network: the first query vector, the key value vector and the first value vector, thereby causing the attention layer of the ML network to evaluate an attention function that combines: attention over the first value vector based on the first query vector and the first key vector, with attention over a second value vector based on: a second value vector, and a second query vector generated within the ML network based on the input token embedding independently of the first query weight tensor; receiving a generated response to the input query from an output layer of the ML network coupled to the attention layer; and outputting the generated response.

Example 23. The database management system of Example 22, wherein the first key vector and the first value vector are stored in the database prior to receiving the input query.

Example 24. The database management system of Example 22 or 23, wherein the second query vector is generated within the ML network based on the input token embedding.

Example 25. Computer-readable storage media embodying computer-readable instructions, which are configured upon execution on at least one processor to cause the at least one processor to perform operations comprising: receiving an input tensor; generating, based on the input tensor and a trained knowledge base (KB) query weight tensor, a KB query vector; inputting, to an attention layer of a machine learning (ML) network, an embedded KB comprising a KB key tensor and a KB value tensor, thereby causing the attention layer to evaluate an attention function that combines: attention over the KB value tensor based on the KB query vector and the KB key tensor, with attention over a model value tensor based on: a model key tensor, and a model query vector generated within the ML network based on the input tensor independently of the trained KB query weight tensor, resulting in an output tensor.

Example 26. A computer-implemented method, comprising: in an attention layer of machine learning (ML) network: receiving an input tensor; generating, by a model query adapter, a model query vector based on the input tensor; receiving an embedded knowledge base (KB) comprising a KB key tensor and a KB value tensor; generating, by a KB query adapter, a KB query vector based on the input tensor; evaluating an attention function that combines: attention over a model value tensor based on the model query vector and a model key tensor, with attention over the KB value tensor based on the KB query vector and the KB key tensor, resulting in an output vector.

Example 27. The method of Example 26, wherein the model query vector is one of multiple model query vectors of a model query tensor, wherein the KB query vector is one of multiple KB query vectors of a KB query tensors, and the output vector is one of multiple output vectors of an output tensor, wherein the output vector, the model query vector and the KB query vector have mutually corresponding positions in the output tensor, the model query tensor and the KB query tensor respectively.

Example 28. The method of Example 26 or Example 27, wherein the model query vector is one of multiple model query vectors of a model query tensor, wherein the KB query vector is one of multiple KB query vectors of a KB query tensors, and the output vector is one of multiple output vectors of an output tensor, wherein the attention function selectively masks the model value tensor dependent on a position of the output vector in the output tensor, the position of the output vector corresponding to a position of the model query vector in the model query tensor and to a position of the KB query vector in the KB query tensor.

Example 29: The method of any of Examples 25 to 28, comprising: receiving an input query; generating the input tensor based on the input query; generating a response based on the output tensor; and outputting the response.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the present disclosure.

APPENDIX A

Appendix A presents a selection example triples from both KBs, where each triple is of format (<name>; <property>; <value>)

Ten examples used in the Experiments are given, from the synthetic KB (Table. 1) and from Enron (Table. 2) respectively.

TABLE 1

| Synthetic KB | | |
|---|---|---|
| <name> | <property> | <value> |
| Posh Poodle | description | A line of organic teas with health-boosting properties |
| Maserati Vasco da Gama | description | A smart lighting system with customizable settings |
| ThornTactician | description | A historical strategy game set in ancient Rome. Conquer the empire |
| Bohr's Bookshelf | purpose | To promote a sense of calm and improve quality of life |
| Pixelated Prose | purpose | To raise awareness about the ethical implications of technology |
| Matrix Monument | description | A historical library housing rare manuscripts, books, and documents |
| Nova Citadel | description | A secure data center offering cloud storage and cybersecurity services |
| Celestial Genome | objectives | Test radiation shields, monitor devices, and come up with fixes |
| The Mamas and the Papas | objectives | To provide guidance, build a supportive network, and promote positive parenting practices |
| The Doom That Came to Sarnath | description | A high-stakes fashion competition featuring talented designers from around the world. It's a showcase of creativity and style |

TABLE 2

| Enron KB | | |
|---|---|---|
| <name> | <property> | <value> |
| Fill Order | description | Feature that allows traders to automatically fill any order that is at the top of the stack. |
| Allen & Overy | description | A solicitors' partnership |
| EAP PA | description | Part of the PA's list |
| Analyst Recommendations Screener | purpose | Screen for attractive stocks using Wall Street analysts' opinions |
| Financial Accounting Standard 133 | description | A standard that deals with accounting rules for derivatives and other financial instruments. |
| Vividence | description | A customer management applications firm. |
| LD Calculation Methodology | description | A methodology proposed by CDWR for consistency among contracts, viewed as more 'objective' by CDWR. |
| Boxed Trio of Rosewood Stoppers | description | Uniquely shaped rosewood stoppers protect opened wines from rapid oxidation. |
| Learning Company | description | A troubled software company sold by Mattel to a buy-out firm in exchange for a share of future profits. |
| Code 238 | description | Reflects dollars paid to a generator for DAM Contract Balancing that is Out-of-Merit for LRR. |
| Validata | purpose | Pre-employment screening services |

APPENDIX B

Prompt

In this Appendix, prompts used in the above experiments are provided.

B.1 Prompt for Synthetic KB Generation

To prompt the GPT-4 for generating a synthetic KB, we begin by setting a system prompt as You are a AI system that generates synthetic data examples in JSON format Then we construct a list of idea types and a list of object types: idea_types=['greek letters', 'fiction characters', 'famous rock bands', 'birds', 'animals', 'natural phenomena', 'physical locations', 'artist names', 'classical music', 'musical instruments', 'music genres', 'art styles', 'ancient Roman concepts', 'Hindu myths', 'Cthulhu Mythos', 'real-world company names', 'mythological creatures', 'planets and stars', 'historical figures', 'literary genres', 'botanical names', 'famous landmarks', 'scientific concepts', 'space missions', 'inventions', 'philosophical terms', 'chemical elements', 'famous scientists', 'marine life', 'mythological places']

object_types=['education company', 'tech company', 'car company', 'entertainment company', 'construction company', 'retail company', 'finance company', 'healthcare company', 'restaurant', 'hotel', 'github repo', 'project', 'meeting room', 'building', 'lab', 'airline', 'textbook', 'website', 'personal blog', 'gaming company', 'consulting firm', 'biotech company', 'app', 'software tool', 'bookstore', 'e-commerce site', 'social media platform', 'fitness brand', 'fashion brand', 'non-profit organization']

Then for each combination of object type and idea type in the list, we prompt GPT with Please randomly generate 50 object_type name innovated by idea_type. The name should have various styles. The generated name should be of diverse style and length, for example the name could have hyphen, space in it or multiple words. which gives us 50 different names. Then in the same context, we further prompt GPT with Now for each of the names generated, generate a short description, short objectives, and a purpose for the data. Please ensure that the generated contents has LOW correlation with the name. which generates the <value> for three <property>s: description, objectives and purpose. Lastly, we perform one round of polishing, to let GPT diversity the language and style of the generated KB triple Now for each of the name, description, objective and purpose generated, make their text style more diverse using a mixture of formal and informal language.

B.2 Prompt for Open-Ended Q&A Generation

To generate open-ended Q&A instructions, we first take a triple from the KB, construct a simple Q&A from it, and then we feed the simple Q&A into GPT and let GPT augment it into a more complex form via the following prompt You are given a question and answer pair, please extend the question to be open-ended and generate a short answer. For example, you could generate What is the objective of xxx and what do you think of it? Make sure the answer is only based on information provided from the QA pair. In addition, please generate in the format of: Q: . . . A: . . . .

B.3 Prompt for GPT Evaluation of Open-Ended Q&A

To evaluate the answer quality of open-ended Q&A tasks, we again use GPT. In particular, we ask GPT to score the answer from two aspects: 1. How grounded the answer is given the question and the KB; 2. How reasonable the open-ended part of the answer is.

We begin with a system prompt of You are an AI system that evaluates the quality of generated responses. Your goal is to return a score between 0 and 5 indicating how accurate and useful the response is. An accurate and useful response should get a high score of 5.

Then, we use the following prompt, which encourages the model to give chain-of-thought reasoning for scoring [43]: A model is given a question about some information and evidence. The question is composed of two parts, a part that involves repeating information in the evidence and a part that potentially involves open-ended thinking. Then the model generates a response. Evaluate the response based on how grounded it is given the evidence and how reasonable it is. Return an integer score and step by step explanation of how you arrived at the score. Score of 5 means the response is accurate, relevant and reasonable (in that it meets common sense).

If the response addresses the question and uses the evidence in a relevant way, it should get a high score of 5. Score of 0 means the response is inaccurate and irrelevant or model is hallucinating. Score between 0 and 5 means the response is partially correct and relevant. Followed by the prompt, we include 5 examples to better help GPT calibrate the scoring rule Example 1: Evidence: "The purpose of Alexandria is to extract knowledge." Question: "Describe the purpose of Alexandria and how it can benefit users." Model output: "The purpose of Alexandria is to extract knowledge, it can benefit users by providing a structured way to organize knowledge." Score: 5 Reason: The model's response is accurate and relevant to the question and evidence, the open-ended part is reasonable.

Example 2: Evidence: "The purpose of Alexandria is to extract knowledge." Question: "Describe the purpose of Alexandria and what can it extract." Model output: "The purpose of Alexandria is to extract knowledge, it can extract knowledge." Score: 5 Reason: The model's response is accurate and relevant to the question and evidence.

Example 3: Evidence: "GreatTool is an app that helps users to be more productive." Question: "Describe GreatTool and how it may affect the community." Model output: "GreatTool is an app that helps users to be more productive. It may affect the community by helping users to sleep better." Score: 3 Reason: The model's response is accurate and relevant to the question and evidence but it is not very reasonable.

Example 4: Evidence: "GreatTool is an app that helps users to be more productive." Question: "Describe GreatTool and how it may affect the community." Model output: "GreatTool is an app that helps users to be more productive. It may affect the community by helping users to organize their tasks and manage their time better improving their productivity." Score: 5 Reason: The model's response is accurate and relevant to the question and evidence and the open ended part is sensible and reasonable.

Example 5: Evidence: "GreatTool is an app that helps users to be more productive." Question: "Describe GreatTool and how it may affect the community." Model output: "GreatTool is great tool with many feature" Score: 0 Reason: The model's response is not accurate and doesn't answer the question.

B.4 Prompt for Llama Evaluation

For in-context learning, we use the following prompts for evaluation #Simple Q A Please answer questions based on the given text with format: "The property of name is description"

#Two-entity Q A Please answer questions based on the given text with format: "The property of name1 is description; The property of name2 is description; . . . "

#Open-ended Q A You are provided a context and a question that has a retrieval part and an open-ended part. Please answer the question based on the given text. If the information for the open-ended part is not provided in the context, please generate a potential possible answer.

#Unanserable questions Please answer questions based on the given text with format: "The property of name is description", if relevant information cannot be found in the text, please respond "I am sorry I cannot find relevant information in the KB".

For zero-shot learning, we use the following prompt #Simple Q A Please answer the question in a very compact manner with format: The property of name is description

#Two-entity Q A Please answer the question in a very compact manner with format: "The property of name1 is description; The property of name2 is description; . . . .

#Open-ended Q A Please answer the question based on your knowledge.

B.5 Question Template

For simple Q&A, we use the following templates What <property> does <name> have?, What is the <property> of <name>?, Tell me about the <property> of <name>, Can you let me know the <property> of <name>?, Can you inform me about the <property> of <name>?, Describe the <property> of <name>, What details can you share about the <property> of <name>?, What kind of <property> does <name> have?, Provide details on the <property> of <name>, What features does the <property> of <name> include?, Can you elaborate on the <property> of <name>?, How would you describe the <property> of <name>?, What can you tell me about the <property> characteristics of <name>?, Can you explain the <property> of <name>?, What insights can you provide about the <property> of <name>?, What should I know about the <property> of <name>?, For multi-entities Q & A involving $G$ triples, $$\{(<\text{name}>_g, <\text{property}>_g, <\text{value}>_g)\}_{g=1}^{G},$$

we use the following template What is the Tell me, Can you let me know, Can you inform me, Describe, Explain, Could you describe the, What can you tell me about, Could you provide information on, Please enlighten me about, Can you clarify for me?, Could you give me a detailed description of, I need more information on, then for each blank in the curly brackets, we fill in the string the <property>_1 of <name>_1, . . . , the <property>_g of <name>_g, . . . and the <property>_G of <name>_G

APPENDIX C

Sample Output

In this Appendix, sample output from the model is given. In particular, generated answers from KBLM, in-context learning, and zero-shot learning, on open-ended Q&A tasks for synthetic KB (Appendix. 14.1) and Enron (Appendix. 14.2), given questions about a "Relevant triple" from a KB of 100 triples.

Broadly, we can see that zero-shot consistently produces hallucinations, as the contents of both the synthetic KB and Enron KB differ significantly from the real-world factual knowledge stored in the LLM's parameters.

KBLM and in-context learning, on the other hand, utilize the information from the KB to synthesize the answer. In-context learning provides highly precise answers to all questions, however it incurs substantial computational overhead and struggles to scale to larger KB s On synthetic data, KBLM accurately captures the information from the KB in terms of meaning and sentence structure, though it may use slightly different wording, e.g. in the last example on "Titdal surge", KBLM uses "renewable" instead of "sustainable" as in the original triple.

When tested on the out-of-distribution Enron data, KBLM still grasps the general meaning of the relevant triple, albeit with more noticeable differences. As discussed in the limitations section of the main text, we believe this performance gap can be narrowed by using a more diverse synthetic KB with a stronger real-world foundation during training.

C.1 Synthetic KB

<Q>Relevant triple:</Q> (ReefPulse Jellyfish; objectives; to provide real-time alerts, support remote monitoring, and improve home safety)

<Q>Question:</Q> Can you inform me about the objectives of ReefPulse Jellyfish and what do you think of its effectiveness in achieving these goals?

<K>KBLM output:</K> The objectives of ReefPulse Jellyfish are to provide real-time monitoring, send alerts, and improve home safety. While the effectiveness of ReefPulse Jellyfish in achieving these goals would depend on various factors such as the accuracy of the monitoring technology, the reliability of the alert system, and the user experience, the outlined objectives suggest a comprehensive approach to enhancing home safety.

<I> In-context learning output:</I> According to the context, the objectives of ReefPulse Jellyfish are to provide real-time alerts, support remote monitoring, and improve home safety. Based on these objectives, I think ReefPulse Jellyfish is effective in achieving its goals. The real-time alerts feature allows users to stay informed and take prompt action in case of any issues, which can help prevent potential hazards and ensure a safer home environment. The remote monitoring feature enables users to keep track of their home's conditions from anywhere, which can be particularly useful for people who are away from home for extended periods. Additionally, the improved home safety feature can help reduce the risk of accidents and injuries, making it a valuable tool for homeowners. Overall, I believe ReefPulse Jellyfish is <G> Zero-shot learning output:</G> ReefPulse Jellyfish is a product designed to monitor and control the water parameters in aquariums, specifically targeting jellyfish and other delicate marine life. Based on my knowledge, the objectives of ReefPulse Jellyfish are:

1. Accurate Water Parameter Monitoring: To provide real-time monitoring of water parameters such as pH, ammonia, nitrite, nitrate, and temperature, ensuring that the aquarium's water conditions are optimal for the jellyfish and other inhabitants. 2. Automated Water Parameter Control: To automatically adjust water parameters to maintain a stable and healthy environment, reducing the need for manual intervention and minimizing the risk of water parameter fluctuations. 3.

Enhanced Jellyfish Care: To provide a more precise and controlled environment <Q>Relevant triple:</Q> (Sagan's Starry Hotel; objectives; to create a magical and enchanting environment for guests)

<Q>Question:</Q> What features does the objectives of Sagan's Starry Hotel include and how do these features contribute to the overall guest experience?

<K>KBLM output:</K> The objectives of Sagan's Starry Hotel is to create a magical and enchanting environment for guests. These features likely include themed decor, special amenities, and exceptional service, all designed to transport guests into a fantastical world, enhancing their stay and making it memorable.

<I> In-context learning output:</I> Based on the context, the objectives of Sagan's Starry Hotel are to create a magical and enchanting environment for guests. The features that contribute to this objective include: *Creating a magical and enchanting environment for guests *Providing a unique and memorable experience for guests *Enhancing the overall guest experience through attention to detail and a focus on customer satisfaction These features contribute to the overall guest experience by creating a sense of wonder and excitement, making guests feel special and valued, and providing a memorable and enjoyable stay.

<G> Zero-shot learning output:</G> I apologize, but I couldn't find any information on "Sagan's Starry Hotel". Carl Sagan was an American astronomer and science communicator, but I couldn't find any evidence of a hotel bearing his name.

If you meant to ask about a different hotel or a hypothetical hotel concept, please provide more context or details, and I'll do my best to answer your question.

<Q>Relevant triple:</Q> (Currents Coach; purpose; to help you stay active and achieve your fitness goals)

<Q>Question:</Q> Describe the purpose of Currents Coach and how it can benefit users in their daily lives.

<K>KBLM output:</K> The purpose of Currents Coach is to help individuals track and improve their fitness. By using Currents Coach, users can monitor their physical activities, set fitness goals, and track their progress over time. This can lead to a more structured and effective fitness routine, ultimately contributing to better overall health and well-being.

<I> In-context learning output:</I> The purpose of Currents Coach is to help individuals track and improve their fitness. This app can benefit users in their daily lives by providing a personalized and comprehensive fitness tracking system. With Currents Coach, users can set and achieve their fitness goals, monitor their progress, and receive guidance and support to help them stay motivated and on track.

Here are some potential benefits of using Currents Coach:

*Improved physical health: By tracking and monitoring their fitness progress, users can make data-driven decisions to improve their overall physical health and well-being. *Increased motivation: Currents Coach provides a sense of accountability and motivation, helping users stay committed to their fitness goals and make progress towards achieving them. *Personalized guidance: The app offers personalized guidance and support <G> Zero-shot learning output:</G> Currents Coach is a personalized financial wellness platform designed to help users manage their finances, achieve their financial goals, and improve their overall financial well-being. The purpose of Currents Coach is to provide users with a comprehensive and interactive financial planning experience that is tailored to their individual needs and goals.

Here are some ways Currents Coach can benefit users in their daily lives:

1. Personalized Financial Planning: Currents Coach uses machine learning algorithms to analyze users' financial data and provide personalized financial plans, including budgeting, saving, and investing recommendations. 2. Goal Setting and Tracking: Users can set and track their financial goals, such as saving for a down payment on a house, paying off debt, or building an emergency fund. Current <Q>Relevant triple:</Q> (Hertz Horizons; description; a music production company specializing in independent artists)

<Q>Question:</Q> Can you explain the description of Hertz Horizons and what kind of artists they specialize in?

<K>KBLM output:</K> The description of Hertz Horizons is a music production company specializing in independent artists. They focus on supporting and promoting independent musicians, providing them with the resources and opportunities needed to succeed in the music industry.

<I> In-context learning output:</I> According to the context, Hertz Horizons is a music production company specializing in independent artists.

<G> Zero-shot learning output:</G> Hertz Horizons is a music production and distribution company that specializes in creating and releasing music for film, television, and other visual media. They are known for their unique approach to music production, which involves creating custom music tracks for specific scenes or moments in a film or TV show.

Hertz Horizons is particularly known for their work in the electronic and ambient genres, and they have worked with a wide range of artists and producers to create music for various projects. Some of the artists they have worked with include:

*Tycho: A electronic music producer and composer who has worked on numerous film and TV projects, including the Netflix series "Stranger Things". *Rival Consoles: A British electronic music producer and composer who has worked on <Q>Relevant triple:</Q> (Tidal Surge; objectives; to generate clean and sustainable energy)

<Q>Question:</Q> Provide details on the objectives of Tidal Surge and explain how it aims to achieve them.

<K>KBLM output:</K> The objectives of Tidal Surge is to generate clean and renewable energy. It aims to achieve these objectives by harnessing the power of tidal currents, which are a consistent and powerful source of energy. This involves the development of advanced technologies and infrastructure designed to capture and convert the kinetic energy of the tides into electricity.

<I> In-context learning output:</I> According to the context, the objectives of Tidal Surge are to "generate clean and sustainable energy".

To achieve these objectives, Tidal Surge likely aims to harness the power of tidal currents, which are the regular rise and fall of the sea level caused by the gravitational pull of the moon and sun. This renewable energy source has the potential to provide a significant portion of the world's energy needs while reducing greenhouse gas emissions and mitigating climate change.

To generate clean and sustainable energy, Tidal Surge may employ various technologies, such as:

1. Tidal barrages: These are structures that harness the energy of tidal currents by creating a dam-like structure across a tidal estuary or a narrow channel. 2. Tidal stream generators: These are <G> Zero-shot learning output:</G> Tidal Surge is a research project focused on developing a novel tidal energy converter (TEC) that can harness the power of ocean tides to generate electricity. The primary objectives of Tidal Surge are:

1. Design and development of a more efficient TEC: The project aims to design and develop a TEC that can capture a larger portion of the tidal energy available in the ocean, thereby increasing the overall efficiency of the device. 2. Improved scalability and cost-effectiveness: Tidal Surge aims to create a TEC that can be easily scaled up or down depending on the specific tidal energy resource and the needs of the power grid. This will help reduce the cost of tidal energy generation and make it more competitive with other renewable energy C.2 Enron <Q>Relevant triple:</Q> (Sitraka; description; a provider of Internet software technologies for IT organizations)

<Q>Question:</Q> What kind of description does Sitraka have and what services do they offer?

<K>KBLM output:</K> The description of Sitraka is a software company providing networking solutions for businesses. They offer services that likely include developing and implementing network infrastructure, managing network security, and possibly providing technical support to ensure smooth network operations for their clients.

<I> In-context learning output:</I> Based on the given text, Sitraka is described as a provider of Internet software technologies for IT organizations.

As for the services they offer, the text does not provide specific information. However, based on the general description, it can be inferred that Sitraka offers software technologies and solutions for IT organizations, possibly related to internet-based services, network management, or other IT-related areas.

<G> Zero-shot learning output:</G> According to my knowledge, Sitraka is a software company that provides IT service management solutions. They offer a range of services and products that help organizations manage and optimize their IT infrastructure, including:

*IT Service Management (ITSM) software: Sitraka's flagship product is the ITSM software, which provides a comprehensive platform for managing IT services, including incident, problem, and change management. *Asset Management: Sitraka's asset management solution helps organizations track and manage their IT assets, including hardware, software, and network devices. *Service Desk: Sitraka's service desk solution provides a centralized platform for managing IT requests, incidents, and problems. *Reporting and Analytics: Sitraka's reporting and analytics solution provides real <Q>Relevant triple:</Q> (Unocal; objectives; secure OPIC funds for offshore oil and natural gas projects)

<Q>Question:</Q> What features does the objectives of Unocal include and how do these features impact their operations?

<K>KBLM output:</K> The objectives of Unocal include securing offshore oil and gas reserves. These features impact their operations by ensuring that they can access and extract these natural resources efficiently and safely, which is crucial for meeting energy demands and maintaining a stable supply chain.

<I> In-context learning output:</I> Based on the provided context, the objectives of Unocal are:

*Secure OPIC funds for offshore oil and natural gas projects

These objectives do not provide specific features, but rather outline the company's goals and priorities. However, we can infer that securing funds for offshore oil and natural gas projects may involve features such as:

*Financial planning and budgeting *Risk assessment and management *Project development and execution *Regulatory compliance and permitting *Collaboration with stakeholders, including government agencies and investors These features would likely impact Unocal's operations by:

*Guiding the allocation of resources and budgeting for specific projects *Informing the company's strategic decisions and priorities *Influencing the company's relationships with stakeholders and partners <G> Zero-shot learning output:</G> Unocal, a multinational energy corporation, has several objectives that shape its operations. Based on my knowledge, the following features are included in Unocal's objectives and their impact on operations:

1. Safety and Environmental Protection: Unocal prioritizes the safety of its employees, contractors, and the public, as well as environmental protection. This objective is reflected in their commitment to reducing environmental impacts, implementing safety protocols, and conducting regular training programs. Impact: This objective ensures a safe working environment, reduces the risk of accidents, and minimizes environmental damage. 2. Operational Excellence: Unocal aims to optimize its operations by improving efficiency, reducing costs, and increasing productivity. This objective is achieved through process improvements, technology adoption, and employee <Q>Relevant triple:</Q> (San Francisco Symphony; purpose; concert organization)

<Q>Question:</Q> Provide details on the purpose of San Francisco Symphony and what activities they engage in to fulfill this purpose.

<K>KBLM output:</K> The purpose of San Francisco Symphony is to organize community concerts. To fulfill this purpose, they likely engage in activities such as planning and coordinating concert events, recruiting musicians, promoting the events to the community, and possibly collaborating with local organizations to ensure the concerts are accessible and enjoyable for a wide audience.

<I> In-context learning output:</I> Based on the given text, the purpose of San Francisco Symphony is a concert organization. This implies that the San Francisco Symphony is a music organization that aims to promote and perform classical music, likely through concerts and other musical events.

To fulfill this purpose, the San Francisco Symphony may engage in various activities such as:

*Organizing and performing concerts, including classical music performances, symphony orchestras, and chamber music recitals *Producing and presenting musical events, such as opera, ballet, and dance performances *Providing music education and outreach programs, such as music classes, workshops, and community outreach initiatives *Collaborating with other music organizations, schools, and community groups to promote music education and appreciation *Developing and maintaining a professional <G> Zero-shot learning output:</G> The San Francisco Symphony (SFS) is a world-renowned orchestra based in San Francisco, California. The purpose of the San Francisco Symphony is to provide high-quality musical performances, promote music education, and foster a sense of community through music.

To fulfill this purpose, the San Francisco Symphony engages in a variety of activities, including:

1. Concerts: The SFS performs over 200 concerts each year, featuring a wide range of repertoire from classical masterpieces to contemporary works. These concerts take place at Davies Symphony Hall, the orchestra's home venue, as well as at other locations throughout the Bay Area. 2. Music Education: The SFS offers a range of music education programs for children and adults, including the SFS Youth Orchestra <Q>Relevant triple:</Q> (TBWA/Chiat/Day; objectives; eliminate private office and individual cubicle, Promote collaboration)

<Q>Question:</Q> What insights can you provide about the objectives of TBWA/Chiat/Day and what do you think of their approach to promoting collaboration?

<K>KBLM output:</K> The objectives of TBWA/Chiat/Day is promote face-to-face collaboration and eliminate conference rooms. Their approach to promoting collaboration by eliminating conference rooms suggests a focus on more informal and spontaneous interactions, which can be beneficial for fostering creativity and open communication among team members.

<I> In-context learning output:</I> Based on the provided context, the objectives of TBWA/Chiat/Day are:

*Eliminate private office and individual cubicle *Promote collaboration Insights that can be provided about the objectives of TBWA/Chiat/Day are:

*The agency is focusing on creating a more collaborative work environment by eliminating private offices and individual cubicles. This suggests that they value teamwork and communication among employees. *By promoting collaboration, TBWA/Chiat/Day is likely trying to increase creativity, innovation, and productivity among its employees. This approach can lead to better ideas, faster problem-solving, and improved morale.

As for their approach to promoting collaboration, it seems that they are taking a bold step by eliminating private offices and <G> Zero-shot learning output:</G> TBWA/Chiat/Day is a global advertising agency that was founded in 1978 by Jay Chiat and Richard Laermer. The agency is known for its creative and innovative approach to advertising, and has worked with a wide range of clients across various industries.

As for their objectives, TBWA/Chiat/Day's mission is to "Challenge the Status Quo" and to "Change the Game" for their clients. They aim to create advertising that is not only creative and effective, but also memorable and impactful. The agency's approach is centered around the idea of "Disruption," which involves challenging the conventional norms and expectations of advertising and finding new and innovative ways to connect with consumers.

In terms of promoting collaboration,

<Q>Relevant triple:</Q> (Go2net Mail; purpose; used for sending and receiving emails)

<Q>Question:</Q> Describe the purpose of Go2net Mail and explain how it benefits users.

<K>KBLM output:</K> The purpose of Go2net Mail is used for sending and receiving emails. It benefits users by providing a reliable and efficient platform for communication, ensuring that emails are delivered promptly and securely.

<I> In-context learning output:</I> The purpose of Go2net Mail is to provide a service for sending and receiving emails. This service allows users to communicate with others through electronic mail, which is a convenient and efficient way to exchange information.

Go2net Mail benefits users in several ways. Firstly, it provides a platform for users to send and receive emails, which is essential for personal and professional communication. Secondly, it allows users to access their emails from anywhere, at any time, as long as they have an internet connection. This makes it easy to stay connected with others, regardless of their location. Thirdly, Go2net Mail provides a secure and reliable way to send and receive emails, which is important for users who need to share sensitive information. Overall, Go2

<G> Zero-shot learning output:</G> Go2net Mail is a free web-based email service provided by Go2net, a popular online directory and search engine. The primary purpose of Go2net Mail is to offer users a reliable and user-friendly email service that allows them to send and receive emails, manage their contacts, and store files online.

Here are some benefits that Go2net Mail offers to its users:

1. Free Email Service: Go2net Mail provides a free email service, which means users don't have to pay any subscription fees or maintenance costs. 2. Web-Based Access: Users can access their email accounts from anywhere, at any time, using a web browser and an internet connection. 3. Large Storage Space: Go2net Mail offers

The invention claimed is:

1. A computer-implemented method, comprising:

receiving an input query;

generating an input tensor based on the input query;

in an attention layer of a machine learning (ML) network:

receiving the input tensor;

generating, by a model query adapter, a model query tensor based on the input tensor;

receiving an embedded external knowledge base (KB) comprising a KB key tensor and a KB value tensor;

generating, by a KB query adapter, a KB query tensor based on the input tensor;

evaluating an attention function that combines:

attention over a model value tensor based on the model query tensor and a model key tensor, with attention over the KB value tensor based on the KB query tensor and the KB key tensor, resulting in an output tensor; and generating a response based on the output tensor.

2. The method of claim 1, wherein the KB query adapter has been trained on a data retrieval training task; and wherein the model query adapter has been trained on a model training task independently of the KB query adapter.

3. The method of claim 1, comprising:
retrieving from a structured KB a first key-value pair;
generating, by a KB key adapter, a first KB key vector based on a first key of the first key-value pair;
generating, by a KB value adapter, a first KB value vector based on a first value of the first key-value pair;
retrieving from the structured KB a second key-value pair;
generating, by the KB key adapter, a second KB key vector based on a second key of the second key-value pair;
generating, by the KB value adapter, a second KB value vector based on a second value of the second key-value pair;
wherein the KB key tensor comprises the first KB key vector and the second KB key vector, and the KB value tensor comprises the first KB value vector and the second KB value vector.

4. The method of claim 3, wherein the KB query adapter, the KB key adapter and the KB value adapter have been trained on a data retrieval training task; and
wherein the model query adapter has been trained on a model training task independently of the KB query adapter.

5. The method of claim 1, wherein the model query tensor comprises multiple model query vectors, wherein the KB query tensor comprises multiple KB query vectors, and the output tensor comprises multiple output vectors.

6. The method of claim 1, comprising:
generating, by a model key adapter, the model key tensor;
generating, by a model value adapter, the model value tensor;
wherein the model key adapter generates a model key tensor based on the input tensor, wherein the model value adapter generates the model value tensor based on the input tensor, and wherein the attention over the model value tensor is self-attention.

7. The method of claim 6, wherein the model query tensor comprises multiple model query vectors, wherein the KB query tensor comprises multiple KB query vectors, and the output tensor comprises multiple output vectors, wherein the attention function selectively masks the model value tensor dependent on a position of the output vector in the output tensor.

8. The method of claim 1, wherein the input tensor encodes text, image data or audio data.

9. The method of claim 1, wherein the response comprises generated:
text,
image data,
audio data,
computer code executable on a processor.

10. The method of claim 1, comprising, based on the response:
controlling or implementing a technical process;
detecting, identifying or mitigating a fault, anomaly or instance of suspicious activity in a machine, device, system or network; or
performing a medical diagnosis.

11. The method of claim 3, wherein the model query adapter has been trained on a model training task independently of the KB query adapter, the method comprising:
training the KB query adapter, the KB key adapter and the KB value adapter based on a training loss function dependent on the output tensor, resulting in a trained KB query adapter.

12. The method of claim 11, comprising generating the training query and ground-truth response using the structured KB, wherein the input tensor encodes the training query associated with a ground-truth response, wherein the loss function measures a difference between the ground-truth response and a generated response generated by the ML network dependent on the output tensor;
wherein the structured KB is a synthetic structured KB, the method comprising generating the synthetic structured KB using a trained generative model.

13. The method of claim 3, wherein the first key is a first fixed-length key vector encoding a first key portion of a first structured data item;
wherein the first value is a first fixed-length value vector encoding a first value portion of the first structured data item;
wherein the second key is a second fixed-length key vector encoding a second key portion of a second structured data item;
wherein the second value is a second fixed-length value vector encoding a second value portion of the second structured data item.

14. The method of claim 13, wherein the first key portion comprises a first entity name and a first entity property, and the second key portion comprises a second entity name and a second entity property.

15. The method of claim 1, comprising:
generating, by a model key adapter, the model key tensor; and
generating, by a model value adapter, the model value tensor.

16. The method of claim 2, comprising:
generating, by a model key adapter, the model key tensor;
generating, by a model value adapter, the model value tensor;
wherein the model query adapter, the model key adapter and the model value adapter have been trained on a model training task independently of the KB query adapter.

17. A database management system, comprising:
at least one hardware processor configured to:
receive a data item;
encode the data item using a first trained key weight tensor and a first trained value weight tensor, resulting in a first key vector and a first value vector;
store in a database the first key vector and the first value vector;
receive an input query;
input the input query to a machine learning (ML) network, wherein the first trained key weight tensor and the first trained value weight tensor are external to the ML network and encode the data item independently of the ML network;
receive from the ML network an input token embedding generated within the ML network;
retrieve from the database the first key vector and the first value vector;
generate a first query vector based on the input token embedding and a first trained query weight tensor;
input to an attention layer of the ML network: the first query vector, the first key vector and the first value vector, thereby causing the attention layer of the ML network to evaluate an attention function that combines:
attention over the first value vector based on the first query vector and the first key vector, with attention over a second value vector based on: a second key vector, and a second query vector generated within the ML network based on the input token embedding independently of the first query weight tensor;

receiving a generated response to the input query from an output layer of the ML network coupled to the attention layer; and outputting the generated response.

18. The database management system of claim 17, wherein the first key vector and the first value vector are stored in the database prior to receiving the input query.

19. The database management system of claim 18, wherein the second query vector is generated within the ML network based on the input token embedding.

20. Computer-readable storage media embodying computer-readable instructions, which are configured upon execution on at least one processor to cause the at least one processor to perform operations comprising:

receiving an input query;

generating an input tensor based on the input query;

generating, based on the input tensor and a trained knowledge base (KB) query weight tensor, a KB query vector;

inputting, to an attention layer of a machine learning (ML) network, an embedded external KB comprising a KB key tensor and a KB value tensor, thereby causing the attention layer to evaluate an attention function that combines:

attention over the KB value tensor based on the KB query vector and the KB key tensor, with attention over a model value tensor based on: a model key tensor, and a model query vector generated within the ML network based on the input tensor independently of the trained KB query weight tensor, resulting in an output tensor;

generating a response based on the output tensor; and outputting the response.

* * * * *